United States Patent [19]

Bruckert et al.

[11] Patent Number: 5,251,227
[45] Date of Patent: Oct. 5, 1993

[54] TARGETED RESETS IN A DATA PROCESSOR INCLUDING A TRACE MEMORY TO STORE TRANSACTIONS

[75] Inventors: William Bruckert, Northboro, Mass.; Thomas D. Bissett, Derry, N.H.; John Munzer, Brookline; David Kovalcin, Grafton, both of Mass.; Mitchell Norcross, Nashua, N.H.

[73] Assignee: Digital Equipment Corporation, Maynard, Mass.

[21] Appl. No.: 852,509

[22] Filed: Mar. 17, 1992

Related U.S. Application Data

[63] Continuation of Ser. No. 789,443, Nov. 7, 1991, abandoned, which is a continuation of Ser. No. 388,087, Aug. 1, 1989, abandoned.

[51] Int. Cl.⁵ ............................................. G06F 11/00
[52] U.S. Cl. ...................................................... 371/12
[58] Field of Search ............................................ 371/12

[56] References Cited

U.S. PATENT DOCUMENTS

| | | |
|---|---|---|
| 3,665,173 | 5/1972 | Bouricius et al. |
| 3,761,884 | 9/1973 | Avsan et al. |
| 3,864,670 | 2/1975 | Inoue et al. |
| 3,873,819 | 3/1975 | Greenwald |
| 3,898,621 | 8/1975 | Zelinski et al. |
| 3,961,270 | 6/1976 | Ullman et al. |
| 4,012,717 | 3/1977 | Censier et al. ............ 340/172.5 |
| 4,030,074 | 6/1977 | Giorcelli |
| 4,031,372 | 6/1977 | Davis |
| 4,099,234 | 7/1978 | Woods et al. |
| 4,099,241 | 7/1978 | Ossfeldt |
| 4,141,066 | 2/1979 | Keiles |
| 4,153,318 | 5/1979 | Bishop et al. |
| 4,196,470 | 4/1980 | Berg |
| 4,200,226 | 4/1980 | Piras |
| 4,228,496 | 10/1980 | Katzman et al. |
| 4,245,344 | 1/1981 | Richter |
| 4,251,873 | 2/1981 | Joby |
| 4,253,147 | 2/1981 | Macdougall et al. |
| 4,268,902 | 5/1981 | Berglund et al. |
| 4,270,168 | 5/1981 | Murphy et al. |
| 4,271,518 | 6/1981 | Birzele et al. |
| 4,298,928 | 11/1981 | Etoh et al. |
| 4,313,160 | 1/1982 | Kaufman et al. |
| 4,350,255 | 9/1982 | Sakata et al. |
| 4,356,546 | 10/1982 | Whiteside et al. |
| 4,358,823 | 11/1982 | McDonald et al. |
| 4,365,293 | 12/1982 | Holtz |
| 4,371,754 | 2/1983 | De et al. |
| 4,377,843 | 3/1983 | Garringer et al. |
| 4,388,683 | 6/1983 | Beifuss et al. |
| 4,400,792 | 8/1983 | Strelow |
| 4,403,282 | 9/1983 | Holberger et al. |
| 4,418,343 | 11/1983 | Ryan et al. |

(List continued on next page.)

FOREIGN PATENT DOCUMENTS

| | | |
|---|---|---|
| WO81/00925 | 4/1981 | European Pat. Off. |
| 077154 | 4/1983 | European Pat. Off. |
| 120384 | 10/1984 | European Pat. Off. |
| 0306211 | 3/1989 | European Pat. Off. |
| 0306244 | 3/1989 | European Pat. Off. |
| 0306348 | 3/1989 | European Pat. Off. |
| 0315303 | 5/1989 | European Pat. Off. |
| 3328405 | 2/1985 | Fed. Rep. of Germany |
| 1200155 | 7/1970 | United Kingdom |

OTHER PUBLICATIONS

Euringer, M. et al., "Fault-Tolerant and Fail-Safe Process Control With Redundant Automation Systems",
(List continued on next page.)

Primary Examiner—Dale M. Shaw
Assistant Examiner—Robert S. Hauser
Attorney, Agent, or Firm—Finnegan, Henderson, Farabow, Garrett and Dunner

[57] ABSTRACT

Resets on a data processing system are targeted to specific locations of that processing system and have different effects. Some resets are transparent to instruction execution while other resets will interrupt the normal execution of instructions. In addition, in a multi-zone environment resets in one zone do not automatically propagate to the other zone; instead, each zone generates its own resets.

24 Claims, 39 Drawing Sheets

U.S. PATENT DOCUMENTS

| | | |
|---|---|---|
| 4,424,565 | 1/1984 | Larson . |
| 4,428,044 | 1/1984 | Liron . |
| 4,453,215 | 6/1984 | Reid . |
| 4,486,826 | 12/1984 | Wolff et al. . |
| 4,495,571 | 1/1985 | Staplin, Jr. et al. . |
| 4,521,847 | 6/1985 | Ziehm et al. ............ 364/184 |
| 4,541,094 | 9/1985 | Stiffler . |
| 4,569,017 | 2/1986 | Renner et al. . |
| 4,580,232 | 4/1986 | Dugan et al. ............ 364/523 |
| 4,589,090 | 5/1986 | Downing et al. ........ 364/900 |
| 4,589,066 | 5/1986 | Lam et al. . |
| 4,597,084 | 6/1986 | Dynneson et al. . |
| 4,602,327 | 7/1986 | LaViolette et al. . |
| 4,610,013 | 9/1986 | Long . |
| 4,627,055 | 12/1986 | Mori et al. . |
| 4,631,671 | 12/1986 | Kawashita et al. . |
| 4,654,857 | 3/1987 | Samson et al. . |
| 4,692,862 | 9/1987 | Cousin et al. . |
| 4,700,292 | 10/1987 | Campanini . |
| 4,751,702 | 6/1988 | Beier et al. . |
| 4,870,644 | 9/1989 | Sherry et al. ............ 371/16.1 |
| 4,916,704 | 4/1990 | Bruckert et al. ......... 371/68.3 |
| 4,920,479 | 4/1990 | Hashiguchi . |

OTHER PUBLICATIONS

DATAPRO Research Corporation Feature Report (Dec., 1985). M07-100-318 to M07-100-323.

The Evolution of Fault-Tolerant Computing, Proceedings of the 1-day symposium on the Evolution of Fault-Tolerant Computing, Ed. by A. Avizienis, H. Kopetz, an J. Laprie (Jun. 30, 1986).

IBM System/88—The Operating System Reference—Jul., 1985.

Harrison, "S/88 Architecture and Design," S/88 Internals, Share 67 (Aug. 12, 1986).

"System/88 Technical Overview" (dated believed to be Feb. 1986).

Tandem NonStop Computers, DATAPRO Research Corporation, Computers M11-822-101 to M11-822-119 (Oct. 1986).

Bartlett, "The Tandem Concept of Fault-Tolerance," (view 1985).

Bernstein, "Sequoia: A Fault-Tolerant Tightly-Coupled Computer for Transaction Processing," Technical Report TR-85-03, pp. 1-43 May 2, 1985).

Chester, "Fault-Tolerant Computers Mature," Systems & Software, pp. 117-129 (Mar., 1985).

Depledge, et al., "Fault-Tolerant Microcomputer Systems for Aircraft," IERE Conference Proceedings 36, 1977, Proc. Conf. on Computer Systems & Technology Engineering, pp. 205-220 (Mar., 1977).

Beck, et al., "Implementation Issues in Clock Synchronization," Mar. 15, 1986 Draft (origin unknown).

Siemens Power Engineering & Automation, vol. VII, No. 6, Dec. 1986, pp. 408-410.

Computer Design, "Continuous Processing System Performs Error Checks In Hardware to Eliminate Complex Software":, vol. 21, No. 1, Jan. 1982, pp. 40-42.

Fazio; G. et al., "A Fault-Tolerant Microcomputer With Fail-Safe Outputs", Microprocessing and Microprogramming, vol. 12, No. 5, 1983, pp. 279-284.

Krol, T., "The '(4,2) Concept' Fault-Tolerant Computer", Philips Technical Review, vol. 41, No. 1, 1983, pp. 1-11.

Eue, W. et al., "SIMIS-C-die Kompaktversion des Sicheren Mikrocomputersystems SIMIS", Signal Draht, vol. 79, No. 4, 1987, pp. 81-85.

Sequoia Technical Overview (date unknown) but believed to be Mar., 1985 by virtue of annotation at the bottom of last page of this material.

Sequoia Hardware Architure (1984).

Bernstein, Sequoia, Wang Institute of Graduate Studies (date unknown) "How Technology is Cutting Fault-Tolerance Costs," Electronics 55-58 Jan. 13, 1986).

Katsuki, et al., "Pluribus-An Operational Fault-Tolerant Multiprocessor," Proceedings of the IEEE vol. 66, No. 10 (Oct., 1978).

Rennels, "Architectures for Fault-Tolerant Spacecraft Computers," Proceedings of the IEEE, vol. 66, No. 10, pp. 1255-1268 (Oct., 1978).

Parallel 300 (1984).

Inselberg, "Multiprocessor Architecture Ensures Fault-Tolerant Transaction Processing," Many MicroSystems (Apr., 1983).

Anita Borg, "Targon/Nixdorf" (date unknown).

Losq, "A Highly Efficient Redundancy Scheme: Self-Purging Redundancy," IEEE Transactions on Computers, vol. C-25, No. 6 (Jun., 1976).

Su, et al., "A Hardware Redundancy Reconfiguration Scheme for Tolerating Multiple Module Failures," IEEE Transactions on Computers, vol. C-29, No. 3, (Mar., 1980).

Takaoka, et al., "N-Fail-Safe Logical Systems," IEEE Transactions on Computers, vol. C-20, No. 5, pp. 536-542 (May 1971).

FIG. 13

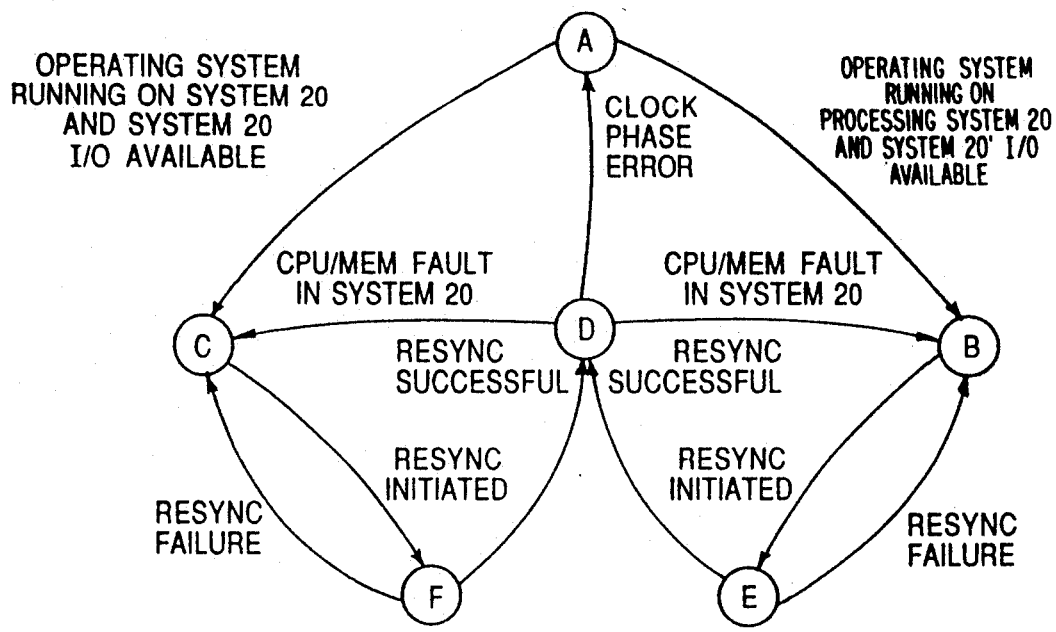

| STATE | PROCESSING SYSTEM 20 | PROCESSING SYSTEM 20' | DESCRIPTION |
|---|---|---|---|
| A | OFF | OFF | TWO INDEPENDENT ZONES |
| B | MASTER | SLAVE | PROCESSING SYSTEM 20 HAS OPERATING SYSTEM AND SYSTEM 20' IS OFF-LINE (I/O IS WITH SYSTEM 20) |
| C | SLAVE | MASTER | PROCESSING SYSTEM 20' HAS OPERATING SYSTEM AND SYSTEM 20 IS OFF-LINE (I/O IS WITH SYSTEM 20') |
| D | FULL DUPLEX | FULL DUPLEX | LOCK STEP SYNCHRONIZATION |
| E | RESYNC MASTER | RESYNC SLAVE | PROCESSING SYSTEM 20 IS IN CHARGE OF RESYNC |
| F | RESYNC SLAVE | RESYNC MASTER | PROCESSING SYSTEM 20' IS IN CHARGE OF RESYNC |

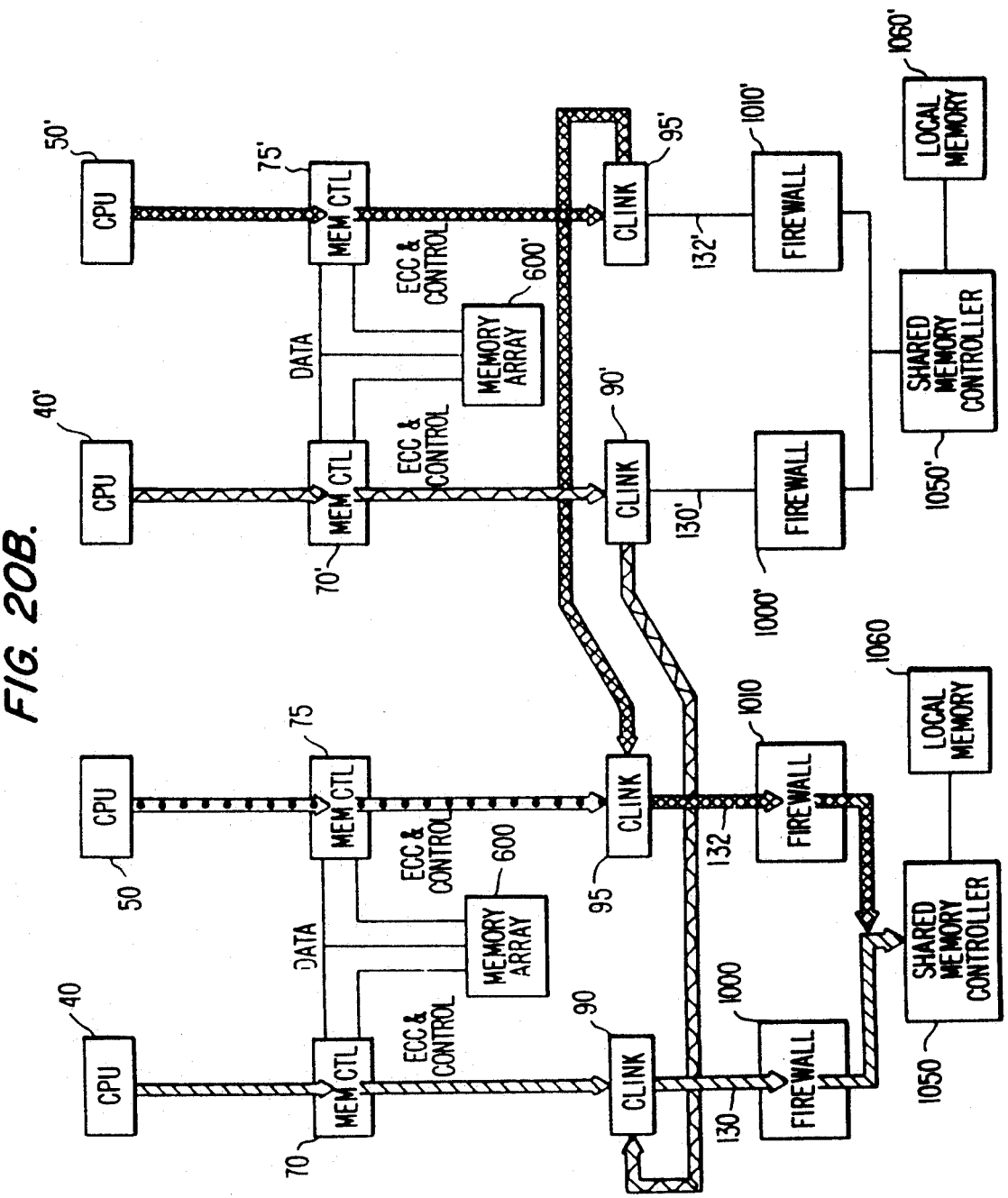

TARGETED RESETS IN A DATA PROCESSOR INCLUDING A TRACE MEMORY TO STORE TRANSACTIONS

This is a continuation of application Ser. No. 07/789,443 filed Nov. 7, 1991 now abandoned, which is a continuation of Ser. No. 07/388,087 filed Aug. 1, 1989 now abandoned.

I. BACKGROUND OF THE INVENTION

The present invention relates to the field of resetting a data processor and, more particularly, to the field of managing different classes of resets in a data processor.

All data processing systems need the capability of resetting under certain conditions, such as during power up or when certain errors occur. Without resets there would be no way to set the data processing system into a known state either to begin initialization routines or to begin error recovery routines.

The problem with resets, however, is that they have wide-ranging effects. In general, resets disrupt the normal flow of instruction execution and may cause a loss of data or information. Sometimes such drastic action is required to prevent more serious problems, but often the effect of the resets is worse than the condition which caused the resets.

Another problem with resets in conventional machines is that they are not localized. In other words, an entire data processing system is reset when only a portion needs to be. This is particularly a problem in systems employing multiple processors such as for fault-tolerant applications. In such systems, an error in one of the processors can propagate to the other processors and bring the entire system to a halt. If the originating processor was in error in generating resets, then the effect is to cause an unnecessary halt in execution.

It would therefore be advantageous to design a system in which the resets are matched to the conditions which generated the reset.

It would also be advantageous for such a system to have several classes of resets with different effects.

It would be additionally advantageous if, in a multiple processor data processing system, the resets in one of the processors did not automatically propagate to the other processors.

Additional advantages of this invention will be set forth in part in the description which follows and in part will be obvious from that description or may be learned by practicing the invention. The advantages may be realized by the methods and apparatus particularly pointed in the appended claims.

II. SUMMARY OF THE INVENTION

The present invention overcomes the problems of the prior art and achieves the objects listed above by distinguishing between hard resets which can effect the normal execution of instructions and soft resets which are generally transparent to instruction operation. In addition, the resets can be both system wide or localized. Finally, each zone in a multi-zone processing system generates its own resets, so a reset caused in one zone will not automatically propagate to the other zones.

In accordance with the purpose of the invention, as embodied and is broadly described herein, a method of resetting the data processing system without altering the sequence of instruction execution comprises several steps executed by the data processing system. The data processing system has a central processor connected to a plurality of components via a data pathway. The components include resettable elements and the central processor executes a sequence of instructions which cause a series of transactions to be forwarded along the data pathway.

The steps include storing the transaction which is currently being forwarded on the data pathway, detecting a condition of the data processing system for which a reset is indicated, transmitting, if the reset condition is detected, a reset signal to selected ones of the plurality of components along the data pathway, the reset signals causing the selected components to reset portions of their elements, and reforwarding the stored current transactions along the data pathway.

III. BRIEF DESCRIPTION OF THE DRAWINGS

The accompanying drawings, which are incorporated in and which constitute a part of this specification, illustrate one embodiment of the invention and, together with the description of the invention, explain the principles of the invention.

FIG. 13 is a state diagram showing the states for the cross-link of the CPU module shown in FIG. 3;

FIGS. 20A-20E are data flow diagrams for the computer system in FIG. 1;

Figure 1:
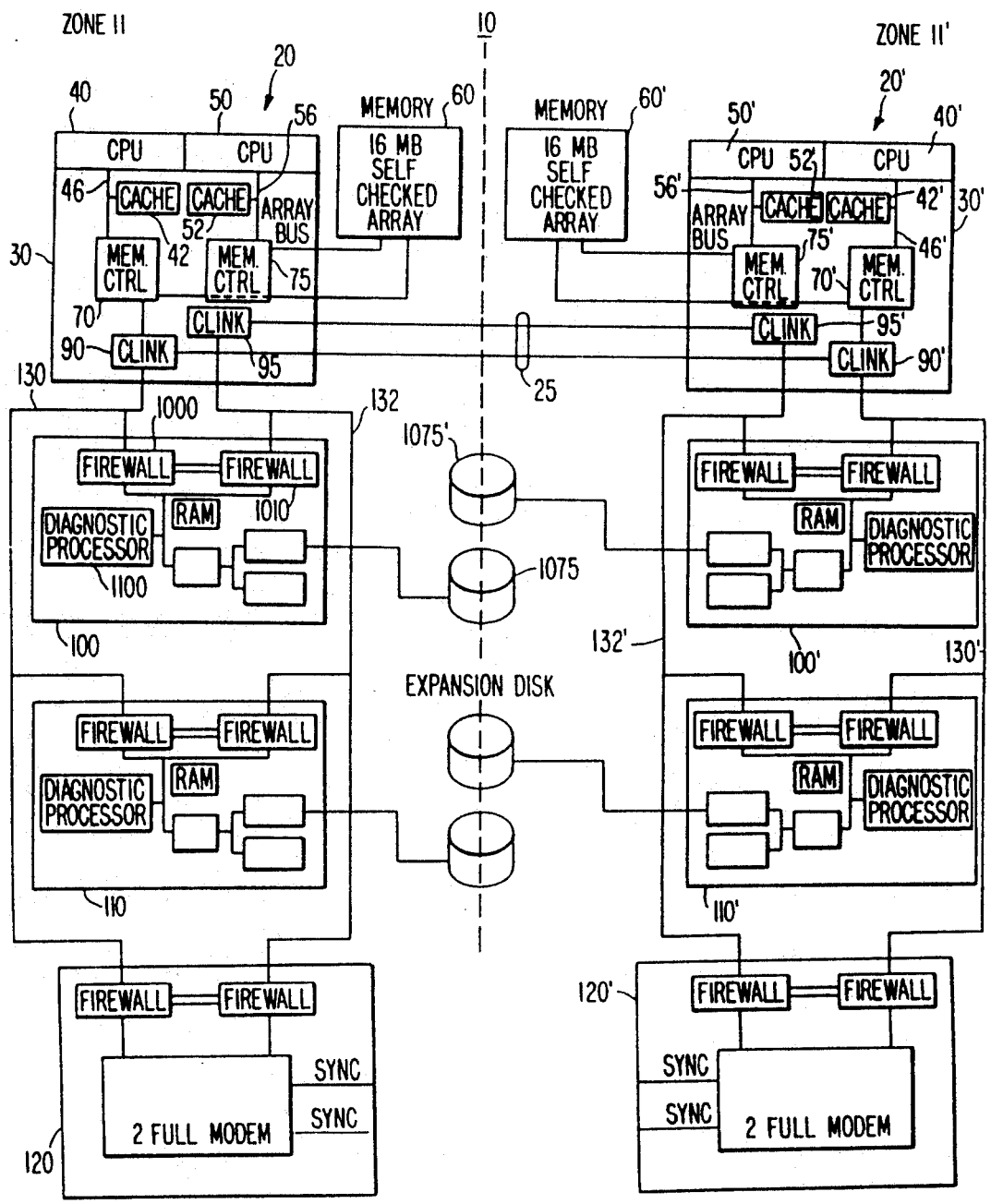
FIG. 1 is a block diagram of a preferred embodiment of fault tolerant computer system which practices the present invention.
Figure 24:
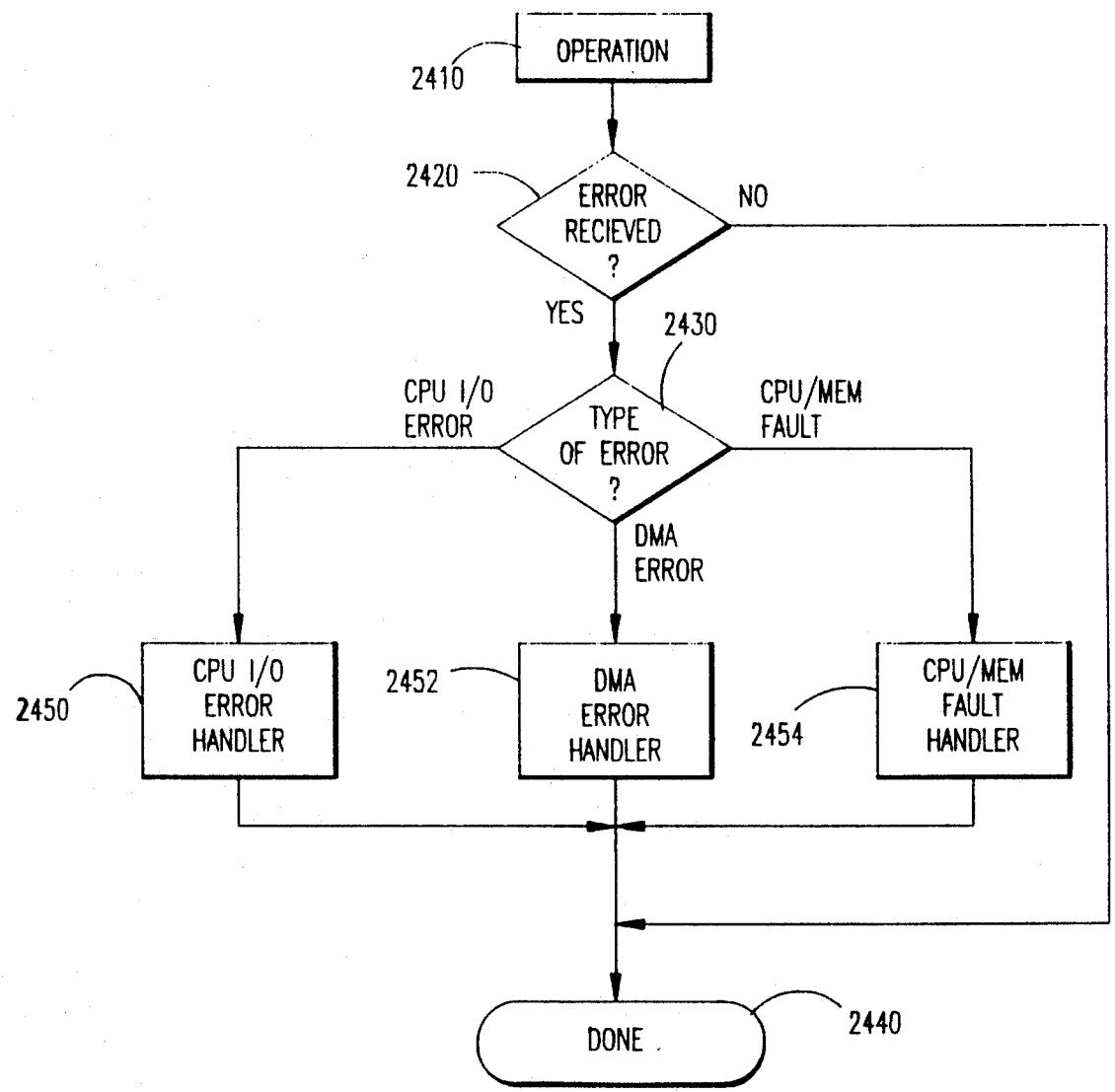
FIG. 24 is a flow diagram illustrating an overall hardware error handling procedure for the computer system in FIG. 1.
Figure 25A:
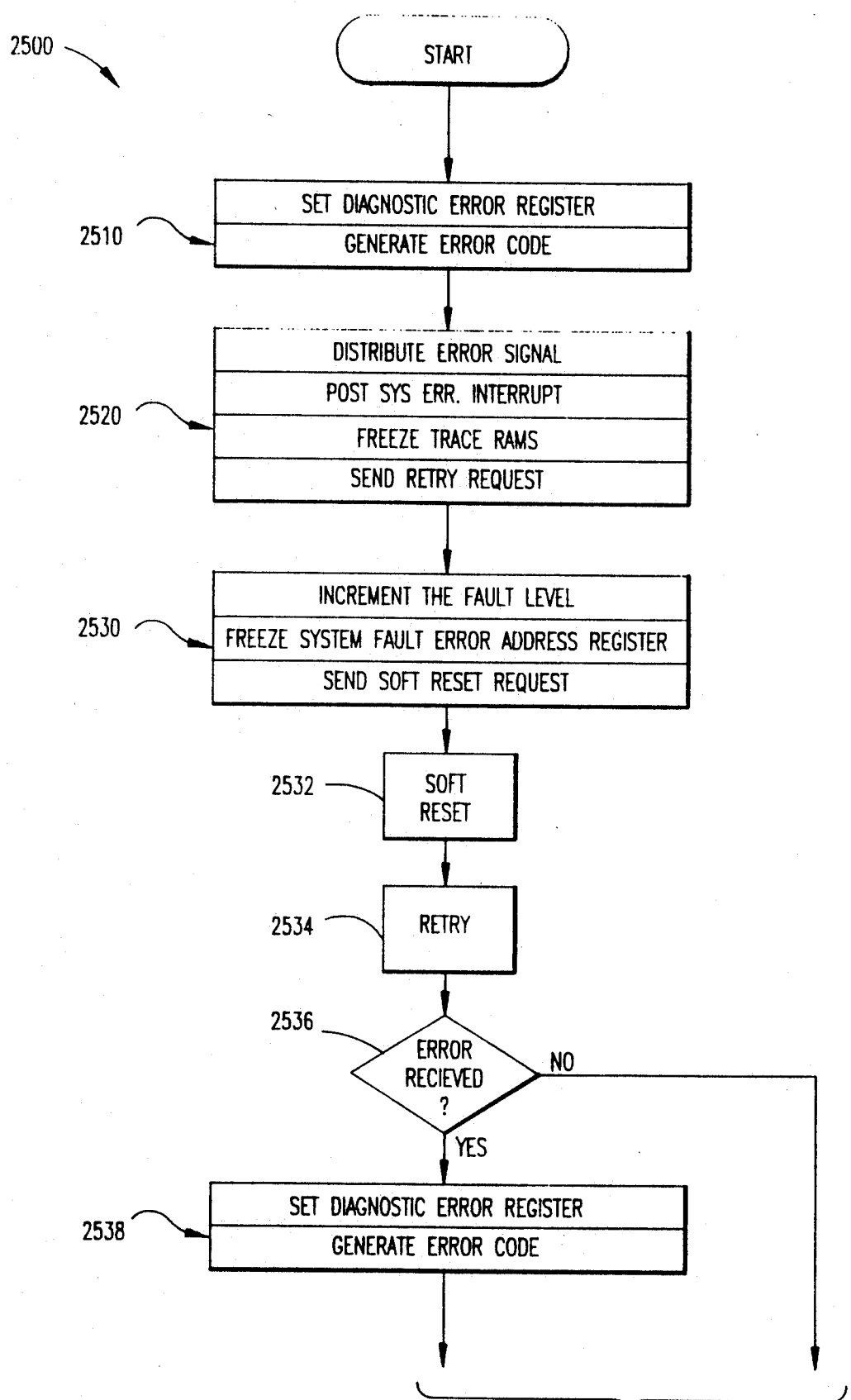
Figure 25B:
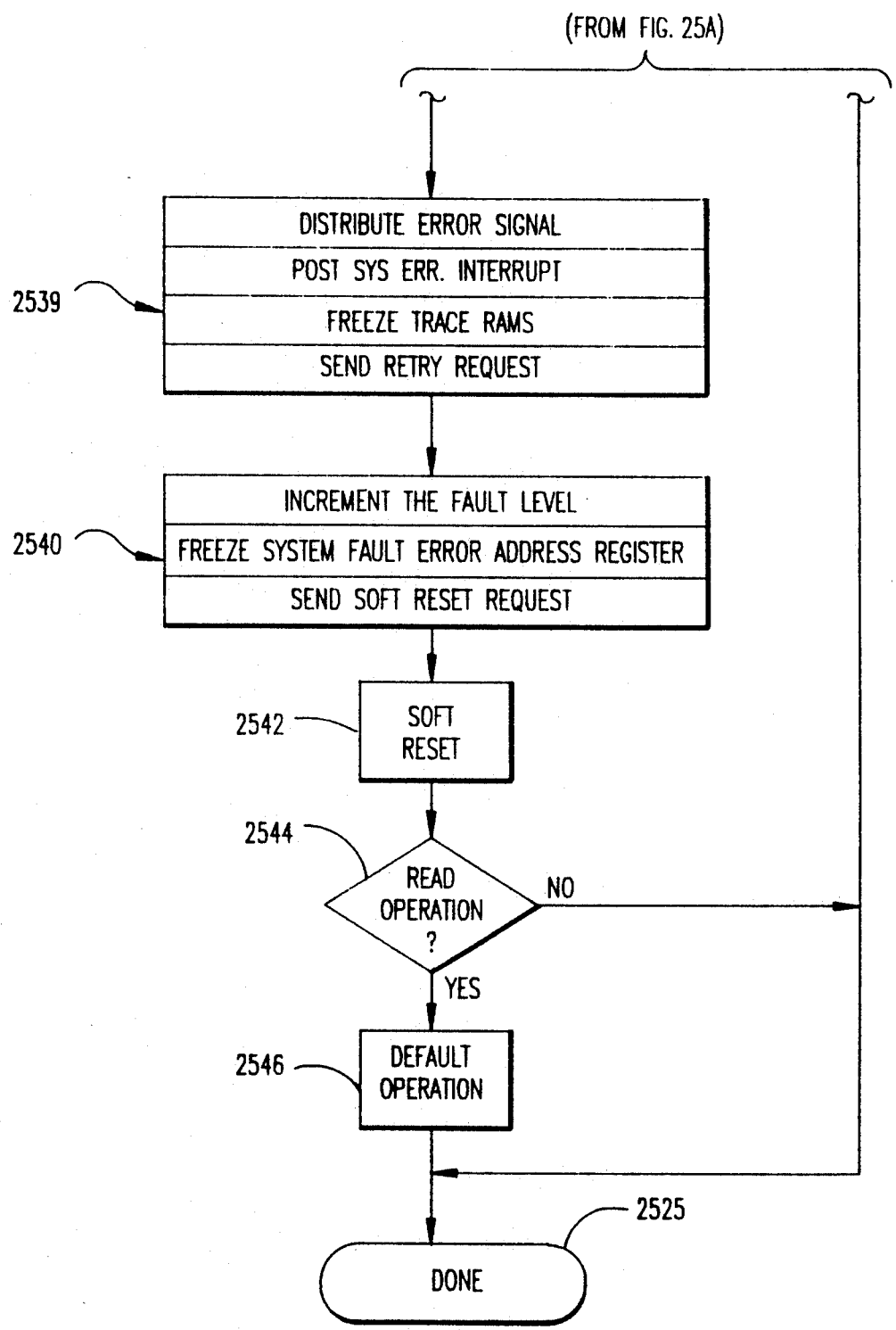
Figure 26:
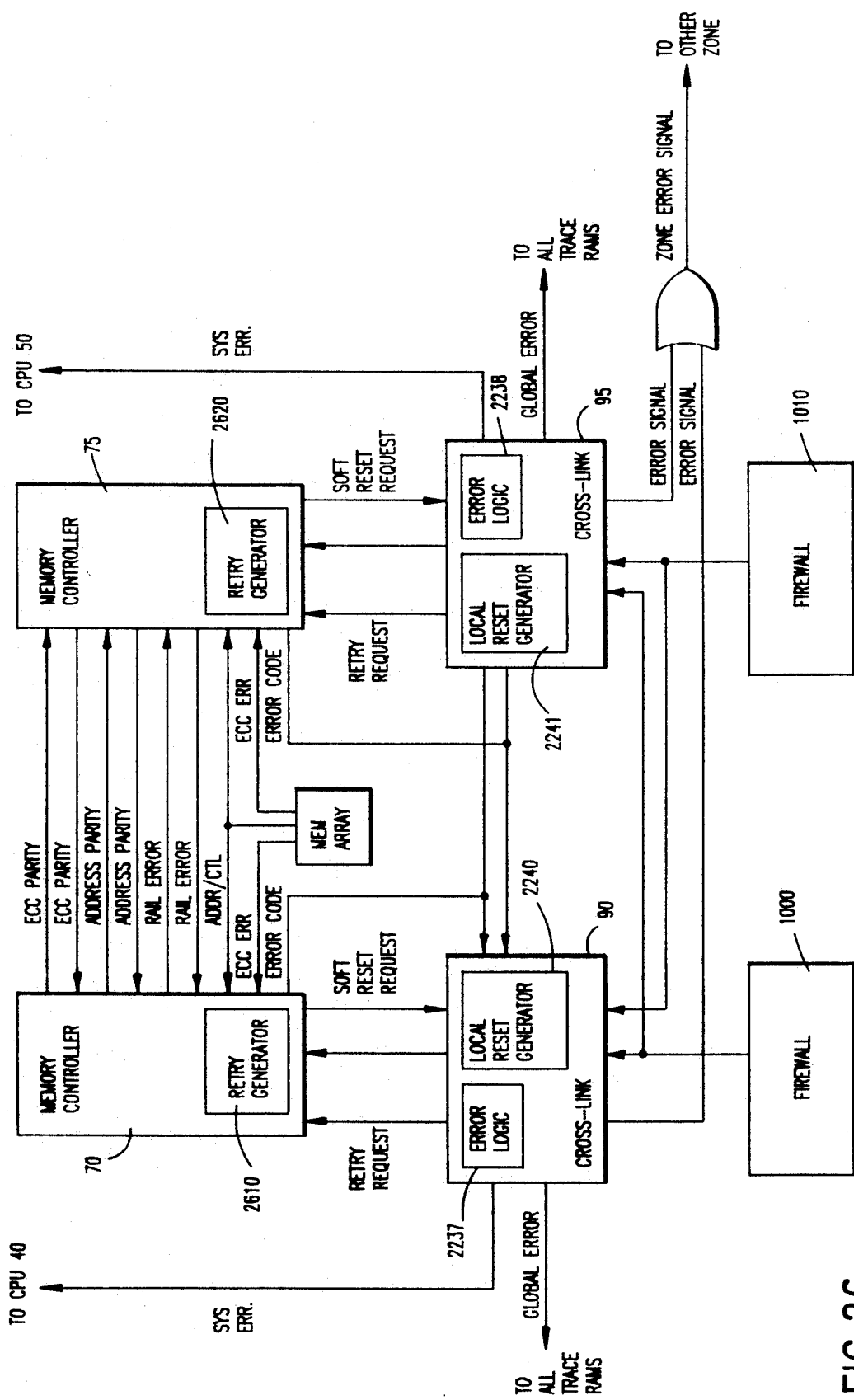
Figure 27:
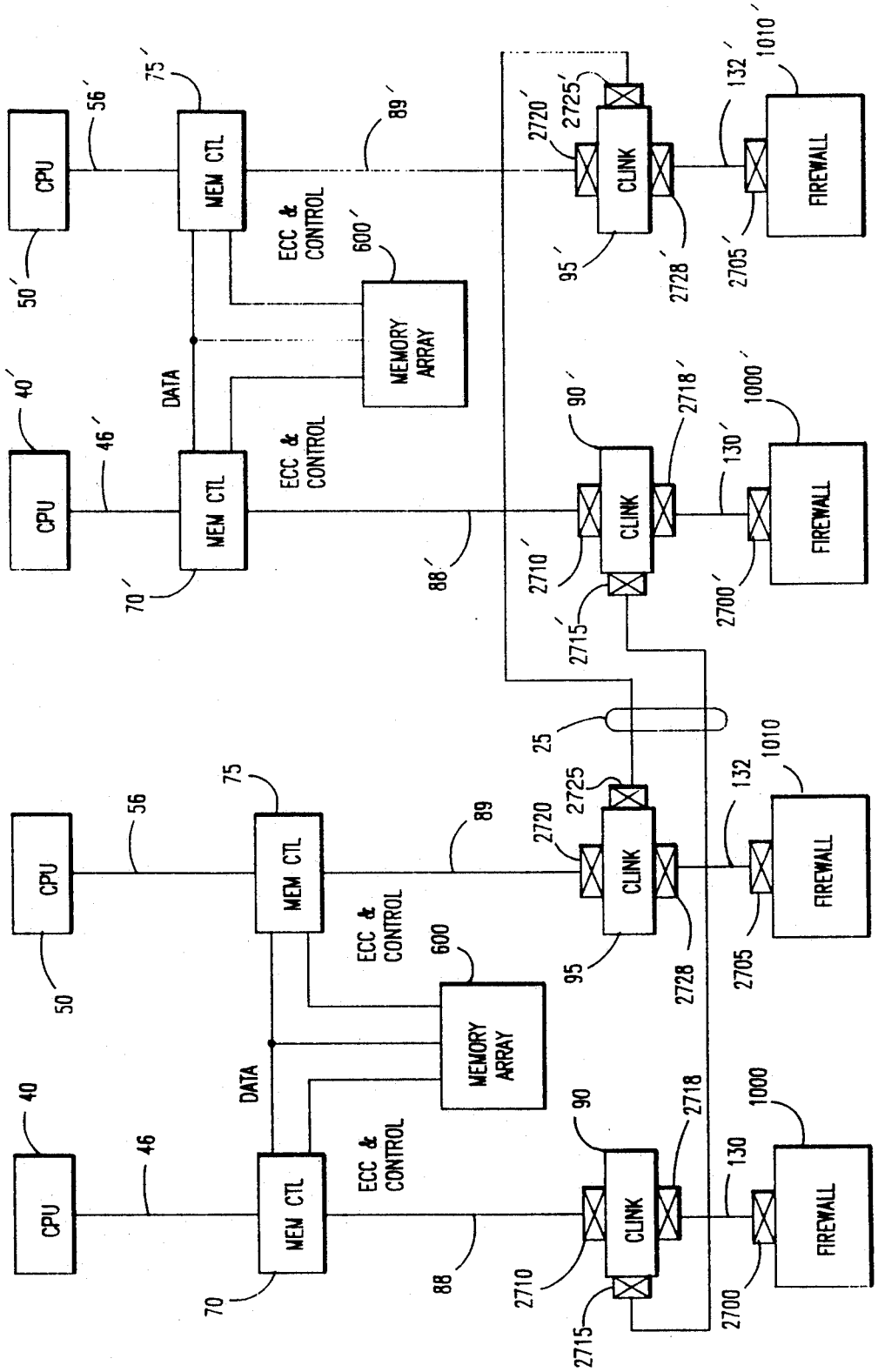
Figure 29:
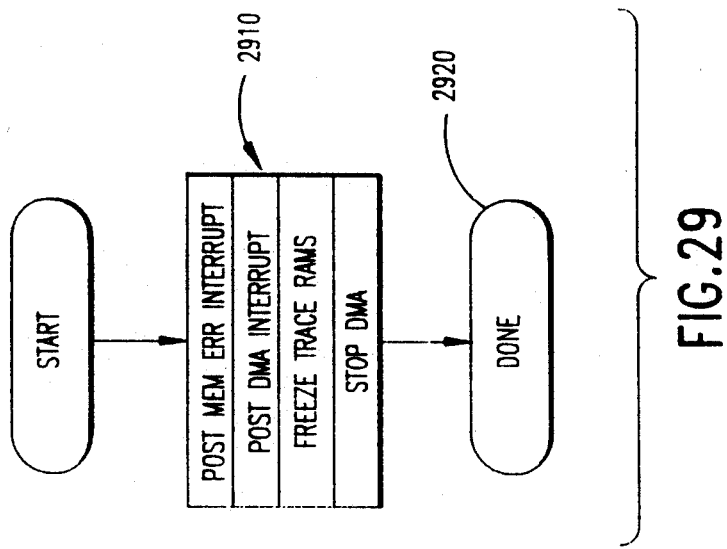
Figure 28:
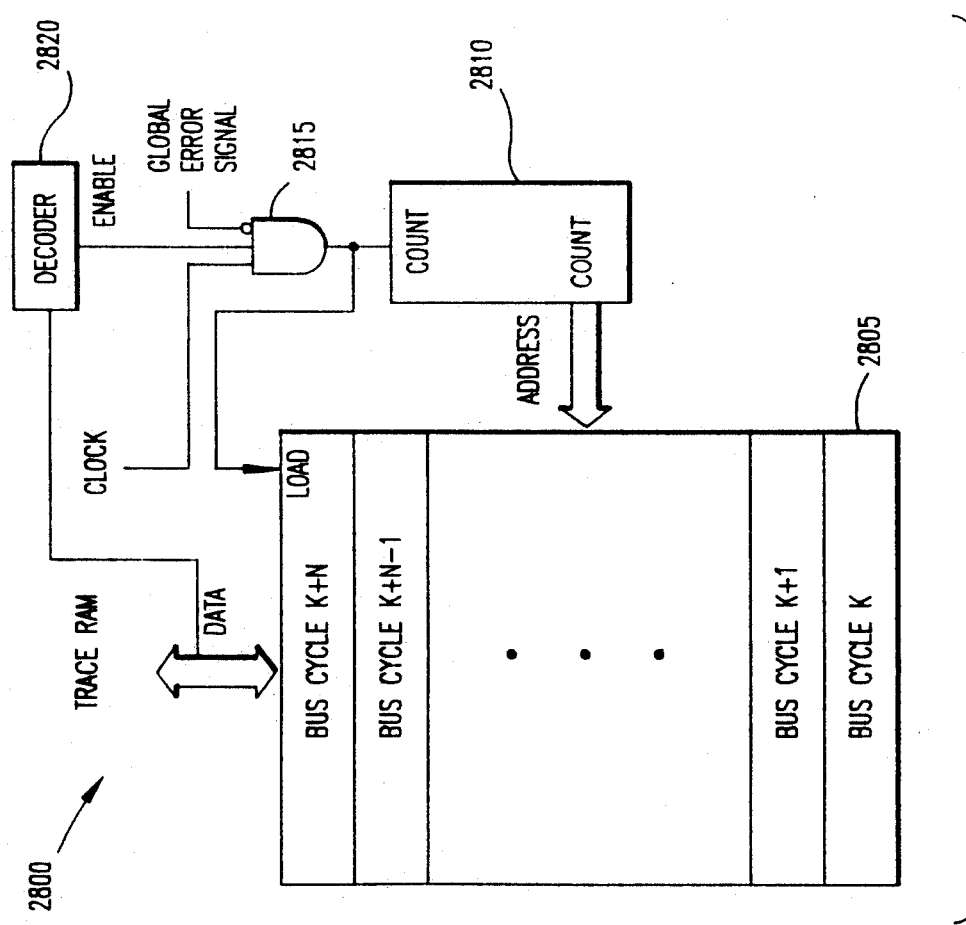
Figure 30:
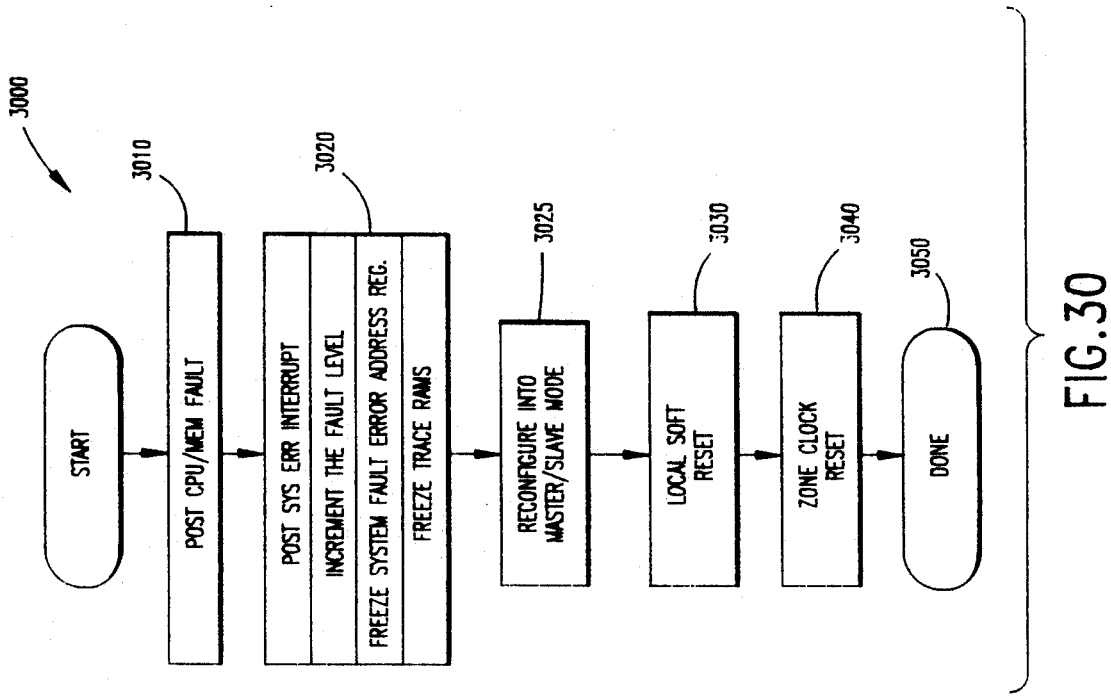
Figure 33:
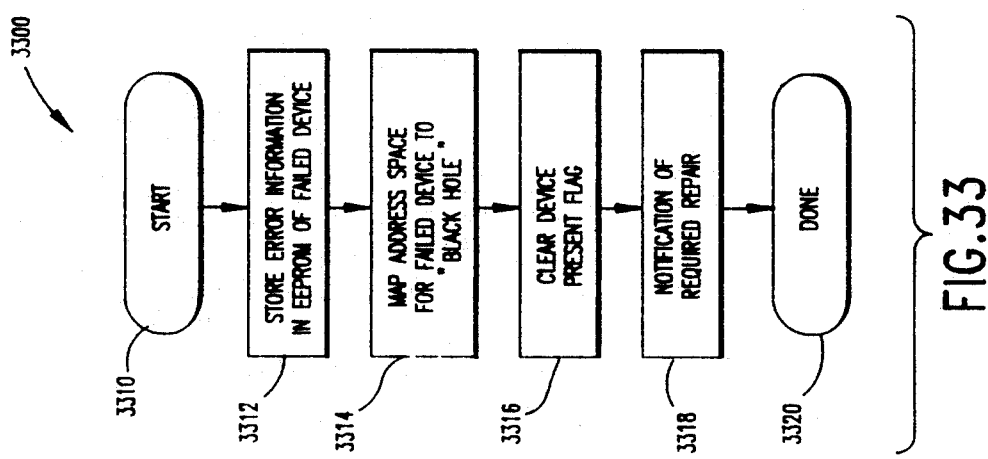
Figure 31:
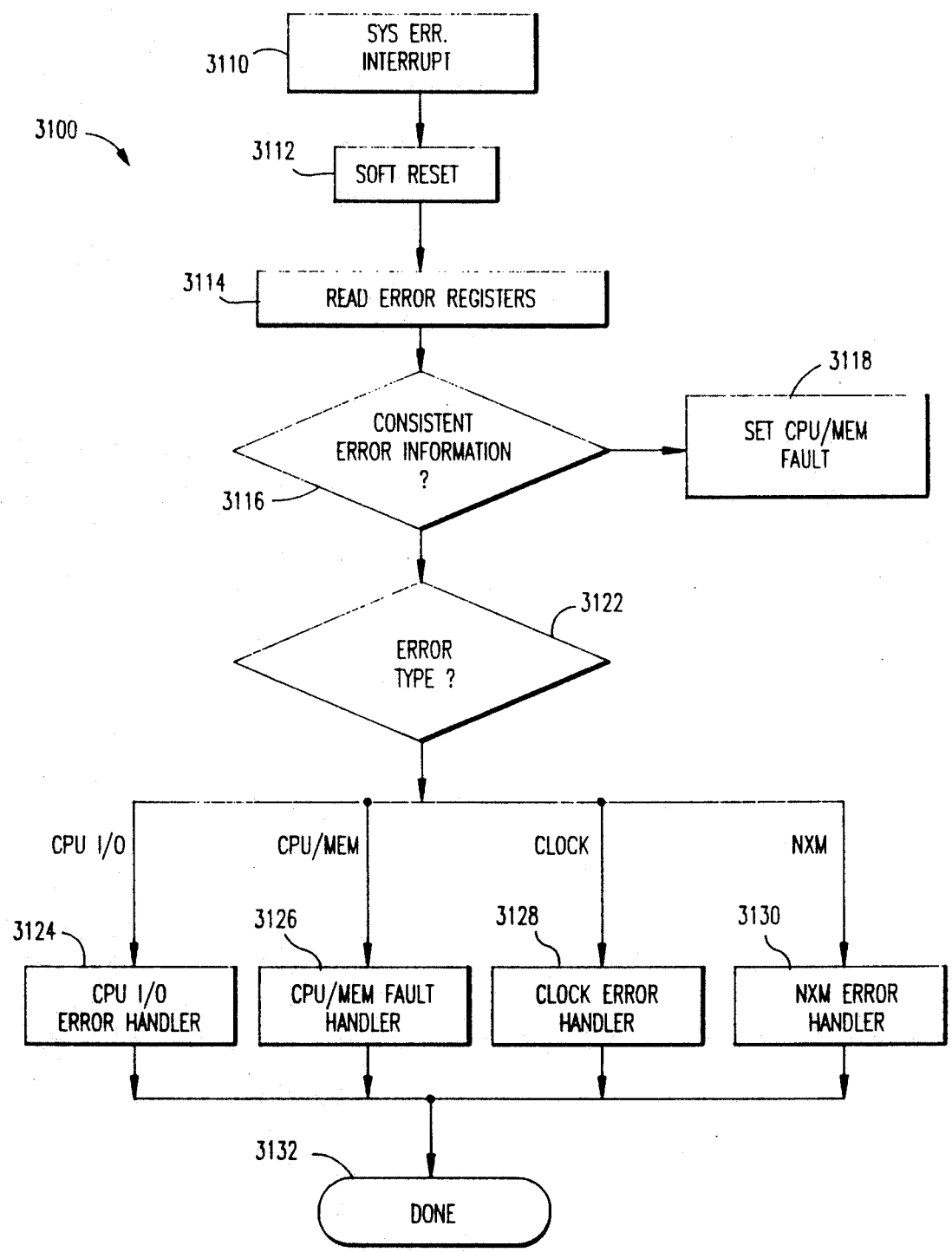
Figure 32:
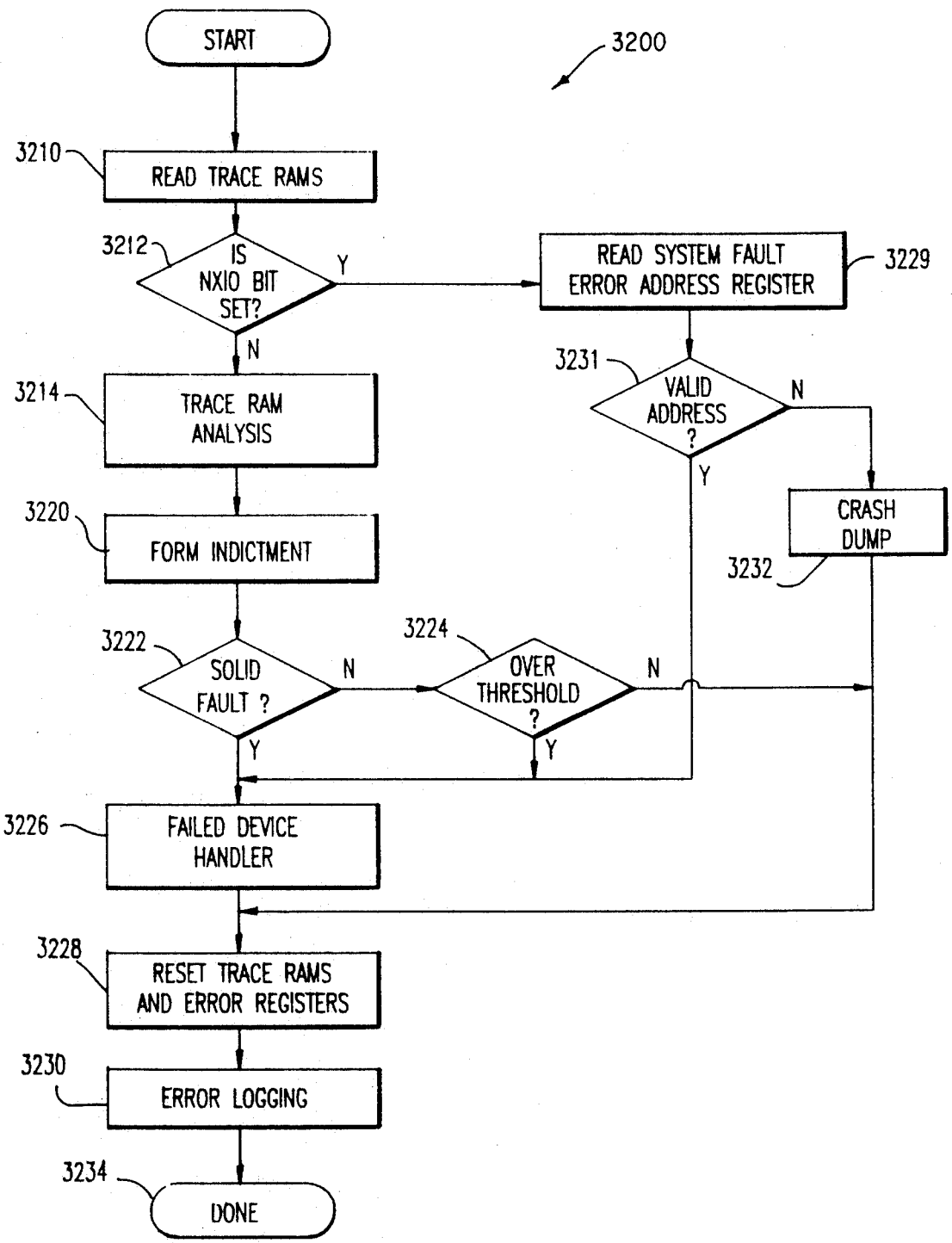
Figure 35:
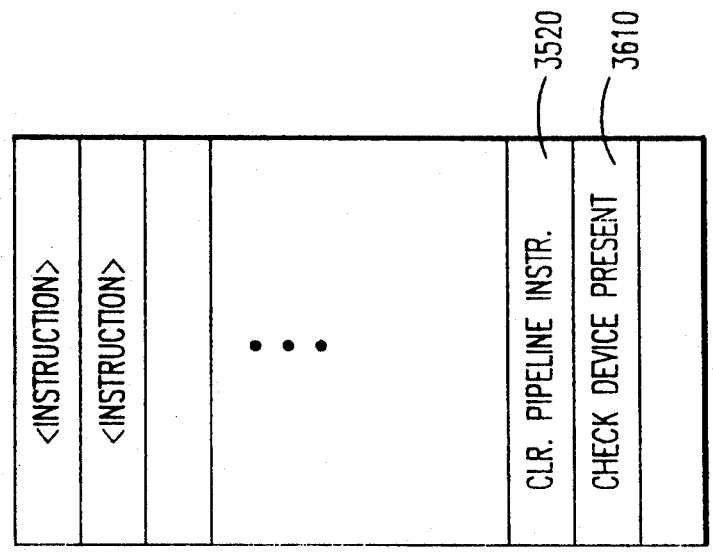
Figure 34:
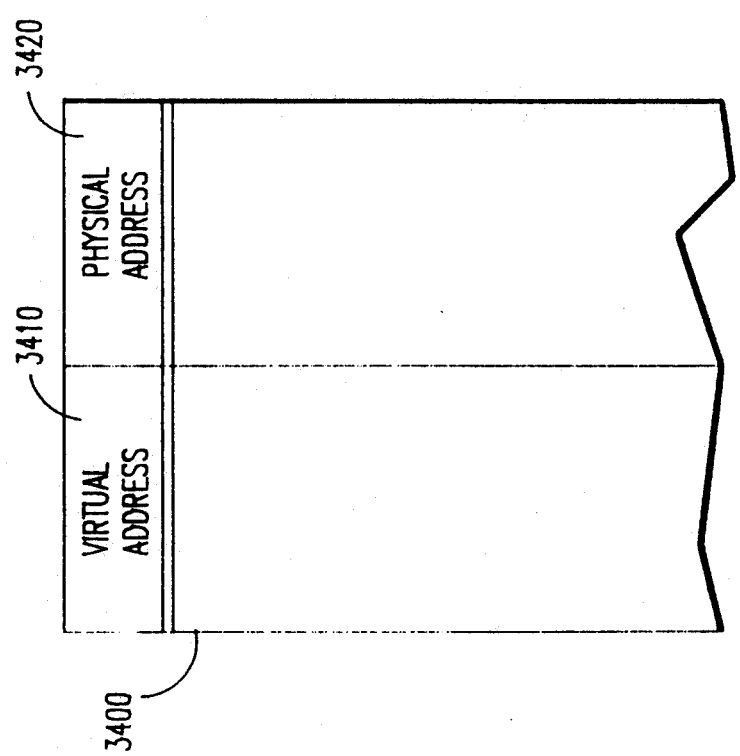
Figure 40:
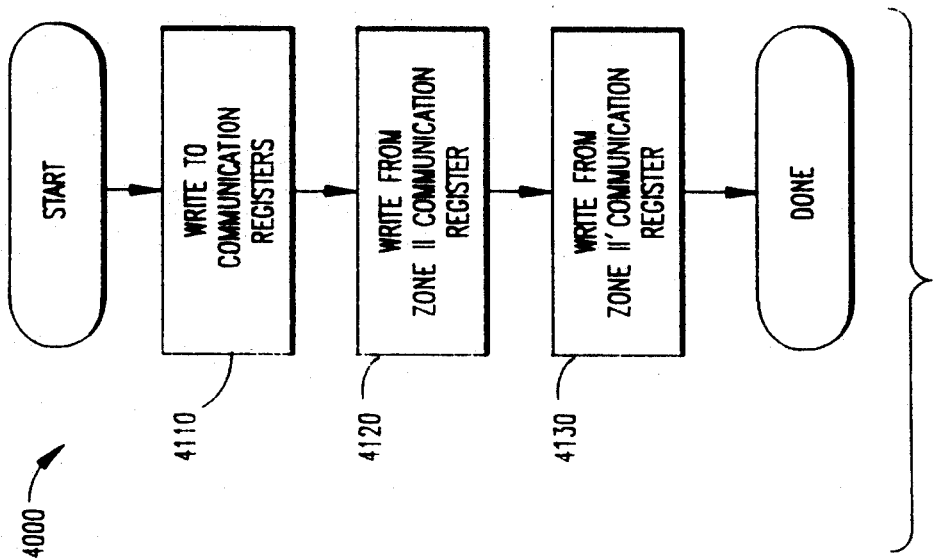
Figure 36:
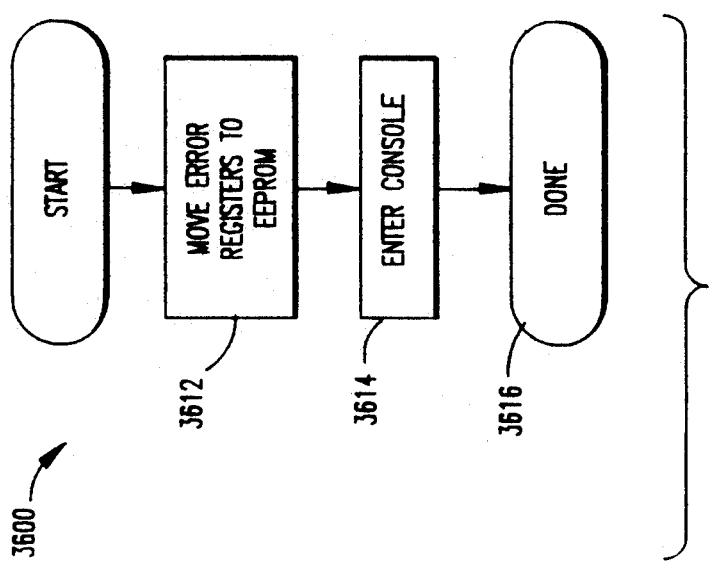
Figure 37:
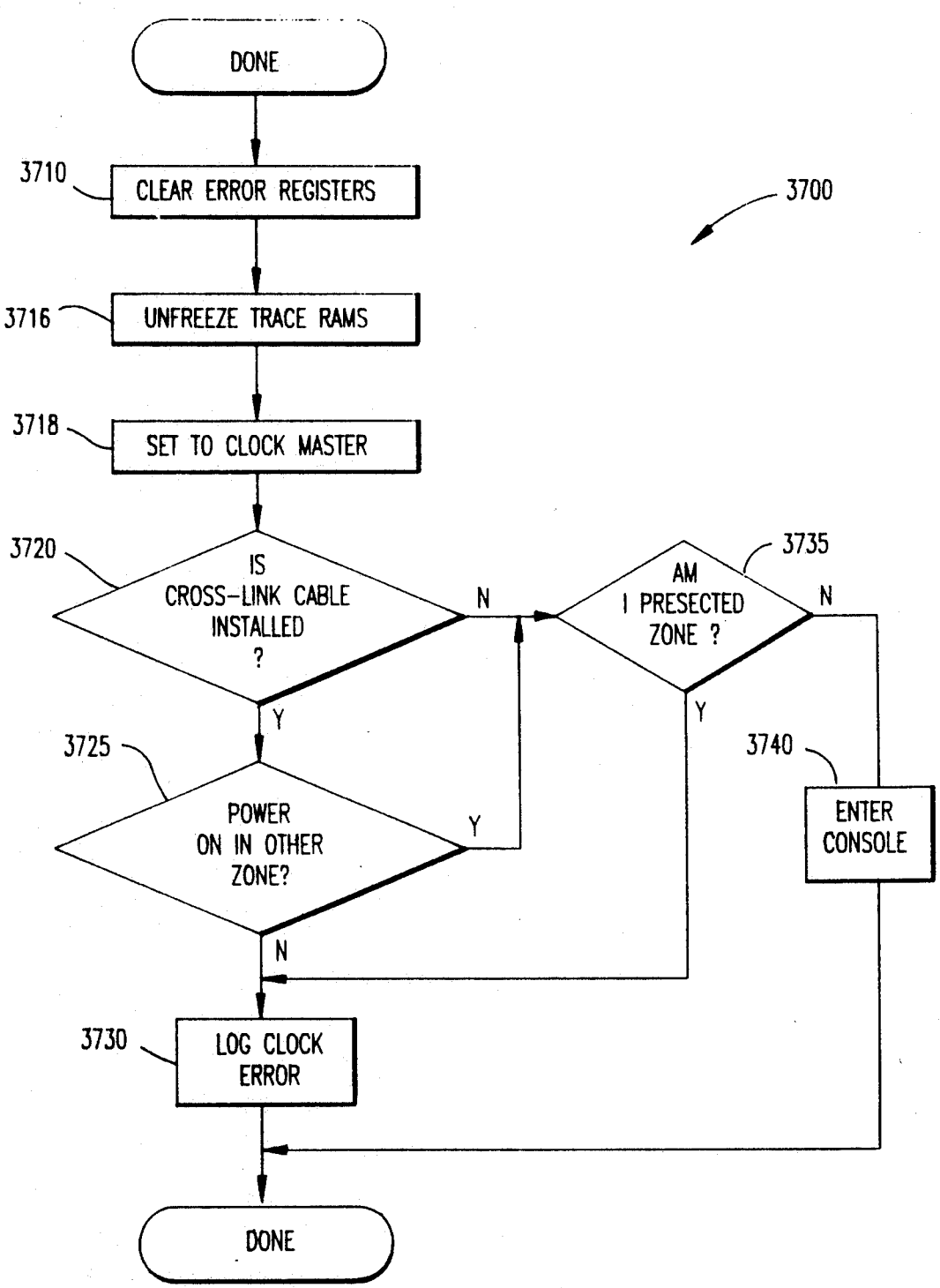
Figure 38:
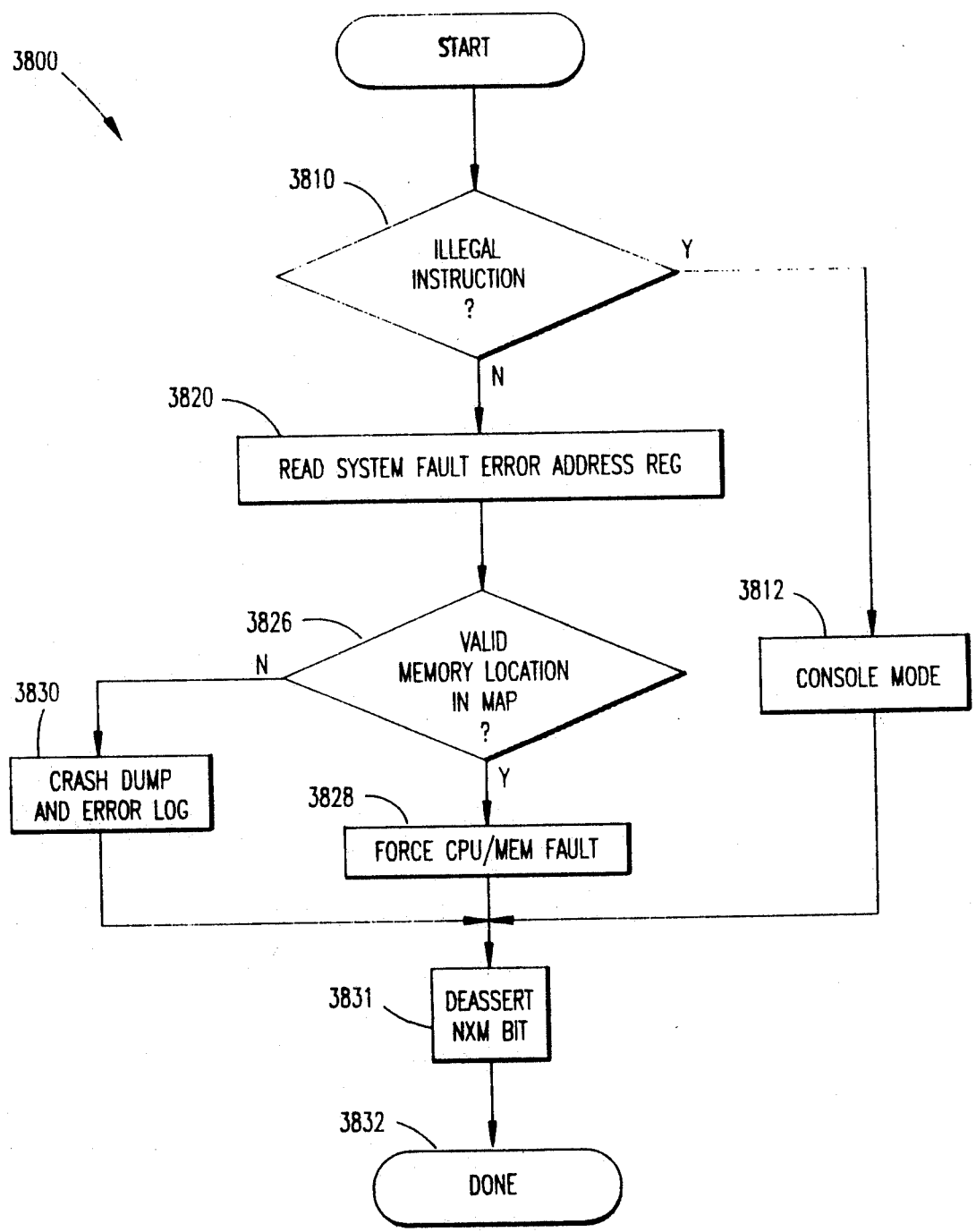
Figure 39:
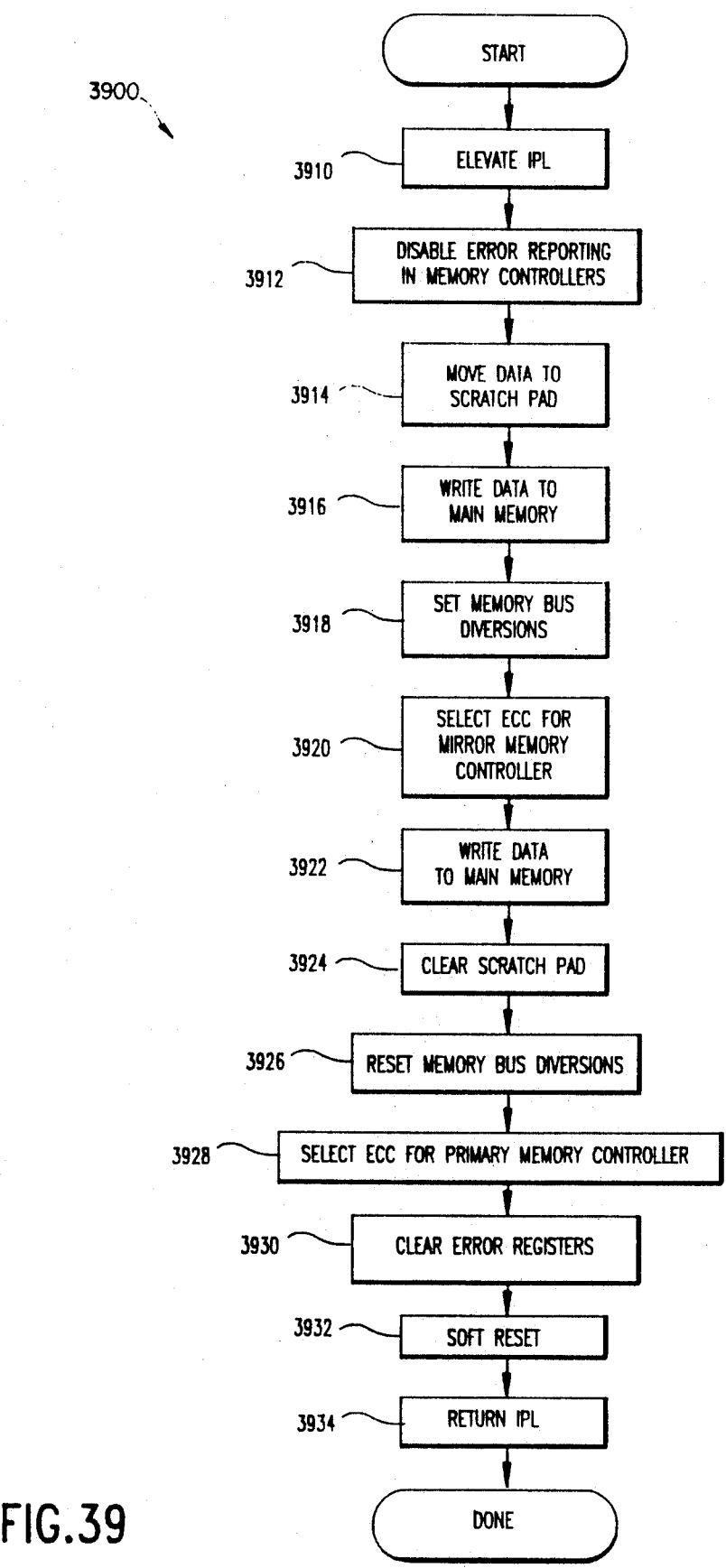

FIG. 25a and 25b, taken together, are a flow diagram of a procedure for handling CPU I/O errors within the process of FIG. 24;

FIG. 26 is a block diagram showing the error lines and various elements used in error handling procedures for the computer system in FIG. 1;

FIG. 27 is a block diagram showing the location of trace RAMs within the computer system in FIG. 1;

FIG. 28 is a block diagram of a trace RAM for the computer system of FIG. 1;

FIG. 29 is a flow diagram illustrating the procedure for recovering from a DMA error within the overall hardware error processing procedure of FIG. 24;

FIG. 30 is a flow diagram illustrating a procedure for handling CPU/MEM faults within the process of FIG. 24;

FIG. 31 is a flow diagram illustrating an overall software error handling procedure for the computer system in FIG. 1;

FIG. 32 is a flow diagram illustrating the CPU I/O error handler of FIG. 31;

FIG. 33 is a flow diagram illustrating the failed device handler of FIG. 32;

FIG. 34 is an illustration of a system address conversion table used in the computer system in FIG. 1;

FIG. 35 is an illustration of an example of a device driver used in the computer system in FIG. 1;

FIG. 36 is a flow diagram of the CPU/MEM fault handler of FIG. 31;

FIG. 37 is a flow diagram of the clock error handler of FIG. 31;

FIG. 38 is a flow diagram of the NXM error handler of FIG. 31;

FIG. 39 is a flow diagram illustrating a procedure for the conversion of rail unique data to zone data for the computer system in FIG. 1; and FIG. 40 is a flow diagram of a procedure to move zone data to system data.

IV. DESCRIPTION OF THE PREFERRED EMBODIMENT

Reference will now be made in detail to a presently preferred embodiment of the invention, an example of which is illustrated in the accompanying drawings.

A. SYSTEM DESCRIPTION

FIG. 1 is a block diagram of a fault tolerant computer system 10 in accordance with the present invention. Fault tolerant computer system 10 includes duplicate systems, called zones. In the normal mode, the two zones 11 and 11' operate simultaneously. The duplication ensures that there is no single point of failure and that a single error or fault in one of the zones 11 or 11' will not disable computer system 10. Furthermore, all such faults can be corrected by disabling or ignoring the device or element which caused the fault. Zones 11 and 11' are shown in FIG. 1 as respectively including duplicate processing systems 20 and 20'. The duality, however, goes beyond the processing system.

Figure 2:
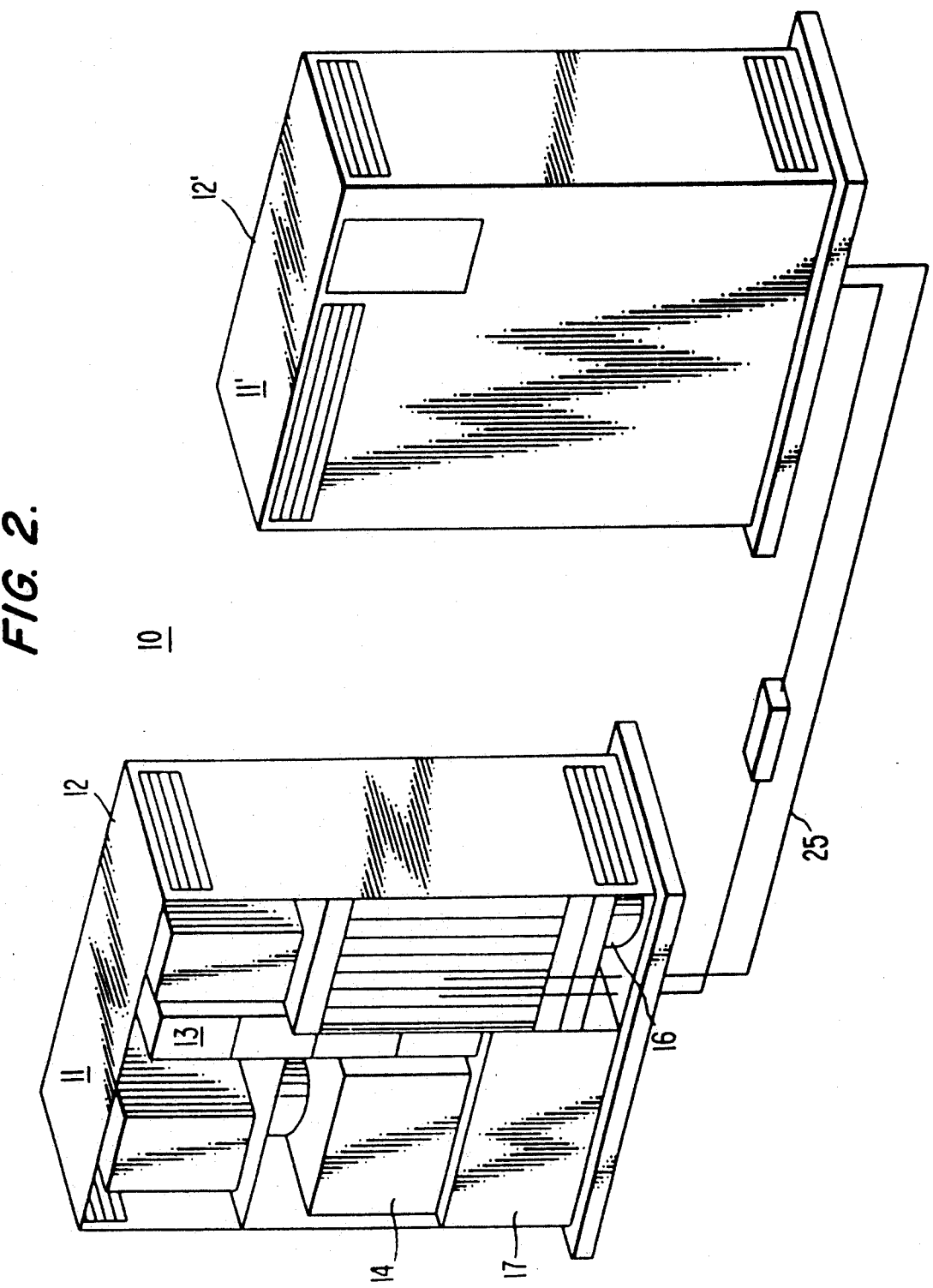
FIG. 2 is an illustration of the physical hardware containing the fault tolerant computer system in FIG. 1.

FIG. 2 contains an illustration of the physical hardware of fault tolerant computer system 10 and graphically illustrates the duplication of the systems. Each zone 11 and 11' is housed in a different cabinet 12 and 12', respectively. Cabinet 12 includes battery 13, power regulator 14, cooling fans 16, and AC input 17. Cabinet 12' includes separate elements corresponding to elements 13, 14, 16 and 17 of cabinet 12.

As explained in greater detail below, processing systems 20 and 20' include several modules interconnected by backplanes. If a module contains a fault or error, that module may be removed and replaced without disabling computing system 10. This is because processing systems 20 and 20' are physically separate, have separate backplanes into which the modules are plugged, and can operate independently of each other. Thus modules can be removed from and plugged into the backplane of one processing system while the other processing system continues to operate.

In the preferred embodiment, the duplicate processing systems 20 and 20' are identical and contain identical modules. Thus, only processing system 20 will be described completely with the understanding that processing system 20' operates equivalently.

Figure 3:
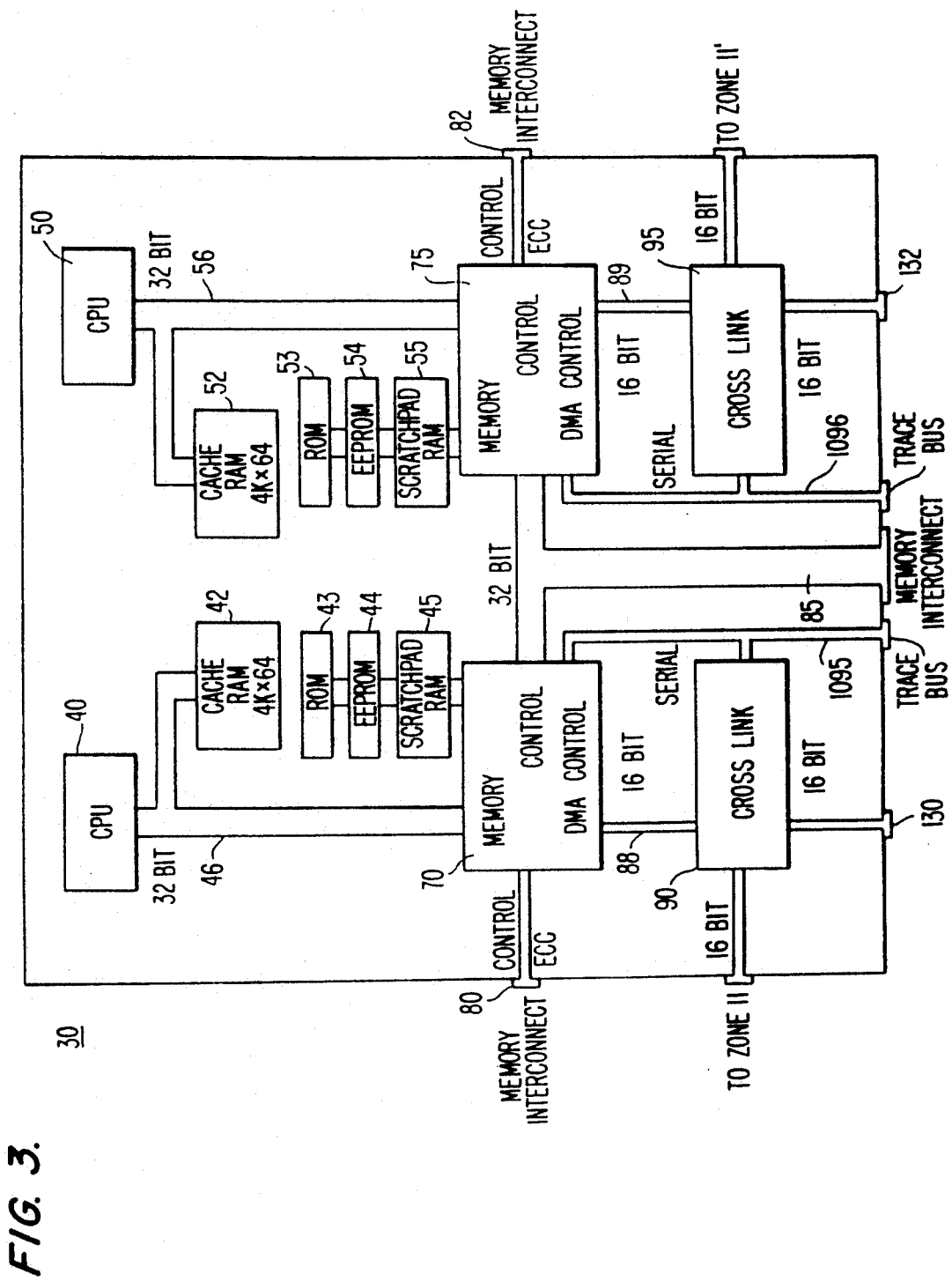
FIG. 3 is a block diagram of the CPU module shown in the fault tolerant computer system shown in FIG. 1.
Figure 4:
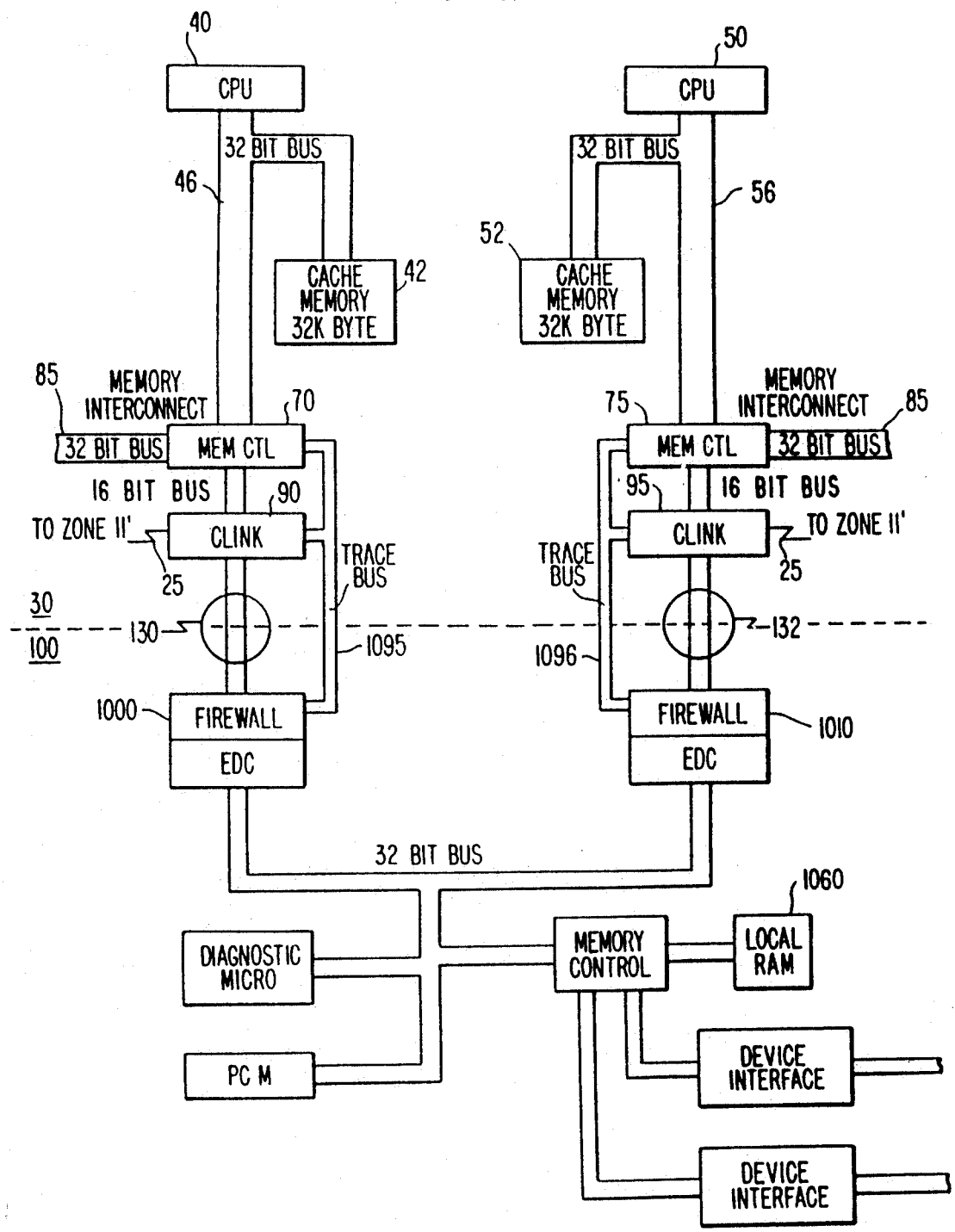
FIG. 4 is a block diagram of an interconnected CPU module and I/O module for the computer system shown in FIG. 1.

Processing system 20 includes CPU module 30 which is shown in greater detail in FIGS. 3 and 4. CPU module 30 is interconnected with CPU module 30' in processing system 20' by a cross-link pathway 25 which is described in greater detail below. Cross-link pathway 25 provides data transmission paths between processing systems 20 and 20' and carries timing signals to ensure that processing systems 20 and 20' operate synchronously.

Processing system 20 also includes I/O modules 100, 110, and 120. I/O modules 100, 110, 120, 100', 110' and 120' are independent devices. I/O module 100 is shown in greater detail in FIGS. 1, 4, and 17. Although multiple I/O modules are shown, duplication of such modules is not a requirement of the system. Without such duplication, however, some degree of fault tolerance will be lost.

Each of the I/O modules 100, 110 and 120 is connected to CPU module 30 by dual rail module interconnects 130 and 132. Module interconnects 130 and 132 serve as the I/O interconnect and are routed across the backplane for processing system 20. For purposes of this application, the data pathway including CPU 40, memory controller 70, cross-link 90 and module interconnect 130 is considered as one rail, and the data pathway including CPU 50, memory controller 75, cross-link 95, and module interconnect 132 is considered as another rail. During proper operation, the data on both rails is the same.

B. FAULT TOLERANT SYSTEM PHILOSOPHY

Fault tolerant computer system 10 does not have a single point of failure because each element is duplicated. Processing systems 20 and 20' are each a fail stop processing system which means that those systems can detect faults or errors in the subsystems and prevent uncontrolled propagation of such faults and errors to other subsystems, but they have a single point of failure because the elements in each processing system are not duplicated.

The two fail stop processing systems 20 and 20' are interconnected by certain elements operating in a defined manner to form a fail safe system. In the fail safe system embodied as fault tolerant computer system 10, the entire computer system can continue processing even if one of the fail stop processing systems 20 and 20' is faulting.

The two fail stop processing systems 20 and 20' are considered to operate in lockstep synchronism because CPUs 40, 50, 40' and 50' operate in such synchronism. There are three significant exceptions. The first is at initialization when a bootstrapping technique brings both processors into synchronism. The second exception is when the processing systems 20 and 20' operate independently (asynchronously) on two different workloads. The third exception occurs when certain errors arise in processing systems 20 and 20'. In this last exception, the CPU and memory elements in one of the processing systems is disabled, thereby ending synchronous operation.

When the system is running in lockstep I/O, only one I/O device is being accessed at any one time. All four CPUs 40, 50, 40' and 50', however, would receive the same data from that I/O device at substantially the same time. In the following discussion, it will be understood that lockstep synchronization of processing systems means that only one I/O module is being accessed.

The synchronism of duplicate processing systems 20 and 20' is implemented by treating each system as a deterministic machine which, starting in the same known state and upon receipt of the same inputs, will always enter the same machine states and produce the same results in the absence of error. Processing systems 20 and 20' are configured identically, receive the same inputs, and therefore pass through the same states. Thus, as long as both processors operate synchronously, they should produce the same results and enter the same state. If the processing systems are not in the same state or produce different results, it is assumed that one of the processing systems 20 and 20' has faulted. The source of the fault must then be isolated in order to take corrective action, such as disabling the faulting module.

Error detection generally involves overhead in the form of additional processing time or logic. To minimize such overhead, a system should check for errors as infrequently as possible consistent with fault tolerant operation. At the very least, error checking must occur before data is outputted from CPU modules 30 and 30'. Otherwise, internal processing errors may cause improper operation in external systems, like a nuclear reactor, which is the condition that fault tolerant systems are designed to prevent.

There are reasons for additional error checking. For example, to isolate faults or errors it is desirable to check the data received by CPU modules 30 and 30' prior to storage or use. Otherwise, when erroneous stored data is later accessed and additional errors result, it becomes difficult or impossible to find the original source of errors, especially when the erroneous data has been stored for some time. The passage of time as well as subsequent processing of the erroneous data may destroy any trail back to the source of the error.

"Error latency," which refers to the amount of time an error is stored prior to detection, may cause later problems as well. For example, a seldom-used routine may uncover a latent error when the computer system is already operating with diminished capacity due to a previous error. When the computer system has diminished capacity, the latent error may cause the system to crash.

Furthermore, it is desirable in the dual rail systems of processing systems 20 and 20' to check for errors prior to transferring data to single rail systems, such as a shared resource like memory. This is because there are no longer two independent sources of data after such transfers, and if any error in the single rail system is later detected, then error tracing becomes difficult if not impossible. The preferred method of error handling is set forth in an application filed this same date entitled, "Software Error Handling", Ser. No. 07/388,324, which is herein incorporated by reference.

C. MODULE DESCRIPTION

1. CPU Module

The elements of CPU module 30 which appear in FIG. 1 are shown in greater detail in FIGS. 3 and 4. FIG. 3 is a block diagram of the CPU module, and FIG. 4 shows block diagrams of CPU module 30 and I/O module 100 as well as their interconnections. Only CPU module 30 will be described since the operation of and the elements included in CPU modules 30 and 30' are generally the same.

CPU module 30 contains dual CPUs 40 and 50. CPUs 40 and 50 can be standard central processing units known to persons of ordinary skill. In the preferred embodiment, CPUs 40 and 50 are VAX microprocessors manufactured by Digital Equipment Corporation, the assignee of this application.

Associated with CPUs 40 and 50 are cache memories 42 and memory size for the CPUs. In the preferred embodiment, the cache RAM is 4K×64 bits. It is not necessary for the present invention to have a cache RAM, however.

2. Memory Module

Figure 5:
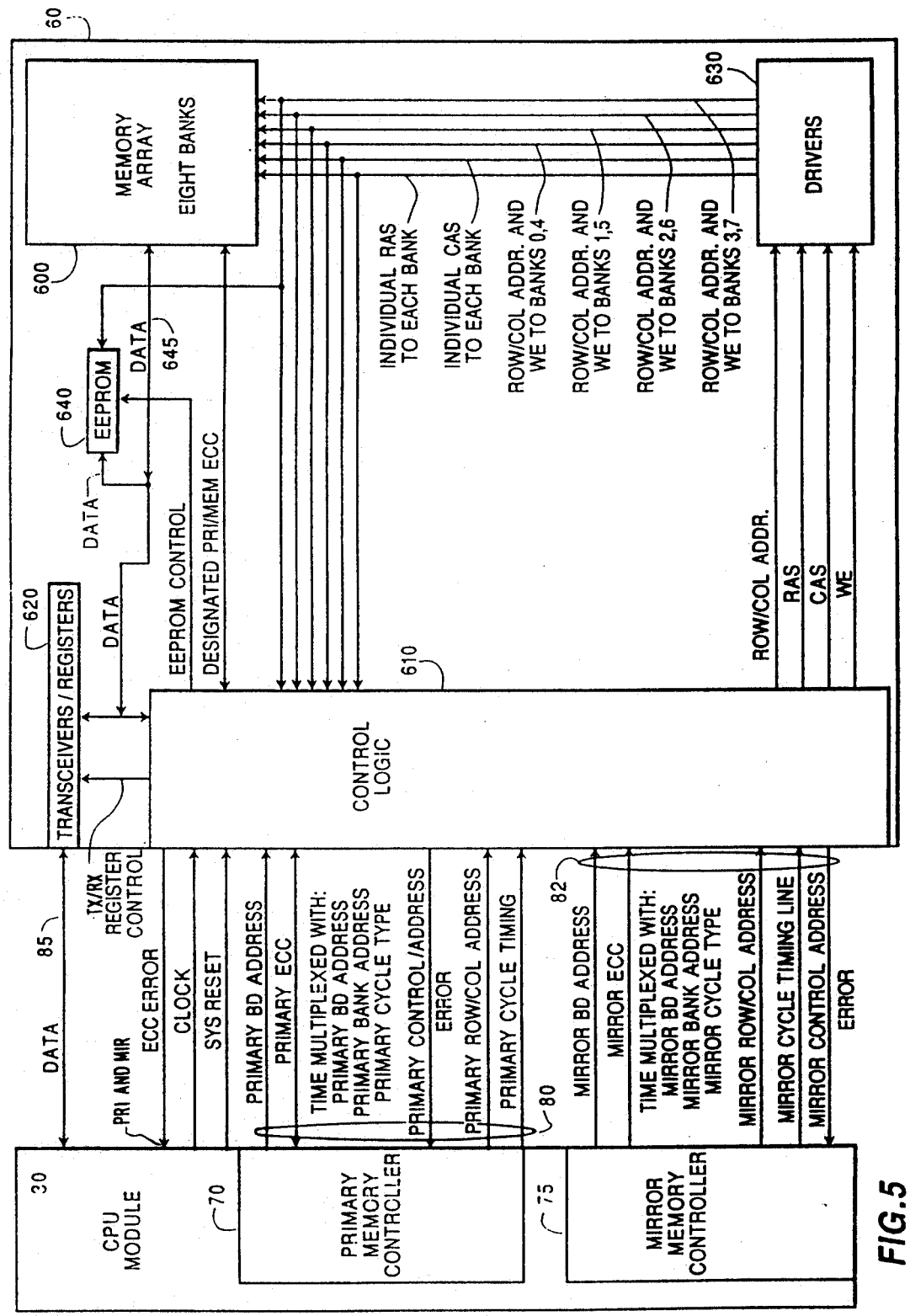
FIG. 5 is a block diagram of a memory module for the fault tolerant computer system shown in FIG. 1.

Preferably, CPU's 40 and 50 can share up to four memory modules 60. FIG. 5 is a block diagram of one memory module 60 shown connected to CPU module 30.

During memory transfer cycles, status register transfer cycles, and EEPROM transfer cycles, each memory module 60 transfers data to and from primary memory controller 70 via a bidirectional data bus 85. Each memory module 60 also receives address, control, timing, and ECC signals from memory controllers 70 and 75 via buses 80 and 82, respectively. The address signals on buses 80 and 82 include board, bank, and row and column address signals that identify the memory board, bank, and row and column address involved in the data transfer.

As shown in FIG. 5, each memory module 60 includes a memory array 600. Each memory array 600 is a standard RAM in which the DRAMs are organized into eight banks of memory. In the preferred embodiment, fast page mode type DRAMs are used.

Memory module 60 also includes control logic 610, data transceivers/registers 620, memory drivers 630, and an EEPROM 640. Data transceivers/receivers 620 provide a data buffer and data interface for transferring data between memory array 600 and the bidirectional data lines of data bus 85. Memory drivers 630 distribute row and column address signals and control signals from control logic 610 to each bank in memory array 600 to enable transfer of a longword of data and its corresponding ECC signals to or from the memory bank selected by the memory board and bank address signals.

EEPROM 640, which can be any type of NVRAM (nonvolatile RAM), stores memory error data for off-line repair and configuration data, such as module size. When the memory module is removed after a fault, stored data is extracted from EEPROM 640 to determine the cause of the fault. EEPROM 640 is addressed via row address lines from drivers 630 and by EEPROM control signals from control logic 610. EEPROM 640 transfers eight bits of data to and from a thirty-two bit internal memory data bus 645.

Control logic 610 routes address signals to the elements of memory module 60 and generates internal timing and control signals. As shown in greater detail in FIG. 6, control logic 610 includes a primary/mirror designator circuit 612.

Primary/mirror designator circuit 612 receives two sets of memory board address, bank address, row and column address, cycle type, and cycle timing signals from memory controllers 70 and 75 on buses 80 and 82, and also transfers two sets of ECC signals to or from the memory controllers on buses 80 and 82. Transceivers/registers in designator 612 provide a buffer and interface for transferring these signals to and from memory buses 80 and 82. A primary/mirror multiplexer bit stored in status registers 618 indicates which one of memory controllers 70 and 75 is designated as the primary memory controller and which is designated as the mirror memory controller, and a primary/mirror multiplexer signal is provided from status registers 618 to designator 612.

Primary/mirror designator 612 provides two sets of signals for distribution in control logic 610. One set of signals includes designated primary memory board address, bank address, row and column address, cycle type, cycle timing, and ECC signals. The other set of signals includes designated mirror memory board address, bank address, row and column address, cycle type, cycle timing, and ECC signals. The primary/mirror multiplexer signal is used by designator 612 to select whether the signals on buses 80 and 82 will be respectively routed to the lines for carrying designated primary signals and to the lines for carrying designated mirror signals, or vice-versa.

A number of time division multiplexed bidirectional lines are included in buses 80 and 82. At certain times after the beginning of memory transfer cycles, status register transfer cycles, and EEPROM transfer cycles, ECC signals corresponding to data on data bus 85 are placed on these time division multiplexed bidirectional lines. If the transfer cycle is a write cycle, memory module 60 receives data and ECC signals from the memory controllers. If the transfer cycle is a read cycle, memory module 60 transmits data and ECC signals to the memory controllers. At other times during transfer cycles, address, control, and timing signals are received by memory module 60 on the time division multiplexed bidirectional lines. Preferably, at the beginning of memory transfer cycles, status register transfer cycles, and EEPROM transfer cycles, memory controllers 70 and 75 transmit memory board address, bank address, and cycle type signals on these timeshared lines to each memory module 60.

Preferably, row address signals and column address signals are multiplexed on the same row and column address lines during transfer cycles. First, a row address is provided to memory module 60 by the memory controllers, followed by a column address about sixty nanoseconds later.

A sequencer 616 receives as inputs a system clock signal and a reset signal from CPU module 30, and receives the designated primary cycle timing, designated primary cycle type, designated mirror cycle timing, and designated mirror cycle type signals from the transceivers/registers in designator 612.

Sequencer 616 is a ring counter with associated steering logic that generates and distributes a number of control and sequence timing signals for the memory module that are needed in order to execute the various types of cycles. The control and sequence timing signals are generated from the system clock signals, the designated primary cycle timing signals, and the designated primary cycle type signals.

Sequencer 616 also generates a duplicate set of sequence timing signals from the system clock signals, the designated mirror cycle timing signals, and the designated mirror cycle type signals. These duplicate sequence timing signals are used for error checking. For data transfers of multi-long words of data to and from memory module 60 in a fast page mode, each set of column addresses starting with the first set is followed by the next column address 120 nanoseconds later, and each long word of data is moved across bus 85 120 nanoseconds after the previous long word of data.

Sequencer 616 also generates tx/rx register control signals. The tx/rx register control signals are provided to control the operation of data transceivers/registers 620 and the transceivers/registers in designator 612. The direction of data flow is determined by the steering logic in sequencer 616, which responds to the designated primary cycle type signals by generating tx/rx control and sequence timing signals to indicate whether and when data and ECC signals should be written into or read from the transceivers/registers in memory module 60. Thus, during memory write cycles, status register write cycles, and EEPROM write cycles, data and ECC signals will be latched into the transceivers/registers from buses 80, 82, and 85, while during memory read cycles, status register read cycles, and EEPROM read cycles, data and ECC signals will be latched into the transceivers/registers from memory array 600, status registers 618, or EEPROM 640 for output to CPU module 30.

Sequencer 616 also generates EEPROM control signals to control the operation of EEPROM 640.

The timing relationships that exist in memory module 60 are specified with reference to the rise time of the system clock signal, which has a period of thirty nanoseconds. All status register read and write cycles, and all memory read and write cycles of a single longword, are performed in ten system clock periods, i.e., 300 nanoseconds. Memory read and write transfer cycles may consist of multi-longword transfers. For each additional longword that is transferred, the memory transfer cycle is extended for four additional system clock periods. Memory refresh cycles and EEPROM write cycles require at least twelve system clock periods to execute, and EEPROM read cycles require at least twenty system clock periods.

The designated primary cycle timing signal causes sequencer 616 to start generating the sequence timing and control signals that enable the memory module selected by the memory board address signals to implement a requested cycle. The transition of the designated primary cycle timing signal to an active state marks the start of the cycle. The return of the designated primary cycle timing signal to an inactive state marks the end of the cycle.

The sequence timing signals generated by sequencer 616 are associated with the different states entered by the sequencer as a cycle requested by CPU module 30 is executed. In order to specify the timing relationship among these different states (and the timing relationship among sequence timing signals corresponding to each of these states), the discrete states that may be entered by sequencer 616 are identified as states SEQ IDLE and SEQ 1 to SEQ 19. Each state lasts for a single system clock period (thirty nanoseconds). Entry by sequencer 616 into each different state is triggered by the leading edge of the system clock signal. The leading edges of the system clock signal that cause sequencer 616 to enter states SEQ IDLE and SEQ 1 to SEQ 19 are referred to as transitions T IDLE and T1 to T19 to relate them to the sequencer states, i.e., TN is the system clock signal leading edge that causes sequencer 616 to enter state SEQ N.

At times when CPU module 30 is not directing memory module 60 to execute a cycle, the designated primary cycle timing signal is not asserted, and the sequencer remains in state SEQ IDLE. The sequencer is started (enters state SEQ 1) in response to assertion by memory controller 70 of the cycle timing signal on bus 80, provided control logic 610 and sequencer 616 are located in the memory module selected by memory board address signals also transmitted from memory controller 70 on bus 80. The rising edge of the first system clock signal following assertion of the designated primary cycle active signal corresponds to transition T1.

As indicated previously, in the case of transfers of a single longword to or from memory array 600, the cycle is performed in ten system clock periods. The sequencer proceeds from SEQ IDLE, to states SEQ 1 through SEQ 9, and returns to SEQ IDLE.

Memory read and write cycles may be extended, however, to transfer additional longwords. Memory array 600 preferably uses "fast page mode" DRAMs. During multi-longword reads and writes, transfers of data to and from the memory array after transfer of the first longword are accomplished by repeatedly updating the column address and regenerating a CAS (column address strobe) signal.

During multi-longword transfer cycles, these updates of the column address can be implemented because sequencer 616 repeatedly loops from states SEQ 4 through SEQ 7 until all of the longwords are transferred. For example, if three longwords are being read from or written into memory array 600, the sequencer enters states SEQ IDLE, SEQ 1, SEQ 2, SEQ 3, SEQ 4, SEQ 5, SEQ 6, SEQ 7, SEQ 4, SEQ 5, SEQ 6, SEQ 7, SEQ 4, SEQ 5, SEQ 6, SEQ 7, SEQ 8, SEQ 9, and SEQ IDLE.

During a memory transfer cycle, the designated primary cycle timing signal is monitored by sequencer 616 during transition T6 to determine whether to extend the memory read or write cycle in order to transfer at least one additional longword. At times when the designated primary cycle timing signal is asserted during transition T6, the sequencer in state SEQ 7 will respond to the next system clock signal by entering state SEQ 4 instead of entering state SEQ 8.

In the case of a multi-longword transfer, the designated primary cycle timing signal is asserted at least fifteen nanoseconds before the first T6 transition and remains asserted until the final longword is transferred. In order to end a memory transfer cycle after the final longword has been transferred, the designated primary cycle timing signal is deasserted at least fifteen nanoseconds before the last T6 transition and remains deasserted for at least ten nanoseconds after the last T6 transition.

During memory transfer cycles, the designated primary row address signals and the designated primary column address signals are presented at different times by designator 612 in control logic 610 to memory drivers 630 on a set of time division multiplexed lines. The outputs of drivers 630 are applied to the address inputs of the DRAMs in memory array 600, and also are returned to control logic 610 for comparison with the designated mirror row and column address signals to check for errors. During status register transfer cycles and EEPROM transfer cycles, column address signals are not needed to select a particular storage location.

During a memory transfer cycle, row address signals are the first signals presented on the timeshared row and column address lines of buses 80 and 82. During state SEQ IDLE, row address signals are transmitted by the memory controllers on the row and column address lines, and the row address is stable from at least fifteen nanoseconds before the T1 transition until ten nanoseconds after the T1 transition. Next, column address signals are transmitted by the memory controllers on the row and column address lines, and the column address is stable from at least ten nanoseconds before the T3 transition until fifteen nanoseconds after the T4 transition. In the case of multi-longword transfers during memory transfer cycles, subsequent column address signals are then transmitted on the row and column address lines, and these subsequent column addresses are stable from ten nanoseconds before the T6 transition until fifteen nanoseconds after the T7 transition.

Generator/checker 617 receives the two sets of sequence timing signals generated by sequencer 616. In addition, the designated primary cycle type and bank address signals and the designated mirror cycle type and bank address signals are transmitted to generator/checker 617 by designator 612. In the generator/checker, a number of primary control signals, i.e., RAS (row address strobe), CAS (column address strobe), and WE (write enable), are generated for distribution to drivers 630, using the primary sequence timing signals and the designated primary cycle type and bank address signals. A duplicate set of these control signals is generated by generator/checker 617 from the duplicate (mirror) sequence timing signals and the designated mirror cycle type and bank address signals. These mirror RAS, CAS, and write enable signals are used for error checking.

When the primary cycle type signals indicate a memory transfer cycle is being performed, the primary bank address signals identify one selected bank of DRAMs in memory array 600. Memory drivers 630 include separate RAS drivers for each bank of DRAMs in memory array 600. In generator/checker 617, the primary RAS signal is generated during the memory transfer cycle and demultiplexed onto one of the lines connecting the generator/checker to the RAS drivers. As a result, only the RAS driver corresponding to the selected DRAM bank receives an asserted RAS signal during the memory transfer cycle. During refresh cycles, the primary RAS signal is not demultiplexed and an asserted RAS signal is received by each RAS driver. During status register transfer cycles and EEPROM transfer cycles, the bank address signals are unnecessary.

Memory drivers 630 also include CAS drivers. In generator/checker 617, the primary CAS signal is generated during memory transfer cycles and refresh cycles. The primary CAS signal is not demultiplexed and an asserted CAS signal is received by each CAS driver.

During memory write cycles, the primary WE signal is generated by generator/checker 617. The asserted WE signal is provided by drivers 630 to each DRAM bank in memory array 600. However, a write can only be executed by the selected DRAM bank, which also receives asserted RAS and CAS signals.

In the preferred embodiment of the invention, during memory transfer cycles the primary RAS signal is asserted during the T2 transition, is stable from at least ten nanoseconds before the T3 transition, and is deasserted during the last T7 transition. The primary CAS signal is asserted fifteen nanoseconds after each T4 transition, and is deasserted during each T7 transition. During memory write cycles the primary WE signal is asserted during the T3 the first T4 transition and is deasserted during the last T7 transition.

When the primary cycle type signals indicate a memory refresh cycle is being performed, generator/checker 617 causes memory array 600 to perform memory refresh operations in response to the primary sequence timing signals provided by sequencer 616. During these refresh operations, the RAS and CAS signals are generated and distributed by the generator/checker in reverse order. This mode of refresh requires no external addressing for bank, row, or column.

During transfer cycles, ECC signals are transferred on the time division multiplexed bidirectional lines of buses 80 and 82 at times when data is being transferred on bus 85. However, these same lines are used to transfer control (e.g., cycle type) and address (e.g., memory board address and bank address) signals at other times during the transfer cycle.

The transceivers/registers in primary/mirror designator 612 include receivers and transmitters that are responsive to sequence timing signals and tx/rx register control signals provided by sequencer 616. The sequence timing signals and tx/rx register control signals enable multiplexing of ECC signals and address and control signals on the time division multiplexed bidirectional lines of buses 80 and 82.

Preferably, control and address signals, such as cycle type, memory board address, and bank address signals, are transmitted by memory controllers 70 and 75 and presented on the timeshared lines of buses 80 and 82 at the beginning of either single or multi-longword transfer cycles. These signals start their transition (while the sequencer is in the SEQ IDLE state) concurrent with activation of the cycle timing signal, and remain stable through T2. Therefore, in the transceivers/registers of designator 612, the receivers are enabled and the transmitters are set into their tristate mode at least until the end of state SEQ 2.

The cycle type signals identify which of the following listed functions will be performed by memory array 60 during the cycle: memory read, memory write, status register read, status register write, EEPROM read, EEPROM write, and refresh. The designated primary cycle type signals received by designator 612 are provided to sequencer 616 and used in generating tx/rx control signals and sequence timing signals. For example, in data transceivers/registers 620 and in the transceivers/registers of designator 612, the receivers are enabled and the transmitters are set into their tristate mode by sequencer 616 throughout a write cycle. However, in data transceivers/registers 620 and in the transceivers/registers of designator 612 during a read cycle, the receivers are set into their tristate mode and the transmitters are enabled by sequencer 616 after the cycle type, memory board address, and bank address signals have been received at the beginning of the cycle.

In the preferred embodiment, data transferred to or from memory array 600 is checked in each memory module 60 using an Error Detecting Code (EDC), which is preferably the same code required by memory controllers 70 and 75. The preferred code is a single bit correcting, double bit detecting, error correcting code (ECC).

During a memory write cycle, memory controller 70 transmits at least one longword of data on data bus 85 and simultaneously transmits a corresponding set of ECC signals on bus 80. Meanwhile, memory controller 75 transmits a second set of ECC signals, which also correspond to the longword on data bus 85, on bus 82.

As embodied herein, during a memory write cycle the data and the ECC signals for each longword are presented to the receivers of data transceivers/registers 620 and to the receivers of the transceivers/registers of designator 612. The data and the ECC signals, which are stable at least ten nanoseconds before the T4 transition and remain stable until fifteen nanoseconds after the T6 transition, are latched into these transceivers/registers. During this time period, memory controllers 70 and 75 do not provide address and control signals on the timeshared lines of buses 80 and 82.

The designated primary ECC signals received by designator 612 and the longword of data received by transceivers/registers 620 during the memory write cycle are provided to the data inputs of the DRAMs in each of the eight banks of memory array 600 and to ECC generator 623. The generated ECC is compared to the designated primary ECC by comparator 625. The designated primary ECC signals also are provided to ECC comparators 625, together with the designated mirror ECC signals.

As embodied herein, during a memory read cycle, at least one longword of data and a corresponding set of ECC signals are read from memory array 600 and respectively steered to data transceivers/registers 620 and to the transceivers/registers of designator 612. During transition T7 of the memory read cycle, the data and the ECC signals for each longword are available from memory array 600 and are latched into these transceivers/registers. The data is also presented to the ECC generator 623 and its output is compared to the ECC read from memory.

After latching, the data and the ECC signals are presented to data bus 85 and to buses 80 and 82 by the transmitters of data transceivers/registers 620 and by the transmitters of the transceivers/registers of designator 612. The same ECC signals are transmitted from the transceivers/registers in designator 612 to memory controller 70 and to memory controller 75. The data and the ECC signals transmitted on data bus 85 and on buses 80 and 82 are stable from fifteen nanoseconds after the T7 transition until five nanoseconds before the following T6 transition (in the case of a multi-longword transfer) or until five nanoseconds before the following T IDLE transition (in the case of a single longword transfer or the last longword of a multi-longword transfer).

During this time period, memory controllers 70 and 75 do not provide address and control signals on the time-shared lines of buses 80 and 82. The transmitters of data transceivers/registers 620 and the transmitters of the transceivers/registers of designator 612 are set into their tristate mode during the following T IDLE transition.

Comparator 614 is provided to compare the address, control, and timing signals originating from controller 70 with the corresponding address, control, and timing signals originating from controller 75. The designated primary cycle timing signals, cycle type signals, memory board address signals, and bank address signals, together with the designated mirror cycle timing signals, cycle type signals, memory board address signals, bank address signals, row address signals, and column address signals, are provided from designator 612 to comparator 614. The designated primary row address signals and column address signals are provided from the outputs of drivers 630 to comparator 614. Both sets of signals are then compared.

Figure 6:
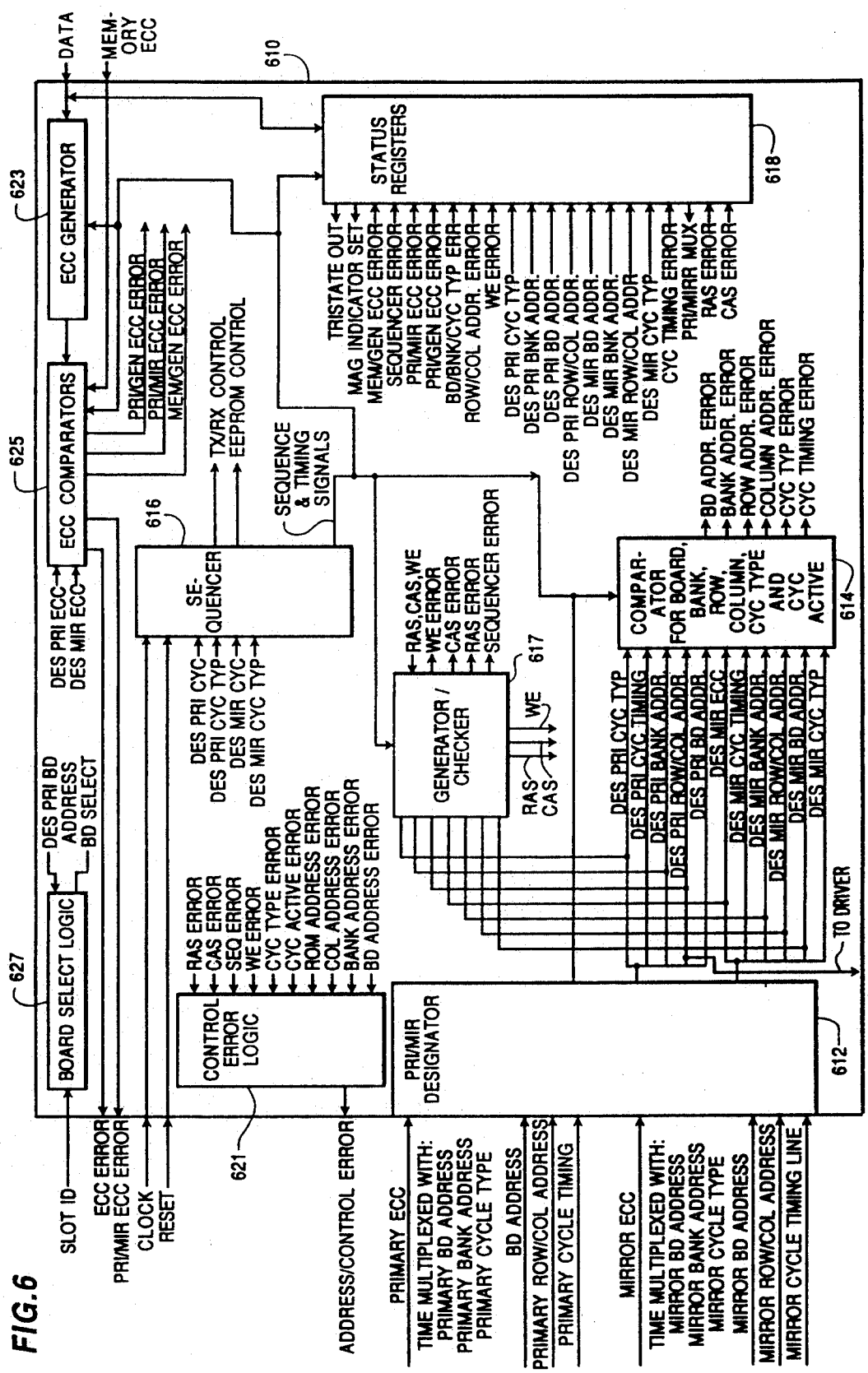
FIG. 6 is a detailed diagram of the elements of the control logic in the memory module shown in FIG. 5.

If there is a miscompare between any of the address, control, and timing signals originating from the memory controllers, comparator 614 generates an appropriate error signal. As shown in FIG. 6, board address error, bank address error, row address error, column address error, cycle type address error and cycle timing error signals may be output by the comparator.

Generator/checker 617 compares the primary control and timing signals generated by sequencer 616 and generator/checker 617 using the designated primary bank address, cycle type, and cycle timing signals with the mirror control and timing signals generated using the designated mirror bank address, cycle type, and cycle timing signals. The two sets of sequence timing signals are provided by sequencer 616 to generator/checker 617. The primary RAS, CAS, and WE signals are provided from the outputs of drivers 630 to generator/checker 617. As indicated previously, the mirror RAS, CAS, and WE signals are generated internally by the generator/checker. Generator/checker 617 compares the primary RAS, CAS, WE, and sequence timing signals to the mirror RAS, CAS, WE, and sequence timing signals.

If there is a miscompare between any of the control and timing signals originating from sequencer 616 or generator/checker 617, the generator/checker generates an appropriate error signal. As shown in FIG. 6, sequencer error, RAS error, CAS error, and WE error signals may be output by generator/checker 617.

Error signals are provided from comparator 614 and from generator/checker 617 to address/control error logic 621. In response to receipt of an error signal from comparator 614 or from generator/checker 617, address/control error logic 621 transmits an address/control error signal to CPU module 30 to indicate the detection of a fault due to a miscompare between any address, control, or timing signals. The address/control error signal is sent to error logic in memory controllers 70 and 75 for error handling. The transmission of the address/control error signal to CPU module 30 causes a CPU/MEM fault, which is discussed in greater detail in other sections.

The error signals from comparator 614 and from generator/checker 617 also are provided to status registers 618. In the status registers, the error signals and all of the address, control, timing, data, and ECC signals relevant to the fault are temporarily stored to enable error diagnosis and recovery.

In accordance with one aspect of the invention, only a single thirty-two bit data bus 85 is provided between CPU module 30 and memory module 60. Therefore, memory module 60 cannot compare two sets of data from memory controllers 70 and 75. However, data integrity is verified by memory module 60 without using a duplicate set of thirty-two data lines by checking the two separate sets of ECC signals that are transmitted by memory controllers 70 and 75 to memory module 60.

As shown in FIG. 6, control logic 610 includes ECC generator 623 and ECC comparators 625. The designated primary and mirror ECC signals are provided by designator 612 to the ECC comparators. During a memory write cycle, the designated primary ECC signals are compared to the designated mirror ECC signals. As a result, memory module 60 verifies whether memory controllers 70 and 75 are in agreement and whether the designated primary ECC signals being stored in the DRAMs of memory array 600 during the memory write cycle are correct. Furthermore, the data presented to the data inputs of the DRAMs during the memory write cycle is provided to ECC generator 623. ECC generator 623 produces a set of generated ECC signals that correspond to the data and provides the generated ECC signals to ECC comparators 625. The designated primary ECC signals are compared to the generated ECC signals to verify whether the data transmitted on data bus 85 by memory controller 70 is the same as the data being stored in the DRAMs of memory array 600.

During a memory read cycle, the data read from the selected bank of DRAMs is presented to the ECC generator. The generated ECC signals then are provided to the ECC comparators, which also receive stored ECC signals read from the selected bank of DRAMs. The generated and stored ECC signals are compared by ECC comparators 625.

If there is a miscompare between any of pairs of ECC signals monitored by ECC comparators 625, the ECC comparators generate an appropriate error signal. As shown in FIG. 6, primary/mirror ECC error, primary/generated ECC error, and memory/generated ECC error signals may be output by the ECC comparators.

These ECC error signals from ECC comparators 625 are provided to status registers 618. In the status registers, each of the ECC error signals and all of the address, control, timing, data, and ECC signals relevant to an ECC fault are temporarily stored to enable error diagnosis and recovery.

An ECC error signal is asserted by ECC comparators 625 on an ECC error line and transmitted to CPU module 30 to indicate the detection of an ECC fault due to a miscompare. The miscompare can occur during either of the two ECC checks performed during a memory write cycle, or during the single ECC check performed during a memory read cycle.

As shown in FIG. 6, board select logic 627 receives slot signals from a memory backplane. The slot signals specify a unique slot location for each memory module 60. Board select logic 627 then compares the slot signals with the designated primary board address signals transmitted from one of the memory controllers via designator circuit 612. A board selected signal is generated by board select logic 627 if the slot signals are the same as the designated primary board address signals, thereby enabling the other circuitry in control logic 610.

3. Memory Controller

Memory controllers 70 and 75 control the access of CPUs 40 and 50, respectively, to memory module 60, auxiliary memory elements and, in the preferred embodiment, perform certain error handling operations. The auxiliary memory elements coupled to memory controller 70 include system ROM 43, EEPROM 44, and scratch pad RAM 45. ROM 43 holds certain standard code, such as diagnostics, console drivers, and part of the bootstrap code. EEPROM 44 is used to hold information such as error information detected during the operation of CPU 40, which may need to be modified, but which should not be lost when power is removed. Scratch pad RAM 45 is used for certain operations performed by CPU 40 and to convert rail-unique information (e.g., information specific to conditions on one rail which is available to only one CPU 40 or 50) to zone information (e.g., information which can be accessed by both CPUs 40 and 50).

Equivalent elements 53, 54 and 55 are coupled to memory controller 75. System ROM 53, EEPROM 54, and scratch pad RAM 55 are the same as system ROM 43, EEPROM 44, and scratch pad RAM 45, respectively, and perform the same functions.

Figure 7:
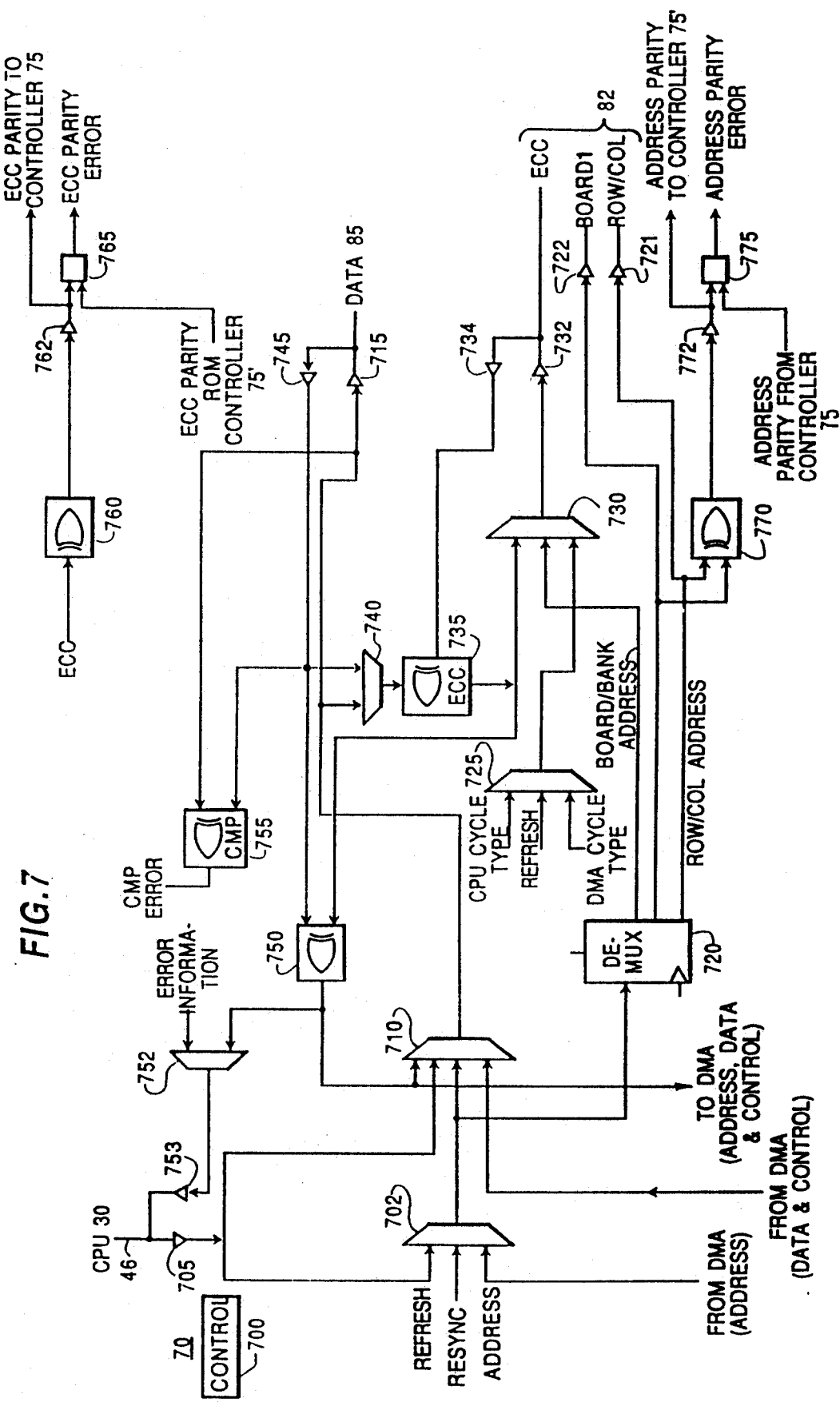
FIG. 7 is a block diagram of portions of the primary memory controller of the CPU module shown in FIG. 3.
Figure 8:
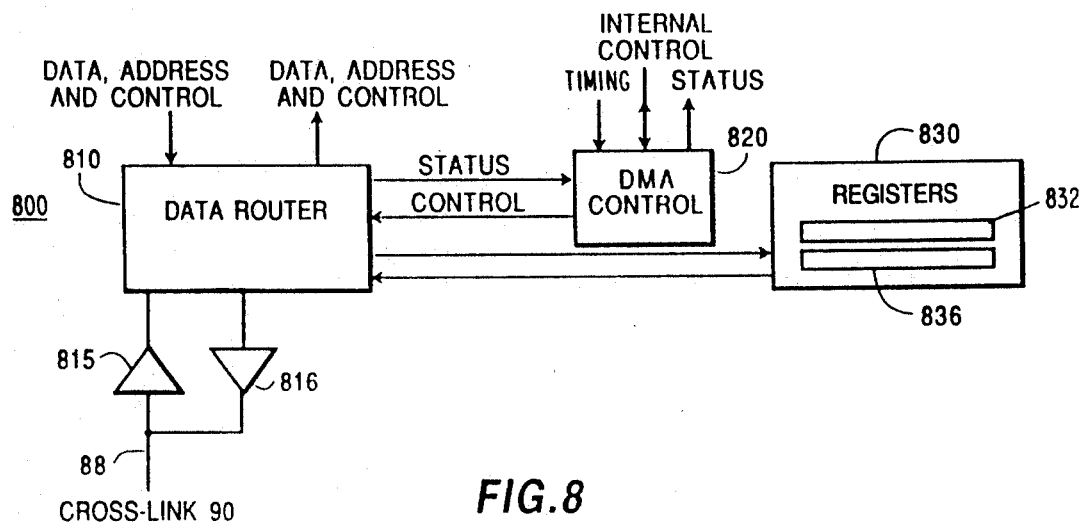
FIG. 8 is a block diagram of the DMA engine in the primary memory controller of the CPU module of FIG. 3.
Figure 9:
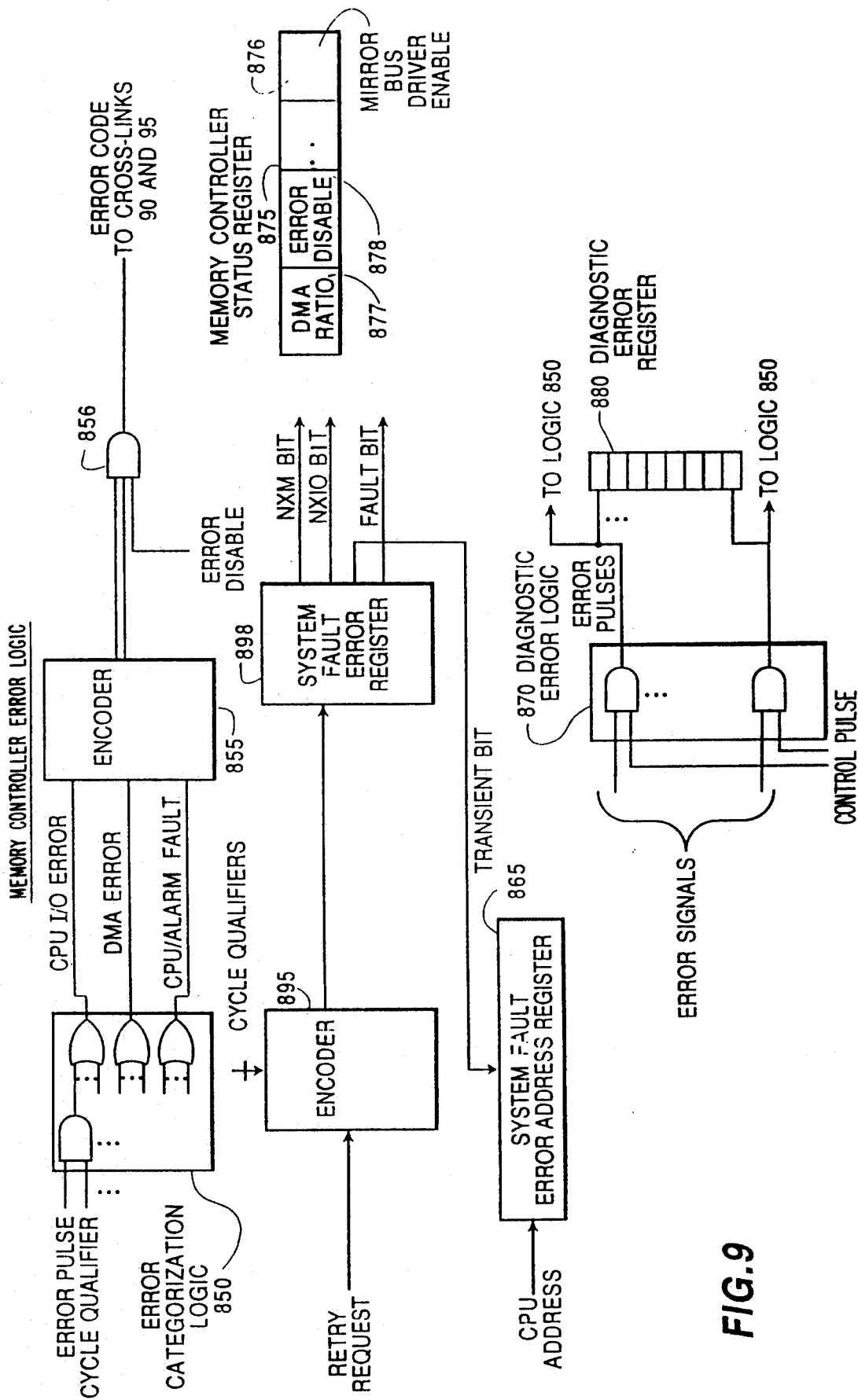
FIG. 9 is a diagram of error processing circuitry in the primary memory controller of the CPU module of FIG. 3.

The details of the preferred embodiment of primary memory controller 70 can be seen in FIGS. 7-9. Mirror memory controller 75 has the same elements as shown in FIGS. 7-9, but differs slightly in operation. Therefore, only primary memory controller 70's operation will be described, except where the operation of memory controller 75 differs. Memory controllers 70' and 75' in processing system 20' have the same elements and act the same as memory controllers 70 and 75, respectively.

The elements shown in FIG. 7 control the flow of data, addresses and signals through primary memory controller 70. Control logic 700 controls the state of the various elements in FIG. 7 according to the signals received by memory controller 70 and the state engine of that memory controller which is stored in control logic 700. Multiplexer 702 selects addresses from one of three sources. The addresses can either come from CPU 30 via receiver 705, from the DMA engine 800 described below in reference to FIG. 8, or from a refresh resync address line which is used to generate an artificial refresh during certain bulk memory transfers from one zone to another during resynchronization operations.

The output of multiplexer 702 is an input to multiplexer 710, as is data from CPU 30 received via receiver 705 and data from DMA engine 800. The output of multiplexer 710 provides data to memory module 60 via memory interconnect 85 and driver 715. Driver 715 is disabled for mirror memory control modules 75 and 75' because only one set of memory data is sent to memory modules 60 and 60', respectively.

The data sent to memory interconnect 85 includes either data to be stored in memory module 60 from CPU 30 or DMA engine 800. Data from CPU 30 and addresses from multiplexer 702 are also sent to DMA engine 800 via this path and also via receiver 745 and ECC corrector 750.

The addresses from multiplexer 702 also provide an input to demultiplexer 720 which divides the addresses into a row/column address portion, a board/bank address portion, and a single board bit. The twenty-two bits of the row/column address are multiplexed onto eleven lines. In the preferred embodiment, the twenty-two row/column address bits are sent to memory module 60 via drivers 721. The single board bit is preferably sent to memory module 60 via driver 722, and the other board/bank address bits are multiplexed with ECC signals.

Multiplexer 725 combines a normal refresh command for memory controller 70 along with cycle type information from CPU 30 (i.e., read, write, etc.) and DMA cycle type information. The normal refresh command and the refresh resync address both cause memory module 60 to initiate a memory refresh operation.

The output of multiplexer 725 is an input to multiplexer 730 along with the board/bank address from demultiplexer 720. Another input into multiplexer 730 is the output of ECC generator/checker 735. Multiplexer 730 selects one of the inputs and places it on the time-division multiplexed ECC/address lines to memory module 60. Multiplexer 730 allows those time-division multiplexed lines to carry board/bank address and additional control information as well as ECC information, although at different times.

ECC information is received from memory modules 60 via receiver 734 and is provided as an input to ECC generator/checker 735 to compare the ECC generated by memory module 60 with that generated by memory controller 70.

Another input into ECC generator/checker 735 is the output of multiplexer 740. Depending upon whether the memory transaction is a write transaction or a read transaction, multiplexer 740 receives as inputs the memory data sent to memory module 60 from multiplexer 710 or the memory data received from memory module 60 via receiver 745. Multiplexer 740 selects one of these sets of memory data to be the input to ECC generator/checker 735. Generator/checker 735 then generates the appropriate ECC code which, in addition to being sent to multiplexer 730, is also sent to ECC corrector 750. In the preferred embodiment, ECC corrector 750 corrects any single bit errors in the memory data received from memory module 60.

The corrected memory data from ECC checker 750 is then sent to the DMA engine shown in FIG. 8 as well as to multiplexer 752. The other input into multiplexer 752 is error information from the error handling logic described below in connection with FIG. 9. The output of multiplexer 752 is sent to CPU 30 via driver 753.

Comparator 755 compares the data sent from multiplexer 710 to memory module 60 with a copy of that data after it passes through driver 715 and receiver 745. This checking determines whether driver 715 and receiver 745 are operating correctly. The output of comparator 755 is a CMP error signal which indicates the presence or absence of such a comparison error. The CMP error feeds the error logic in FIG. 9.

Two other elements in FIG. 7 provide a different kind of error detection. Element 760 is a parity generator. ECC data, generated either by the memory controller 70 on data to be stored in memory module 60 or generated by memory module 60 on data read from memory module 60 is sent to a parity generator 760. The parity signal from generator 760 is sent, via driver 762, to comparator 765. Comparator 765 compares the ECC parity signal from generator 760 with an equivalent ECC parity signal generated by controller 75'.

Parity generator 770 performs the same type of a check on the row/column and single bit board address signals received from demultiplexer 720. The address parity signal from parity generator 770 is transmitted by a driver 772 to a comparator 775 which also receives an address parity signal from controller 75. The outputs of comparator 765 and 775 are parity error signals which feed the error logic in FIG. 9.

FIG. 8 shows the fundamentals of a DMA engine 800. In the preferred embodiment, DMA engine 800 resides in memory controller 70, but there is no requirement for such placement. As shown in FIG. 8, DMA engine 800 includes a data router 810, a DMA control 820, and DMA registers 830. Driver 815 and receiver 816 provide an interface between memory controller 70 and cross-link 90.

DMA control 820 receives internal control signals from control logic 700 and, in response, sends control signals to place data router 810 into the appropriate configuration. Control 820 also causes data router 810 to set its configuration to route data and control signals from cross-link 90 to the memory control 70 circuitry shown in FIG. 7. Data router 810 sends its status signals to DMA control 820 which relays such signals, along with other DMA information, to error logic in FIG. 9.

Registers 830 includes a DMA byte counter register 832 and a DMA address register 836. These registers are set to initial values by CPU 40 via router 810. Then, during DMA cycles, control 820 causes, via router 810, the counter register 832 to increment and address register 836 to decrement. Control 820 also causes the contents of address registers 836 to be sent to memory module 60 through router 810 and the circuitry in FIG. 7 during DMA operations.

As explained above, in the preferred embodiment of this invention, the memory controllers 70, 75, 70' and 75' also perform certain fundamental error operations. An example of the preferred embodiment of the hardware to perform such error operations are shown in FIG. 9.

As shown in FIG. 9, certain memory controller internal signals, such as timeout, ECC error and bus miscompare, are inputs into diagnostic error logic 870, as are certain external signals such as rail error, firewall miscompare, and address/control error. In the preferred embodiment, diagnostic error logic 870 receives error signals from the other components of system 10 via cross-links 90 and 95.

Diagnostic error logic 870 forms error pulses from the error signals and from a control pulse signal generated from the basic timing of memory controller 70. The error pulses generated by diagnostic error logic 870 contain certain error information which is stored into appropriate locations in a diagnostic error register 880 in accordance with certain timing signals. System fault error address register 865 stores the address in memory module 60 which CPUs 40 and 50 were communicating with when an error occurred.

The error pulses from diagnostic error logic 870 are also sent to error categorization logic 850 which also receives information from CPU 30 indicating the cycle type (e.g., read, write, etc.). From that information and the error pulses, error categorization logic 850 determines the presence of CPU/IO errors, DMA errors, or CPU/MEM faults.

A CPU/IO error is an error on an operation that is directly attributable to a CPU/IO cycle on bus 46 and may be hardware recoverable, as explained below in regard to resets. DMA errors are errors that occur during a DMA cycle and, in the preferred embodiment, are handled principally by software. CPU/MEM faults are errors that for which the correct operation of CPU or the contents of memory cannot be guaranteed.

The outputs from error categorization logic 850 are sent to encoder 855 which forms a specific error code. This error code is then sent to cross-links 90 and 95 via AND gate 856 when the error disable signal is not present.

After receiving the error codes, cross-links 90, 95, 90' and 95' send a retry request signal back to the memory controllers. As shown in FIG. 9, an encoder 895 in memory controller 70 receives the retry request signal along with cycle type information and the error signals (collectively shown as cycle qualifiers). Encoder 895 then generates an appropriate error code for storage in a system fault error register 898.

System fault error register 898 does not store the same information as diagnostic error register 880. Unlike the system fault error register 898, the diagnostic error register 880 only contains rail unique information, such as an error on one input from a cross-link rail, and zone unique data, such as an uncorrectable ECC error in memory module 60.

System fault error register 898 also contains several bits which are used for error handling. These include a NXM bit indicating that a desired memory location is missing, a NXIO bit indicating that a desired I/O location is missing, a solid fault bit and a transient bit. The transient and solid bits together indicate the fault level. The transient bit also causes system fault error address register 865 to freeze.

Memory controller status register 875, although technically not part of the error logic, is shown in FIG. 9 also. Register 875 stores certain status information such as a DMA ratio code in DMA ratio portion 877, an error disable code in error disable portion 878, and a mirror bus driver enable code in mirror bus driver enable portion 876. The DMA ratio code specifies the fraction of memory bandwidth which can be allotted to DMA. The error disable code provides a signal for disabling AND gate 856 and thus the error code. The mirror bus driver enable code provides a signal for enabling the mirror bus drivers for certain data transactions.

4. Cross-link

Data for memory resync, DMA and I/O operations pass through cross-links 90 and 95. Generally, cross-links 90 and 95 provide communications between CPU module 30, CPU module 30', I/O modules 100, 110, 120, and I/O modules 100', 110', 120' (see FIG. 1).

Figure 10:
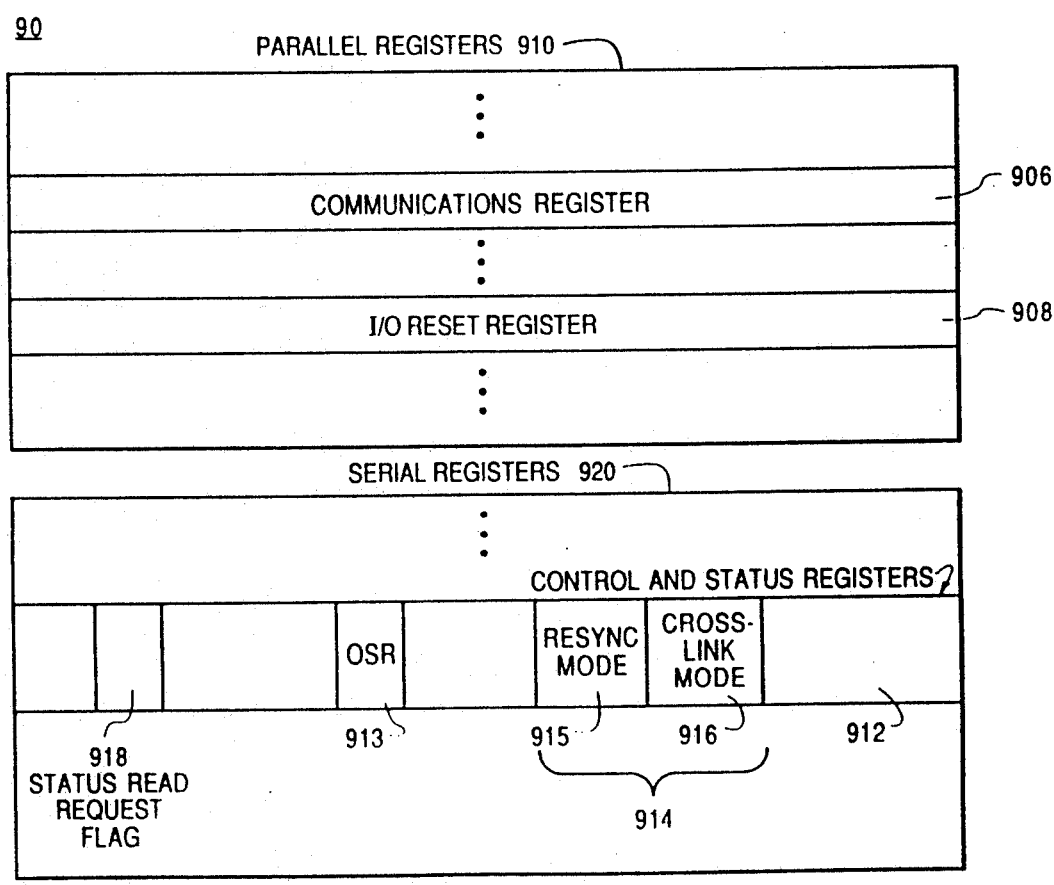
FIG. 10 is a drawing of some of the registers of the cross-link in the CPU module shown in FIG. 3.

Cross-links 90 and 95 contain both parallel registers 910 and serial registers 920 as shown in FIG. 10. Both types of registers are used for interprocessor communication in the preferred embodiment of this invention. During normal operation, processing systems 20 and 20' are synchronized and data is exchanged in parallel between processing systems 20 and 20' using parallel registers 910 in cross-links 90/95 and 90'/95', respectively. When processing systems 20 and 20' are not synchronized, most notably during bootstrapping, data is exchanged between cross-links by way of serial registers 920.

The addresses of the parallel registers are in I/O space as opposed to memory space. Memory space refers to locations in memory module 60. I/O space refers to locations such as I/O and internal system registers, which are not in memory module 60.

Within I/O space, addresses can either be in system address space or zone address space. The term "system address space" refers to addresses that are accessible throughout the entire system 10, and thus by both processing systems 20 and 20'. The term "zone address space" refers to addresses which are accessible only by the zone containing the particular cross-link.

The parallel registers shown in FIG. 10 include a communications register 906 and an I/O reset register 908. Communications register 906 contains unique data to be exchanged between zones. Such data is usually zone-unique, such as a memory soft error (it is almost beyond the realm of probability that memory modules 60 and 60' would independently experience the same error at the same time).

Because the data to be stored into register 906 is unique, the address of communications register 906 for purposes of writing must be in zone address space. Otherwise, processing systems 20 and 20', because they are in lockstep synchronization and executing the same series of instruction at substantially the same time, could not store zone unique data into only the communications registers 906 in zone 11; they would have to store that same data into the communications registers 906' (not shown) in zone 11'.

The address of communications register 906 for reading, however, is in system address space. Thus, during synchronous operation, both zones can simultaneously read the communications register from one zone and then simultaneously read the communications register from the other zone.

I/O reset register 908 resides in system address space. The I/O reset register includes one bit per I/O module to indicate whether the corresponding module is in a reset state. When an I/O module is in a reset state, it is effectively disabled.

Parallel registers 910 also include other registers, but an understanding of those other registers is not necessary to an understanding of the present invention.

All of the serial cross-link registers 920 are in the zone specific space since they are used either for asynchronous communication or contain only zone specific information. The purpose of the serial cross-link registers and the serial cross-link is to allow processors 20 and 20' to communicate even though they are not running in lockstep synchronization (i.e., phase-locked clocks and same memory states). In the preferred embodiment, there are several serial registers, but they need not be described to understand this invention.

Control and status register 912 is a serial register which contains status and control flags. One of the flags is an OSR bit 913 which is used for bootstrapping and indicates whether the processing system in the corresponding zone has already begun its bootstrapping process or whether the operating system for that zone is currently running, either because its bootstrapping process has completed, or because it underwent a resynchronization.

Control and status register 912 also contain the mode bits 914 for identifying the current mode of cross-link 90 and thus of processing system 20. Preferably mode bits include resync mode bits 915 and cross-link mode bits 916. Resync mode bits 915 identify cross-link 90 as being either in resync slave or resync master mode. The cross-link mode bits 916 identify cross-link 90 as being either in cross-link off, duplex, cross-link master, or cross-link slave mode.

One of the uses for the serial registers is a status read operation which allows the cross-link in one zone to read the status of the other zone's cross-link. Setting a status read request flag 918 in serial control and status register 912 sends a request for status information to cross-link 90'. Upon receipt of this message, cross-link 90' sends the contents of its serial control and status register 912' back to cross-link 90.

Figure 11:
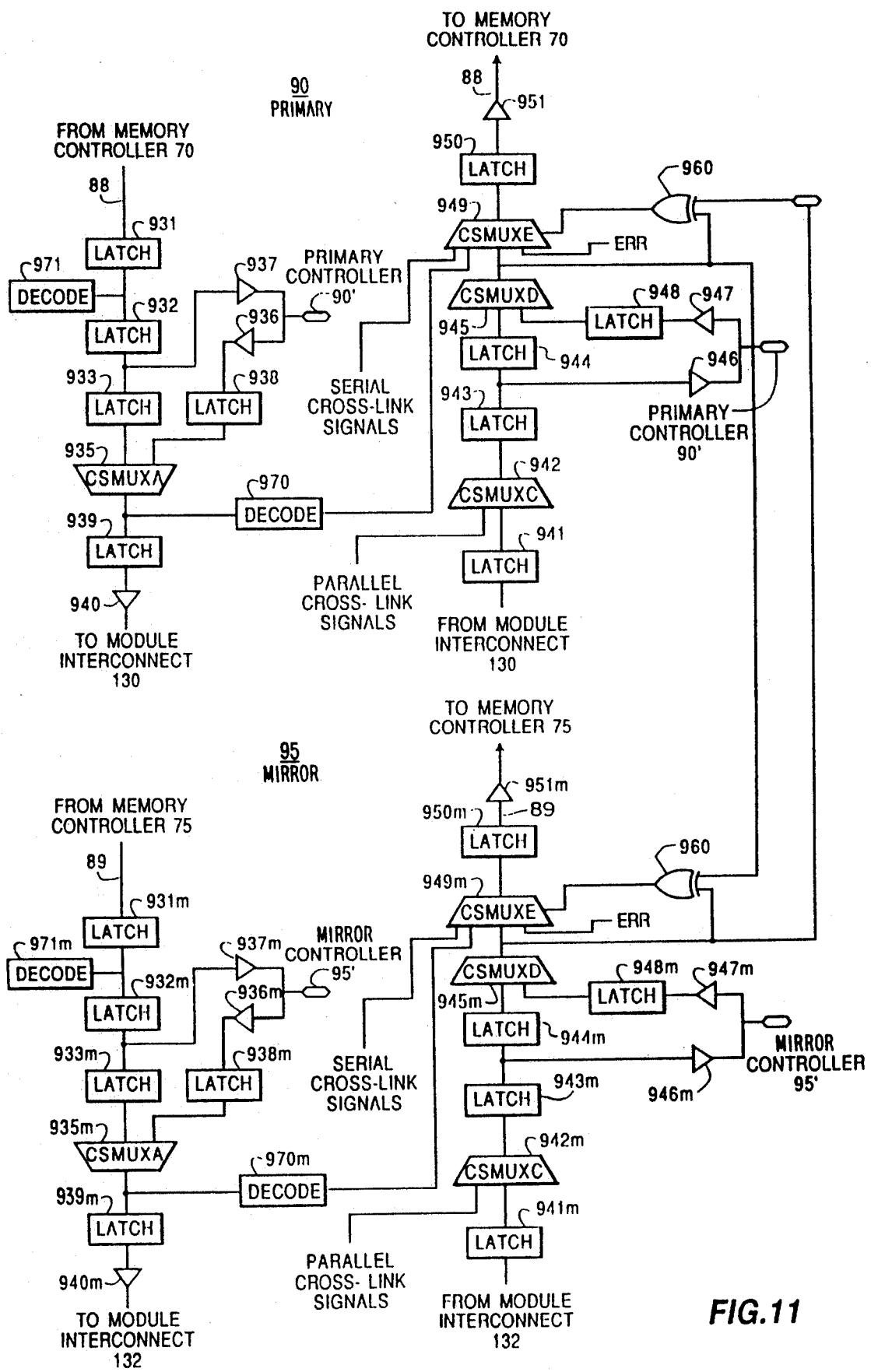
FIG. 11 is a block diagram of the elements which route control signals in the cross-links of the CPU module shown in FIG. 3.

FIG. 11 shows some of the elements for routing control and status signals (referred to as "control codes") in primary cross-link 90 and mirror cross-link 95. Corresponding cross-link elements exist in the preferred embodiment within cross-links 90' and 95'. These codes are sent between the memory controllers 70 and 75 and the I/O modules coupled to module interconnects 130, 132, 130' and 132'.

Figure 12:
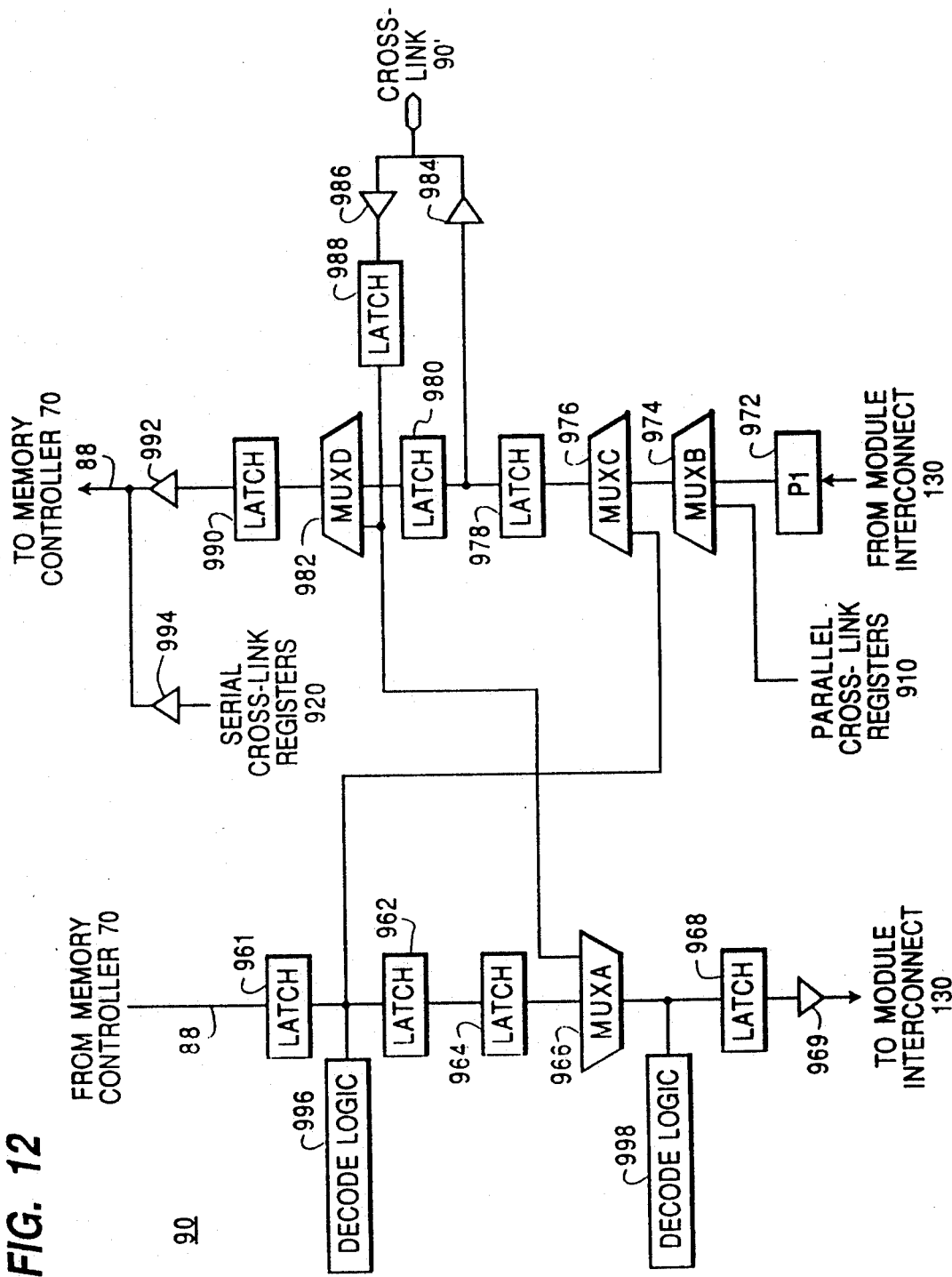
FIG. 12 is a block diagram of the elements which route data and address signals in the primary cross-link of the CPU module shown in FIG. 3.

FIG. 12 shows the elements in the preferred embodiment of primary cross-link 90 which are used for routing data and address signals. Corresponding cross-link elements exist in cross-links 95, 90' and 95'.

In FIG. 11, the elements for both the primary cross-link 90 and mirror cross-link 95 in processing system 20 are shown, although the hardware is identical, because of an important interconnection between the elements. The circuit elements in mirror cross-link 95 which are equivalent to elements in primary cross-link 90 are shown by the same number, except in the mirror controller the letter "m" is placed after the number.

With reference to FIGS. 11 and 12, the elements include latches, multiplexers, drivers and receivers. Some of the latches, such as latches 933 and 933m, act as delay elements to ensure the proper timing through the cross-links and thereby maintain synchronization. As shown in FIG. 11, control codes from memory controller 70 are sent via bus 88 to latch 931 and then to latch 932. The reason for such latching is to provide appropriate delays to ensure that data from memory controller 70 passes through cross-link 90 simultaneously with data from memory controller 70'.

If codes from memory controller 70 are to be sent to processing system 20' via cross-link 90', then driver 937 is enabled. The control codes from memory controller 70 also pass through latch 933 and into multiplexer CSMUXA 935. If control codes are received into primary cross-link 90 from cross-link 90', then their path is through receiver 936 into latch 938 and also into multiplexer 935.

Control codes to multiplexer 935 determine the source of data, that is either from memory controller 70 or from memory controller 70', and place those codes on the output of multiplexer 935. That output is stored in latch 939, again for proper delay purposes, and driver 940 is enabled if the codes are to be sent to module interconnect 130.

The path for data and address signals, as shown in FIG. 12 is somewhat similar to the path of control signals shown in FIG. 11. The differences reflect the fact that during any one transaction, data and addresses are flowing in only one direction through cross-links 90 and 95, but control signals can be flowing in both directions during that transaction. For that same reason the data lines in busses 88 and 89 are bidirectional, but the control codes are not.

Data and addresses from the memory controller 70, via bus 88, enter latch 961, then latch 962, and then latch 964. As in FIG. 11, the latches in FIG. 12 provide proper timing to maintain synchronization. Data from memory controller 70' is buffered by receiver 986, stored in latch 988, and then routed to the input of multiplexer MUXA 966. The output of multiplexer 966 is stored in latch 968 and, if driver 969 is enabled, is sent to module interconnect 130.

The path for control codes to be sent to memory controller 70 is shown in FIG. 11. Codes from module interconnect 30 are first stored in latch 941 and then presented to multiplexer CSMUXC 942. Multiplexer 942 also receives control codes from parallel cross-link registers 910 and selects either the parallel register codes or the codes from latch 941 for transmission to latch 943. If those control codes are to be transmitted to cross-link 90', then driver 946 is enabled. Control codes from cross-link 90' (and thus from memory controller 70') are buffered by receiver 947, stored in latch 948, and presented as an input to multiplexer CSMUXD 945. CSMUXD 945 also receives as an input the output of latch 944 which stores the contents of latch 943.

Multiplexer 945 selects either the codes from module interconnect 130 or from cross-link 90' and presents those signals as an input to multiplexer CSMUXE 949. Multiplexer 949 also receives as inputs a code from the decode logic 970 (for bulk memory transfers that occur during resynchronization), codes from the serial cross-link registers 920, or a predetermined error code ERR. Multiplexer 949 then selects ones of those inputs, under the appropriate control, for storage in latch 950. If those codes are to be sent to memory controller 70, then driver 951 is activated.

The purpose of the error code ERR, which is an input into multiplexer 949, is to ensure that an error in one of the rails will not cause the CPUs in the same zone as the rails to process different information. If this occurred, CPU module 30 would detect a fault which would cause drastic, and perhaps unnecessary action. To avoid this, cross-link 90 contains an EXCLUSIVE OR gate 960 which compares the outputs of multiplexers 945 and 945m. If they differ, then gate 960 causes multiplexer 949 to select the ERR code. EXCLUSIVE OR gate 960m similarly causes multiplexer 949m also to select an ERR code. This code indicates to memory controllers 70 and 75 that there has been an error, but avoids causing a CPU module error. The single rail interface to memory module 60 accomplishes the same result for data and addresses.

The data and address flow shown in FIG. 12 is similar to the flow of control signals in FIG. 11. Data and addresses from module interconnect 130 are stored in latch 972 and then provided as an input to multiplexer MUXB 974. Data from the parallel registers 910 provide another input to multiplexer 974. The output of multiplexer 974 is an input to multiplexer MUXC 976 which also receives data and addresses stored in latch 961 that were originally sent from memory controller 70. Multiplexer 976 then selects one of the inputs for storage in latch 978. If the data and addresses, either from the module interconnect 130 or from the memory controller 70, are to be sent to cross-link 90', then driver 984 is enabled.

Data from cross-link 90' is buffered by receiver 986 and stored in latch 988, which also provides an input to multiplexer MUXD 982. The other input of multiplexer MUXD 982 is the output of latch 980 which contains data and addresses from latch 978. Multiplexer 982 then selects one of its inputs which is then stored into latch 990. If the data or addresses are to be sent to memory controller 70, then driver 992 is activated. Data from serial registers 920 are sent to memory controller 70 via driver 994.

The data routing in cross-link 90, and more particularly the xonreol elements in both FIGS. 11 and 12, is controlled by several signals generated by decode logic 970, decode logic 971, decode logic 996, and decode logic 998. This logic provides the signals which control multiplexers 935, 942, 945, 949, 966, 974, 976, and 982 to select the appropriate input source. In addition, the decode logic also controls drivers 940, 946, 951, 969, 984, 992, and 994.

Most of the control signals are generated by decode logic 998, but some are generated by decode logic 970, 971, 970m, 971m, and 996. Decode logic 998, 970 and 970m are connected at positions that will ensure that the logic will receive the data and codes necessary for control whether the data and codes are received from its own zone or from other zone.

The purpose of decode logic 971, 971m and 996 is to ensure that the drivers 937, 937m and 984 are set into the proper state. This "early decode" makes sure that data addresses and codes will be forwarded to the proper cross-links in all cases. Without such early decode logic, the cross-links could all be in a state with their drivers disabled. If one at the memory controllers were also disabled, then its cross-links would never receive addresses, data and control codes, effectively disabling all the I/O modules connected to that cross-link.

Prior to describing the driver control signals generated by decode logic 970, 971, 970m, 971m, and 998, it is necessary to understand the different modes that these zones, and therefore the cross-links 90 and 95, can be in. FIG. 13 contains a diagram of the different states A-F, and a table explaining the states which correspond to each mode.

At start-up and in other instances, both zones are in state A which is known as the OFF mode for both zones. In that mode, the computer systems in both zones are operating independently. After one of the zones' operating system zone, and that request is honored, then the zones enter the master/slave mode, shown as states B and C. In such modes, the zone which is the master, has an operating CPU and has control of the I/O modules of its zone and of the other zone.

Upon initiation of resynchronization, the computer system leaves the master/slave modes, either states B or C, and enters a resync slave/resync master mode, which is shown as states E and F. In those modes, the zone that was the master zone is in charge of bringing the CPU of the other zone on line. If the resynchronization fails, the zones revert to the same master/slave mode that they were in prior to the resynchronization attempt.

If the resynchronization is successful, however, then the zones enter state D, which is the full duplex mode. In this mode, both zones are operating together in lockstep synchronization. Operation continues in this mode until there is a CPU/MEM fault, in which case the system enters one of the two master/slave modes. The slave is the zone whose processor experienced the CPU/MEM fault.

When operating in state D, the ful duplex mode, certain errors, most notably clock phase errors, necessitate splitting the system into two independent processing systems. This causes system 10 to go back into state A.

Decode logic 970, 970m, 971, 971m, and 998 (collectively referred to as the cross-link control logic), which are shown in FIGS. 11 and 12, have access to the resync mode bits 915 and the cross-link mode bits 916, which are shown in FIG. 10, in order to determine how to set the cross-link drivers and multiplexers into the proper states. In addition, the cross-link decode logic also receives and analyzes a portion of an address sent from memory controllers 70 and 75 during data transactions to extract addressing information that further indicates to the cross-link decode logic how to set the state of the cross-link multiplexers and drivers.

The information needed to set the states of the multiplexers is fairly straightforward once the different modes and transactions are understood. The only determination to be made is the source of the data. Thus when cross-links 90 and 95 are in the slave mode, multiplexers 935, 935m, and 966 will select data addresses and codes from zone 11'. Those multiplexers will also select data, addresses and codes from the other zone if cross-links 90 and 95 are in full duplex mode, the address of an I/O instruction is for a device connected to an I/O module in zone 11, and the cross-link with the affected multiplexer is in a cross-over mode. In a cross-over mode, the data to be sent on the module interconnect is to be received from the other zone for checking. In the preferred embodiment, module interconnect 130 would receive data, addresses and codes from the primary rail in zone 11 and module interconnect would receive data, addresses and codes from the mirror rail in zone 11'. Alternatively, module interconnect 132 could receive data, addresses and codes from the primary rail in zone 11' which would allow the primary rail of one zone to be compared with the mirror rail of the other zone.

Multiplexers 945, 945m, and 982 will be set to accept data, address and codes from whichever zone is the source of the data. This is true both when all the cross-links are in full duplex mode and the data, address and codes are received from I/O modules and when the cross-link is in a resync slave mode and the data, address and codes are received from the memory controllers of the other zone.

If the addressing information from memory controllers 70 and 75 indicates that the source of response data and codes is the cross-link's own parallel registers 910, then multiplexers 942, 942m, and 974 are set to select data and codes from those registers. Similarly, if the addressing information from memory controllers 70 and 75 indicates that the source of response data is the cross-link's own serial register 920, then multiplexers 949 and 949m are set to select data and codes from those registers.

Multiplexers 949 and 949m are also set to select data from decode logic 970 and 970m, respectively, if the information is a control code during memory resync operations, and to select the ERR code if the EXCLUSIVE OR gates 960 and 960m identify a miscompare between the data transmitted via cross-links 90 and 95. In this latter case, the control of the multiplexers 949 and 949m is generated from the EXCLUSIVE OR gates 960 and 960m rather than from the cross-link control logic. Multiplexers 949 and 949m also select codes from serial cross-link registers 910 when those registers are requested or the output of multiplexers 945 and 945m when those codes are requested. Multiplexers 945 and 945m select either the outputs from multiplexers 942 and 942m, respectively, or I/O codes from cross-links 90' and 95', respectively.

Multiplexer 976 selects either data and addresses from module interconnect 130 in the case of a transaction with an I/O module, or data and addresses from memory controller 90 when the data and addresses are to be sent to cross-link 90' either for I/O or during memory resynchronization.

Drivers 937 and 937m are activated when cross-links 90 and 95 are in duplex, master or resync master modes. Drivers 940 and 940m are activated for I/O transactions in zone 11. Drivers 946 and 946m are activated when cross-links 90 and 95 are in the duplex or slave modes. Drivers 951 and 951m are always activated.

Driver 969 is activated during I/O writes to zone 11. Driver 984 is activated when cross-link 90 is sending data and addresses to I/O in zone 11', or when cross-link 90 is in the resync master mode. Receiver 986 receives data from cross-link 90'. Drivers 992 and 994 are activated when data is being sent to memory controller 70; driver 994 is activated when the contents of the serial cross-link register 910 are read and driver 992 is activated during all other reads.

5. Oscillator

When both processing systems 20 and 20' are each performing the same functions in the full duplex mode, it is imperative that CPU modules 30 and 30' perform operations at the same rate. Otherwise, massive amounts of processing time will be consumed in resynchronizing processing systems 20 and 20' for I/O and interprocessor error checking. In the preferred embodiment of processing systems 20 and 20', their basic clock signals are synchronized and phase-locked to each other. The fault tolerant computing system 10 includes a timing system to control the frequency of the clock signals to processing systems 20 and 20' and to minimize the phase difference between the clock signals for each processing system.

Figure 14:
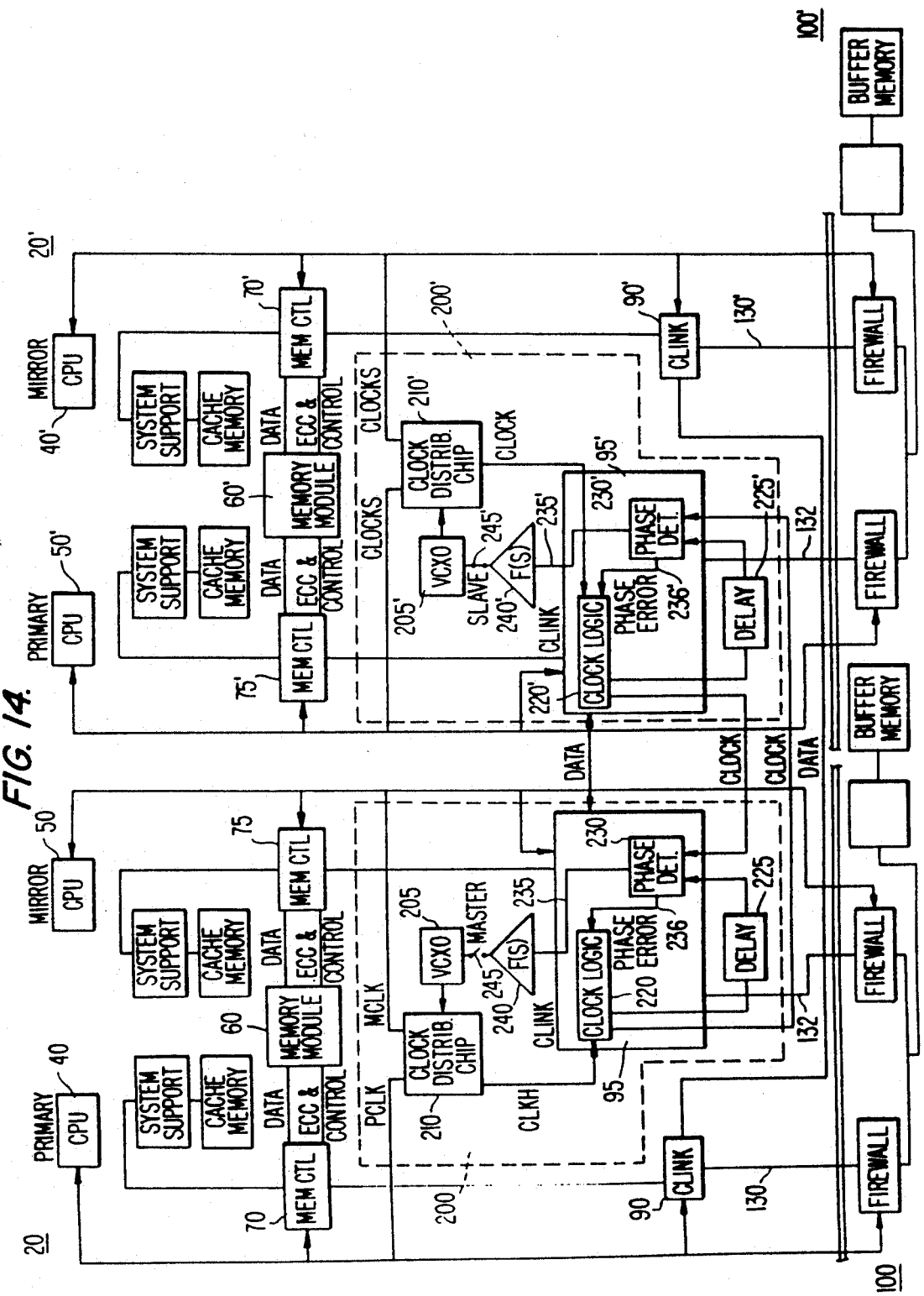
FIG. 14 is a block diagram of the timing system for the fault tolerant computer system of FIG. 1.

FIG. 14 shows a block diagram of the timing system of this invention embedded in processing systems 20 and 20'. The timing system comprises oscillator system 200 in CPU module 30 of processing system 20, and oscillator system 200' in CPU module 30' of processing system 20'. The elements of oscillator 200' are equivalent to those for oscillator 200 and both oscillator systems, operation is the same. Thus, only the elements and operation of oscillator system 200 will be described, except if the operations of oscillator systems 200 and 200' differ.

As FIG. 14 shows, much of oscillator system 200, specifically the digital logic, lies inside of cross-link 95. Oscillator system 200 includes a voltage-controlled crystal oscillator (VCXO) 205 which generates a basic oscillator signal preferably at 66.66 Mhz. The frequency of VCXO 205 can be adjusted by the voltage level at the input.

Figure 15:
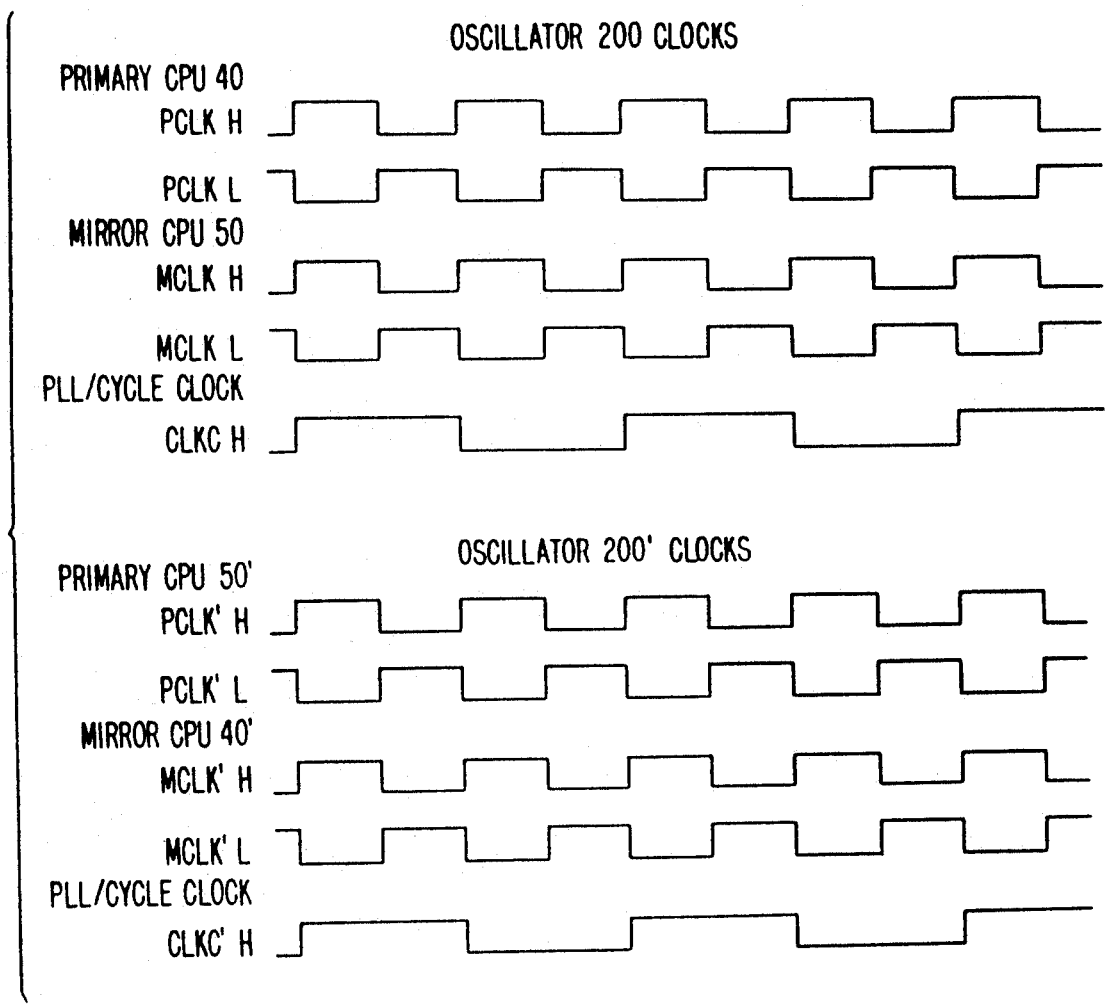
FIG. 15 is a timing diagram for the clock signals generated by the timing system in FIG. 14.

Clock distribution chip 210 divides down the basic oscillator signal and preferably produces four primary clocks all having the same frequency. For primary CPU 40 the clocks are PCLK L and PCLK H, which are logical inverses of each other. For mirror CPU 50, clock distribution chip 210 produces clock signals MCLK L and MCLK H, which are also logical inverses of each other. The timing and phase relationship of these clock signals are shown in FIG. 15. Preferably, frequency of clock signals PCLK L, PCLK H, MCLK L, and MCLK H is about 33.33 Mhz. Clock chip 210 also produces a phase-locked loop signal CLKC H at 16.66 Mhz, also shown in FIG. 15. This phase locked loop signal is sent to clock logic 220 which buffers that signal.

Clock logic buffer 220 sends the CLKC H signal to oscillator 200' for use in synchronization. Clock logic buffer 220' in oscillator 200' sends its own buffered phase-locked loop signal CLKC, H to phase detector 230 in oscillator 200. ' Phase detector 230 also receives the buffered phase locked loop signal CLKC H from clock logic 220 through delay element 225. Delay element 225 approximates the delay due to the cable run from clock logic buffer 220'.

Phase detector 230 compares its input phase locked loop signals and generates two outputs. One is a phase differences signal 235 which is sent through loop amplifier 240 to the voltage input of VCXO 205. Phase differences signal 235 will cause amplifier 240 to generate a signal to alter the frequency of VCXO 205 to compensate for phase differences.

The other output of phase detector 230 is a phase error signal 236 which indicates possible synchronism faults.

Figure 16:
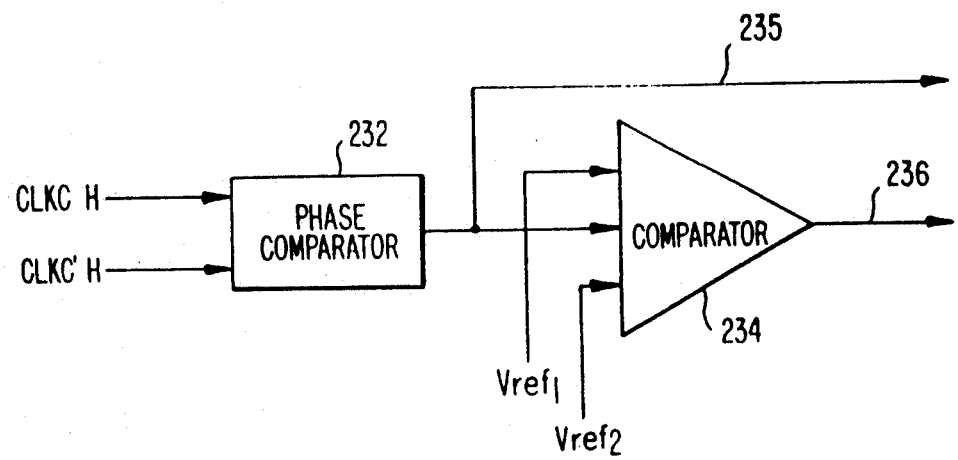
FIG. 16 is a detailed diagram of a phase detector for the timing system shown in FIG. 14.

FIG. 16 is a detailed diagram of phase detector 230. Phase detector 230 includes a phase comparator 232 and a voltage comparator 234. Phase comparator 232 receives the clock signal from delay element 225 (CLKC H) and the phase lock loop clock signal from oscillator 200' (CLKC, H) and generates phase differences signal 235 as a voltage level representing the phase difference of those signals.

If processing system 20 were the "slave" for purposes of clock synchronization, switch 245 would be in the "SLAVE" position (i.e., closed) and the voltage level 235, after being amplified by loop amplifier 240, would control the frequency of VCXO 205. If both switches 245 and 245' are in the "master" position, processing systems 20 and 20' would not be phase-locked and would be running asynchronously (independently).

The voltage level of phase differences signal 235 is also an input to voltage comparator 234 as are two reference voltages, $V_{ref1}$ and $V_{ref2}$, representing acceptable ranges of phase lead and lag. If the phase difference is within tolerance, the PHASE ERROR signal will not be activated. If the phase difference is out of tolerance, then the PHASE ERROR signal 236 will be activated and sent to cross-link 95 via clock decoder 220.

6. I/O Module

Figure 17:
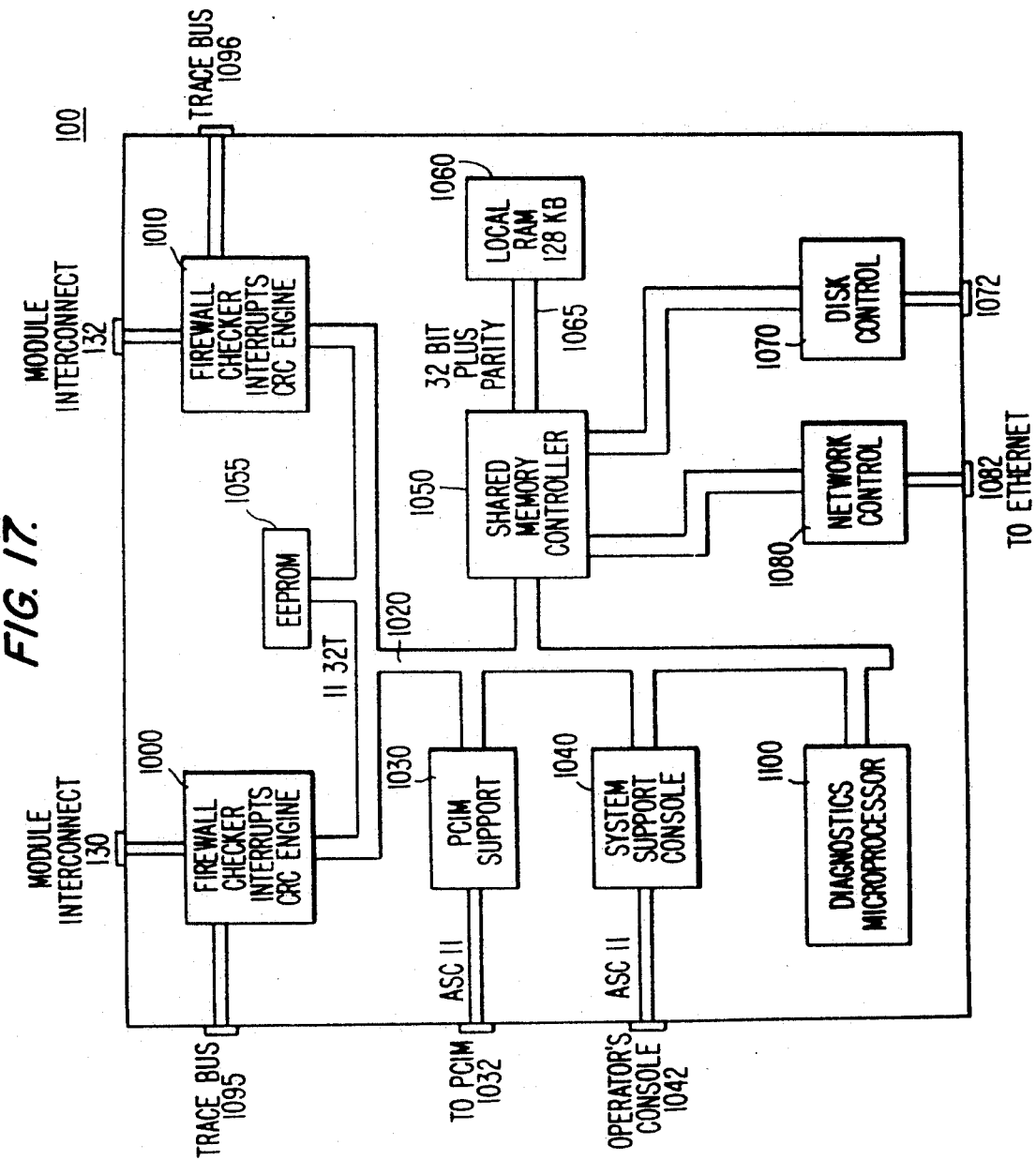
FIG. 17 is a block diagram of an I/O module for the computer system of FIG. 1.

FIG. 17 shows a preferred embodiment of an I/O module 100. The principles of operation I/O module 100 are applicable to the other I/O modules as well.

Figure 18:
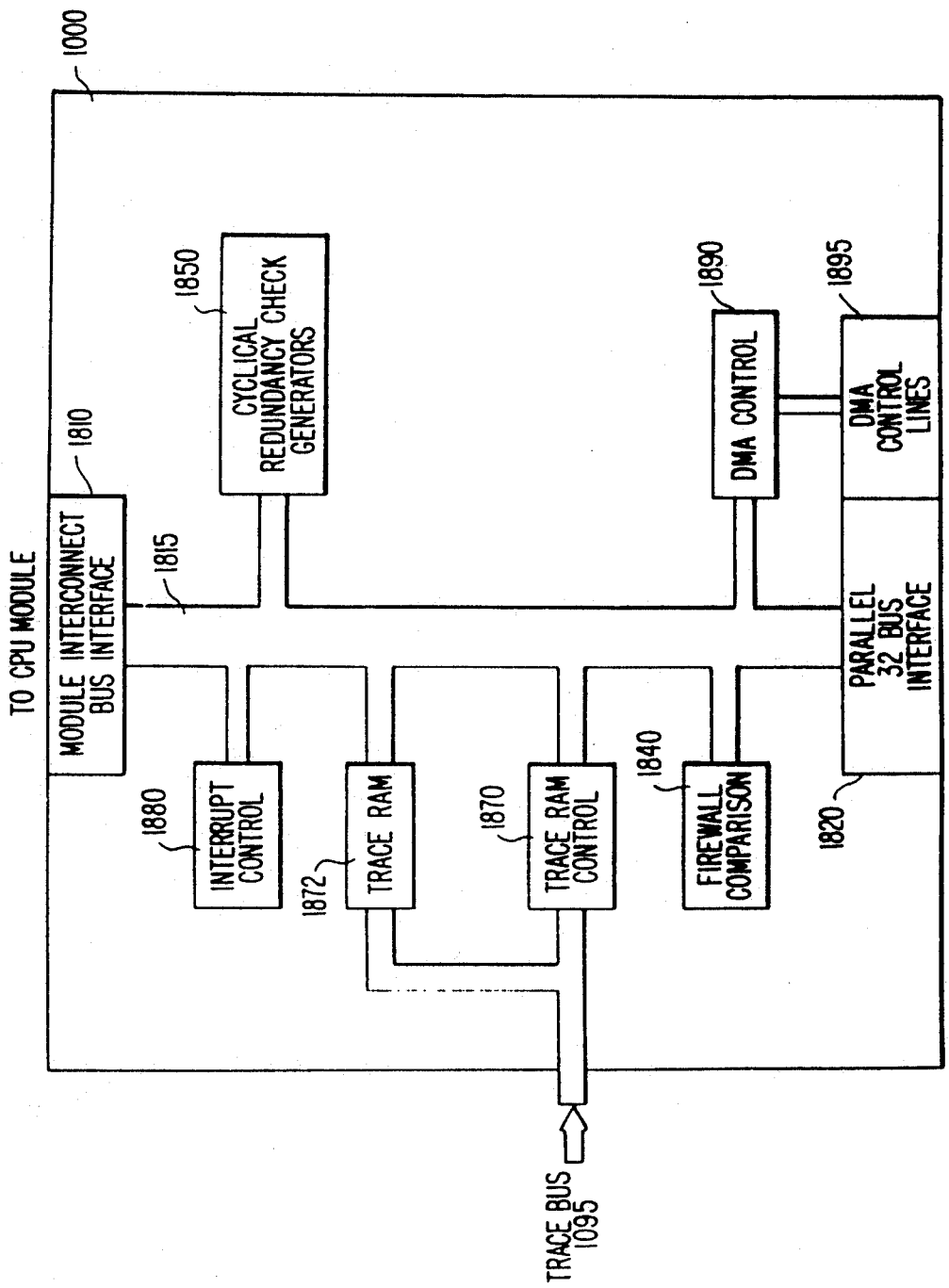
FIG. 18 is a block diagram of the firewall element in the I/O module shown in FIG. 17.

FIG. 18 shows the elements in the preferred embodiment of firewall 1000. Firewall 1000 includes a 16 bit bus interface 1810 to module interconnect 130 and a 32 bit bus interface 1820 for connection to bus 1020 shown in FIG. 17. Interfaces 1810 and 1820 are connected by an internal firewall bus 1815 which also interconnects with the other elements of firewall 1000. Preferably bus 1815 is a parallel bus either 16 or 32 bits wide.

I/O module 100 is connected to CPU module 30 by means of dual rail module interconnects 130 and 132. Each of the module interconnects is received by firewalls 1000 and 1010, respectively. One of the firewalls, which is usually, but not always firewall 1000, writes the data from module interconnect 130 onto bus 1020. The other firewall, in this case firewall 1010, checks that data against its own copy received from module interconnect 132 using firewall comparison circuit 1840 shown in FIG. 18. That checking is effective due to the lockstep synchronization of CPU modules 30 and 30' which causes data written to I/O module 100 from CPU modules 30 and 30' to be available at firewalls 1000 and 1010 substantially simultaneously.

Firewall comparison circuit 1840 only checks data received from CPU modules 30 and 30'. Data sent to CPU modules 30 and 30' from an I/O device have a common origin and thus do not require checking. Instead, data received from an I/O device to be sent to CPU modules 30 and 30' is checked by an error detection code (EDC), such as a cyclical redundancy check (CRC), which is performed by EDC/CRC generator 1850. EDC/CRC generator 1850 is also coupled to internal firewall bus 1815.

EDC/CRC generator 1850 generates and checks the same EDC/CRC code that is used by the I/O device. Preferably, I/O module 100 generates two EDC. One, which can also be a EDC/CRC, is used for an interface to a network, such as the Ethernet packet network to which module 100 is coupled (see element 1082 in FIG. 17). The other is used for a disk interface such as disk interface 1072 in FIG. 17.

EDC/CRC coverage is not required between CPU module 30 and I/O module 100 because the module interconnects are duplicated. For example in CPU module 30, cross-link 90 communicates with firewall 1000 through module interconnect 130, and cross-link 95 communicates with firewall 1010 through module interconnect 132.

A message received from Ethernet network 1082 is checked for a valid EDC/CRC by network control 1080 shown in FIG. 17. The data, complete with EDC/CRC, is written to a local RAM 1060 also shown in FIG. 17. All data in local RAM 1060 is transferred to memory module 60 using DMA. A DMA control 1890 coordinates the transfer and directs EDC/CRC generator 1850 to check the validity of the EDC/CRC encoded data being transferred.

Most data transfers with an I/O device are done with DMA. Data is moved between main memory and I/O buffer memory. When data is moved from the main memory to an I/O buffer memory, an EDC/CRC may be appended. When the data is moved from I/O buffer memory to main memory, an EDC/CRC may be checked and moved to main memory or may be stripped. When data is moved from the I/O buffer memory through an external device, such as a disk or Ethernet adaptor the EDC/CRC may be checked locally or at a distant receiving node, or both. The memory data packets may have their EDC/CRC generated at the distant node or by the local interface on the I/O module.

This operation ensures that data residing in or being transferred through a single rail system like I/O module 100 is covered by an error detection code, which is preferably at least as reliable as the communications media the data will eventually pass through. Different I/O modules, for example those which handle synchronous protocols, preferably have an EDC/CRC generator which generates and checks the EDC/CRC codes of the appropriate protocols.

In general, DMA control 1890 handles the portion of a DMA operation specific to the shared memory controller 1050 and local RAM 1060 being addressed. The 32 bit bus 1020 is driven in two different modes. During DMA setup, DMA control 1890 uses bus 1020 as a standard asynchronous microprocessor bus. The address in local RAM 1060 where the DMA operation will occur is supplied by shared memory controller 1050 and DMA control 1890. During the actual DMA transfer, DMA control 1890 directs DMA control lines 1895 to drive bus 1020 in a synchronous fashion. Shared memory controller 1050 will transfer a 32 bit data word with bus 1020 every bus cycle, and DMA control 1890 keeps track of how many words are left to be transferred. Shared memory control 1050 also controls local RAM 1060 and creates the next DMA address.

The I/O modules (100, 110, 120) are responsible for controlling the read/write operations to their own local RAM 1060. The CPU module 30 is responsible for controlling the transfer operations with memory array 60. The DMA engine 800 of memory controllers 70 and 75 (shown in FIG. 8) directs the DMA operations on the CPU module 30. This division of labor prevents a fault in the DMA logic on any module from degrading the data integrity on any other module in zones 11 or 11'.

The functions of trace RAM 1872 and trace RAM controller 1870 are described in greater detail below. Briefly, when a fault is detected and the CPUs 40, 40', 50 and 50' and CPU modules 30 and 30' are notified, various trace RAMs throughout computer system 10 are caused to perform certain functions described below. The communications with the trace RAMs takes place over trace bus 1095. Trace RAM control 1870, in response to signals from trace bus 1095, causes trace RAM 1872 either to stop storing, or to dump its contents over trace bus 1095.

I/O module bus 1020, which is preferably a 32 bit parallel bus, couples to firewalls 1000 and 1010 as well as to other elements of the I/O module 100. A shared memory controller 1050 is also coupled to I/O bus 1020 in I/O module 100. Shared memory controller 1050 is coupled to a local memory 1060 by a shared memory bus 1065, which preferably carries 32 bit data. Preferably, local memory 1060 is a RAM with 256 Kbytes of memory, but the size of RAM 1060 is discretionary. The shared memory controller 1050 and local RAM 1060 provide memory capability for I/O module 100.

Disk controller 1070 provides a standard interface to a disk, such as disks 1075 and 1075' in FIG. 1. Disk controller 1070 is also coupled to shared memory controller 1050 either for use of local RAM 1060 or for communication with I/O module bus 1020.

A network controller 1080 provides an interface to a standard network, such as the ETHERNET network, by way of network interface 1082. Network controller 1080 is also coupled to shared memory controller 1050 which acts as an interface both to local RAM 1060 and I/O module bus 1020. There is no requirement, however, for any one specific organization or structure of I/O module bus 1020.

PCIM (power and cooling interface module) support element 1030 is connected to I/O module bus 1020 and to an ASCII interface 1032. PCIM support element 1030 allows processing system 20 to monitor the status of the power system (i.e., batteries, regulators, etc.) and the cooling system (i.e., fans) to ensure their proper operation. Preferably, PCIM support element 1030 only receives messages when there is some fault or potential fault indication, such as an unacceptably low battery voltage. It is also possible to use PCIM support element 1030 to monitor all the power and cooling subsystems periodically. Alternatively PCIM support element 1030 may be connected directly to firewall S 1000 and 1010.

Diagnostics microprocessor 1100 is also connected to the I/O module bus 1020. In general, diagnostics microprocessor 1100 is used to gather error checking information from trace RAMS, such as trace RAM 1872, when faults are detected. That data is gathered into trace buses 1095 and 1096, through firewalls 1000 and 1010, respectively, through module bus 1020, and into microprocessor 1100.

D. INTERPROCESSOR AND INTERMODULE COMMUNICATION

1. Data Paths

Figure 19:
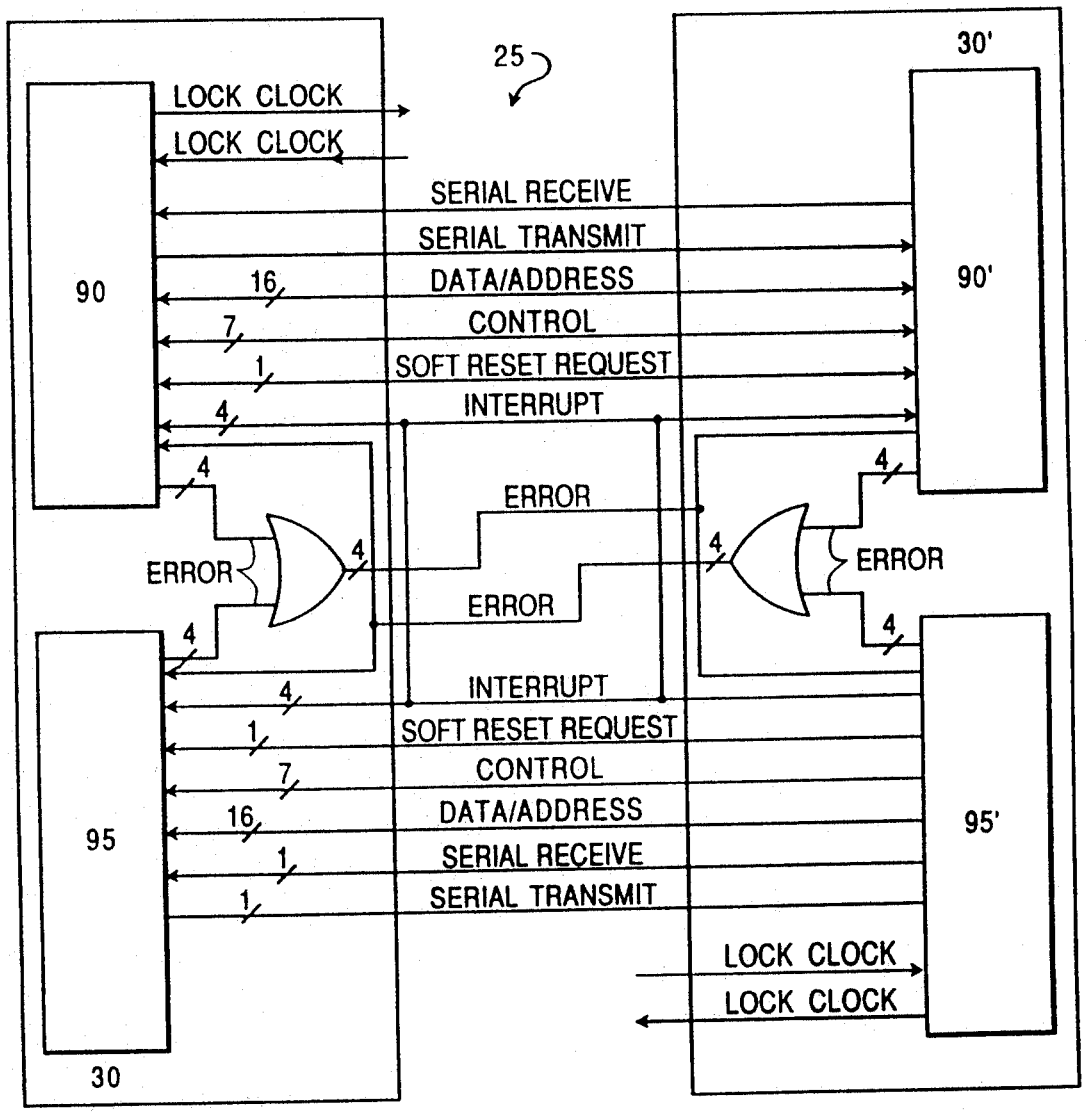
FIG. 19 is a detailed diagram of the elements of the cross-link pathway for the computer system of FIG. 1.

The elements of computer system 10 do not by themselves constitute a fault tolerant system. There needs to be a communications pathway and protocol which allows communication during normal operations and operation during fault detection and correction. Key to such communication is cross-link pathway 25. Cross-link pathway 25 comprises the parallel links, serial links, and clock signals already described. These are shown in FIG. 19. The parallel link includes two identical sets of data and address lines, control lines, interrupt lines, coded error lines, and a soft reset request line. The data and address lines and the control lines contain information to be exchanged between the CPU modules, such as from the module interconnects 130 and 132 (or 130' and 132') or from memory module 60 (60').

The interrupt lines preferably contain one line for each of the interrupt levels available to I/O subsystem (modules 100, 110, 120, 100', 110' and 120'). These lines are shared by cross-links 90, 95, 90' and 95'.

The coded error lines preferably include codes for synchronizing a console "HALT" request for both zones, one for synchronizing a CPU error for both zones, one for indicating the occurrence of a CPU/memory failure to the other zone, one for synchronizing DMA error for both zones, and one for indicating clock phase error. The error lines o from each zone 11 or 11' are inputs to an OR gate, such as OR gate 1990 for zone 11 or OR gate 1990' for zone 11'. The output at each OR gate provides an input to the cross-links of the other zone.

The fault tolerant processing system 10 is designed to continue operating as a dual rail system despite transient faults. The I/O subsystem (modules 100, 110, 120, 100', 110', 120') can also experience transient errors or faults and continue to operate. In the preferred embodiment, an error detected by firewall comparison circuit 1840 will cause a synchronized error report to be made through pathway 25 for CPU directed operations. Hardware in CPU 30 and 30' will cause a synchronized soft reset through pathway 25 and will retry the faulted operation. For DMA directed operations, the same error detection results in synchronous interrupts through pathway 25, and software in CPUs 40, 50, 40' and 50' will restart the DMA operation.

Certain transient errors are not immediately recoverable to allow continued operation in a full-duplex, synchronized fashion. For example, a control error in memory module 60 can result in unknown data in memory module 60. In this situation, the CPUs and memory elements can no longer function reliably as part of a fail safe system so they are removed. Memory array 60 must then undergo a memory resync before the CPUs and memory elements can rejoin the system. The CPU/memory fault code of the coded error lines in pathway 25 indicates to CPU 30' that the CPUs and memory elements of CPU 30 have been faulted.

The control lines, which represent a combination of cycle type, error type, and ready conditions, provide the handshaking between CPU modules (30 and 30') and the I/O modules. Cycle type, as explained above, defines the type of bus operation being performed: CPU I/O read, DMA transfer, DMA setup, or interrupt vector request. Error type defines either a firewall miscompare or a CRC error. "Ready" messages are sent between the CPU and I/O modules to indicate the completion of requested operations.

The serial cross-link includes two sets of two lines to provide a serial data transfer for a status read, loopback, and data transfer.

The clock signals exchanged are the phase locked clock signals CLKC H and CLKC' H (delayed).

FIGS. 20A-D show block diagrams of the elements of CPU modules 30 and 30' and I/O modules 100 and 100' through which data passes during the different operations. Each of those elements has each been described previously.

Figure 20A:
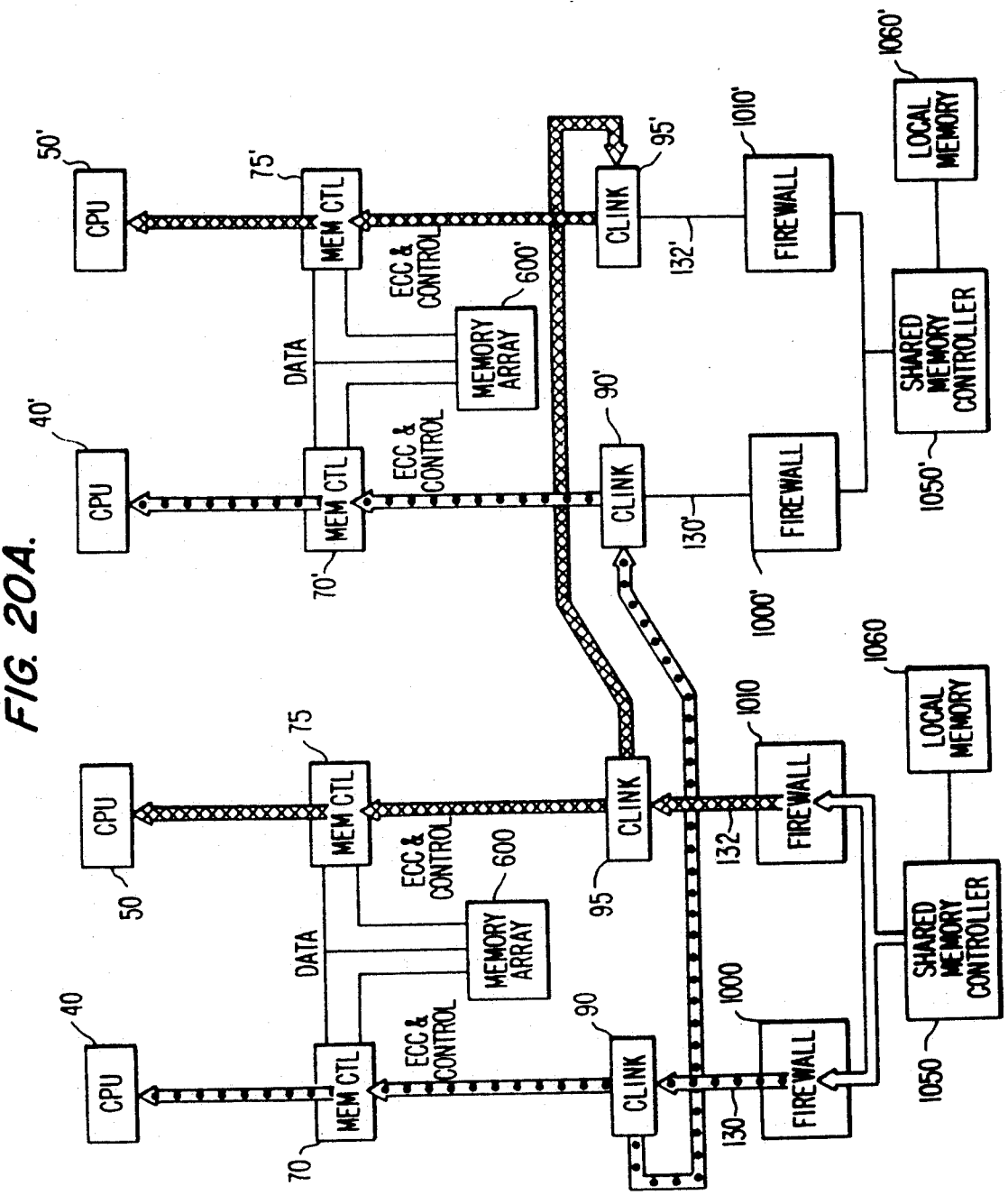

FIG. 20A shows the data pathways for a typical CPU I/O read operation of data from an I/O module 100, such as a CPU I/O register read operation of register data from shaved memory controller 1050 (1050'). Such an operation will be referred to as a read of local data, to distinguish it from a DMA read of data from local memory 1060, which usually contains data from an internal device controller. The local data are presumed to be stored in local RAM 1060 (1060') for transfer through shared memory controller 1050 (1050'). For one path, the data pass through firewall 1000, module interconnect 130, to cross-link 90. As seen in FIG. 12, cross-link 90 delays the data from firewall 1000 to memory controller 70 so that the data to cross-link 90' may be presented to memory controller 70 at the same time the data are presented to memory controller 70, thus allowing processing systems 20 and 20' to remain synchronized. The data then proceed out of memory controllers 70 and 70' into CPUs 40 and 40' by way of internal busses 46 and 46'.

A similar path is taken for reading data into CPUs 50 and 50'. Data from the shared memory controller 1050 proceeds through firewall 1010 and into cross-link 95. At that time, the data are routed both to cross-link 95' and through a delay unit inside cross-link 95.

CPU I/O read operations may also be performed for data received from the I/O devices of processing system 20' via a shared memory controller 1050' and local RAM in I/O device 100'.

Although I/O modules 100, 110, and 120 are similar and correspond to I/O modules 100', 110', and 120', respectively, the corresponding I/O modules are not in lockstep synchronization. Using memory controller 1050' and local RAM 1060' for CPU I/O read, the data would first go to cross-links 90' and 95'. The remaining data path is equivalent to the path from memory controller 1050. The data travel from the cross-links 90' and 95' up through memory controllers 70' and 75' and finally to CPUs 40' and 50', respectively. Simultaneously, the data travel across to cross-links 90 and 95, respectively, and then, without passing through a delay element, the data continue up to CPUs 40 and 50, respectively.

FIG. 20B shows a CPU I/O write operation of local data. Such local data are transferred from the CPUs 40, 50, 40' and 50' to an I/O module, such as I/O module 100. An example of such an operation is a write to a register in shared memory controllers 1050. The data transferred by CPU 40 proceed along the same path but in a direction opposite to that of the data during the CPU I/O read. Specifically, such data pass through bus 46, memory controller 70, various latches (to permit synchronization), firewall 1000, and memory controller 1050. Data from CPU 50' also follow the path of the CPU I/O reads in a reverse direction. Specifically, such data pass through bus 56', memory controller 75', cross-link 95', cross-link 95, and into firewall 1010. As indicated above, firewalls 1000 and 1010 check the data during I/O write operations to check for errors prior to storage.

When writes are performed to an I/O module in the other zone, a similar operation is performed. However, the data from CPUs 50 and 40' are used instead of CPUs 50' and 40.

The data from CPUs 50 and 40' are transmitted through symmetrical paths to shared memory controller 1050'. The data from CPUs 50 and 40 are compared by firewalls 1000' and 1010'. The reason different CPU pairs are used to service I/O write data is to allow checking of all data paths during normal use in a full duplex system. Interrail checks for each zone were previously performed at memory controllers 70, 75, 70' and 75'.

Figure 20C:
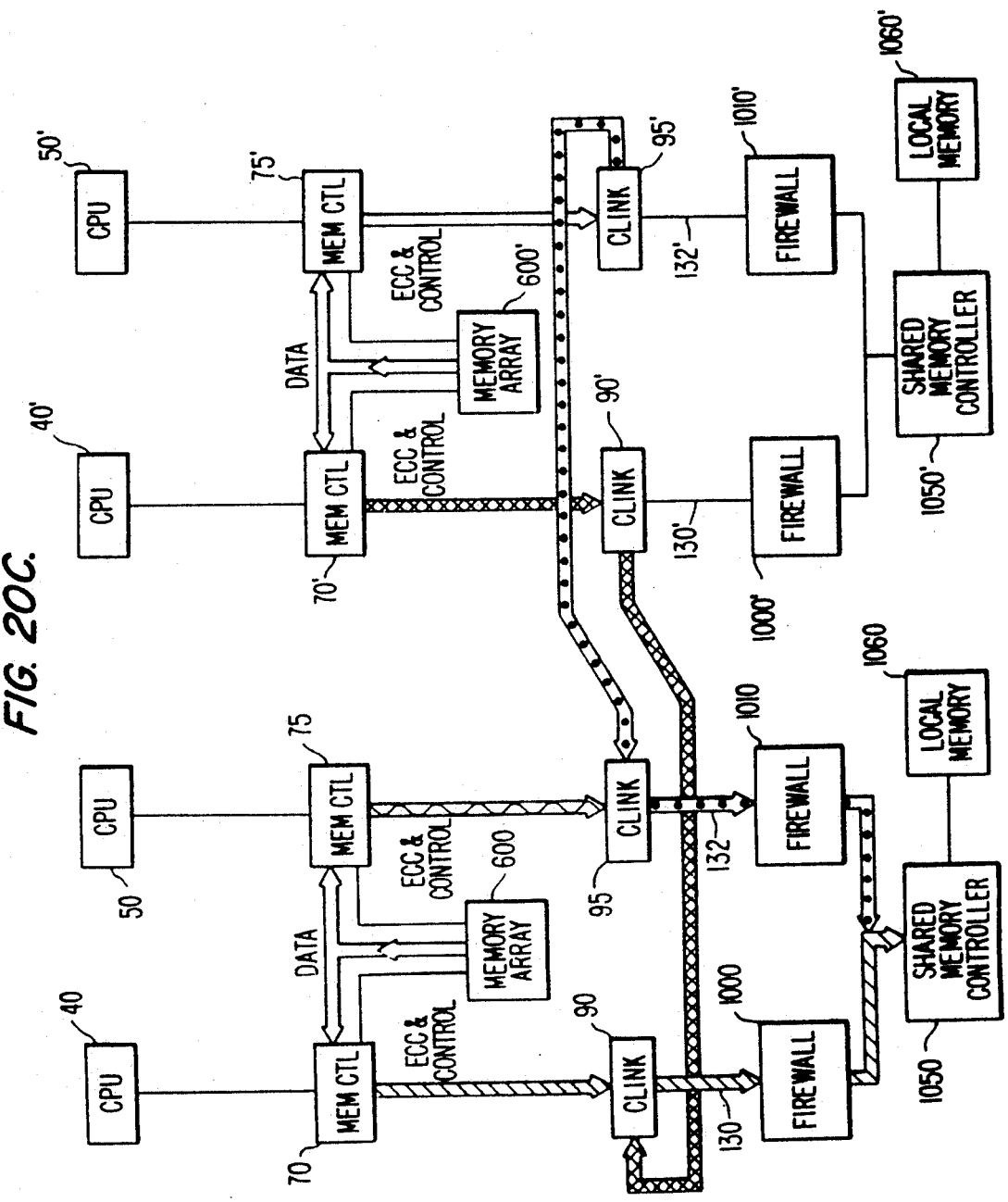

FIG. 20C shows the data paths for DMA read operations. The data from memory array 600 pass simultaneously into memory controllers 70 and 75 and then to cross-links 90 and 95. Cross-link 90 delays the data transmitted to firewall 1000 so that the data from cross-links 90 and 95 reach firewalls 1000 and 1010 at substantially the same time.

Figure 20D:
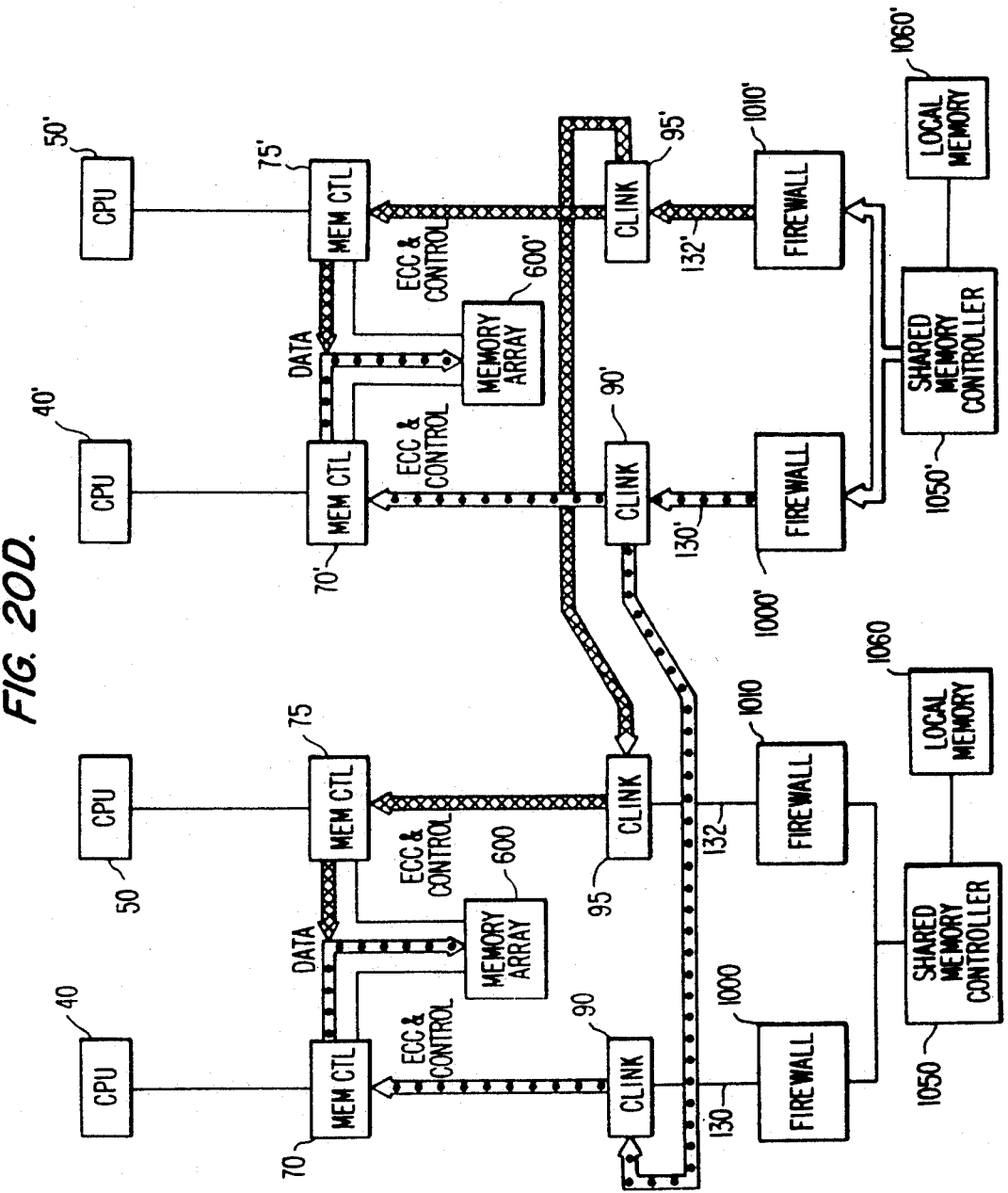

Similar to the CPU I/O write operation, there are four copies of data of data to the various cross-links. At the firewall, only two copies are received. A different pair of data are used when performing reads to zone 11. The data paths for the DMA write operation are shown in FIG. 20D and are similar to those for a CPU I/O read. Specifically, data from shared memory controller 1050' proceed through firewall 1000', cross-link 90' (with a delay), memory controller 70', and into memory array 600'. Simultaneously, the data pass through firewall 1010', cross-link 95' (with a delay), and memory controller 75', at which time it is compared with the data from memory controller 70' during an interrail error check. As with the CPU I/O read, the data in a DMA write operation may alternatively be brought up through shared memory controller 1050 in an equivalent operation.

The data out of cross-link 90' also pass through cross-link 90 and memory controller 70 and into memory array 600. The data from cross-link 95' pass through cross-link 95 and memory controller 75, at which time they are compared with the data from memory controller 70' during a simultaneous interrail check.

Figure 20E:
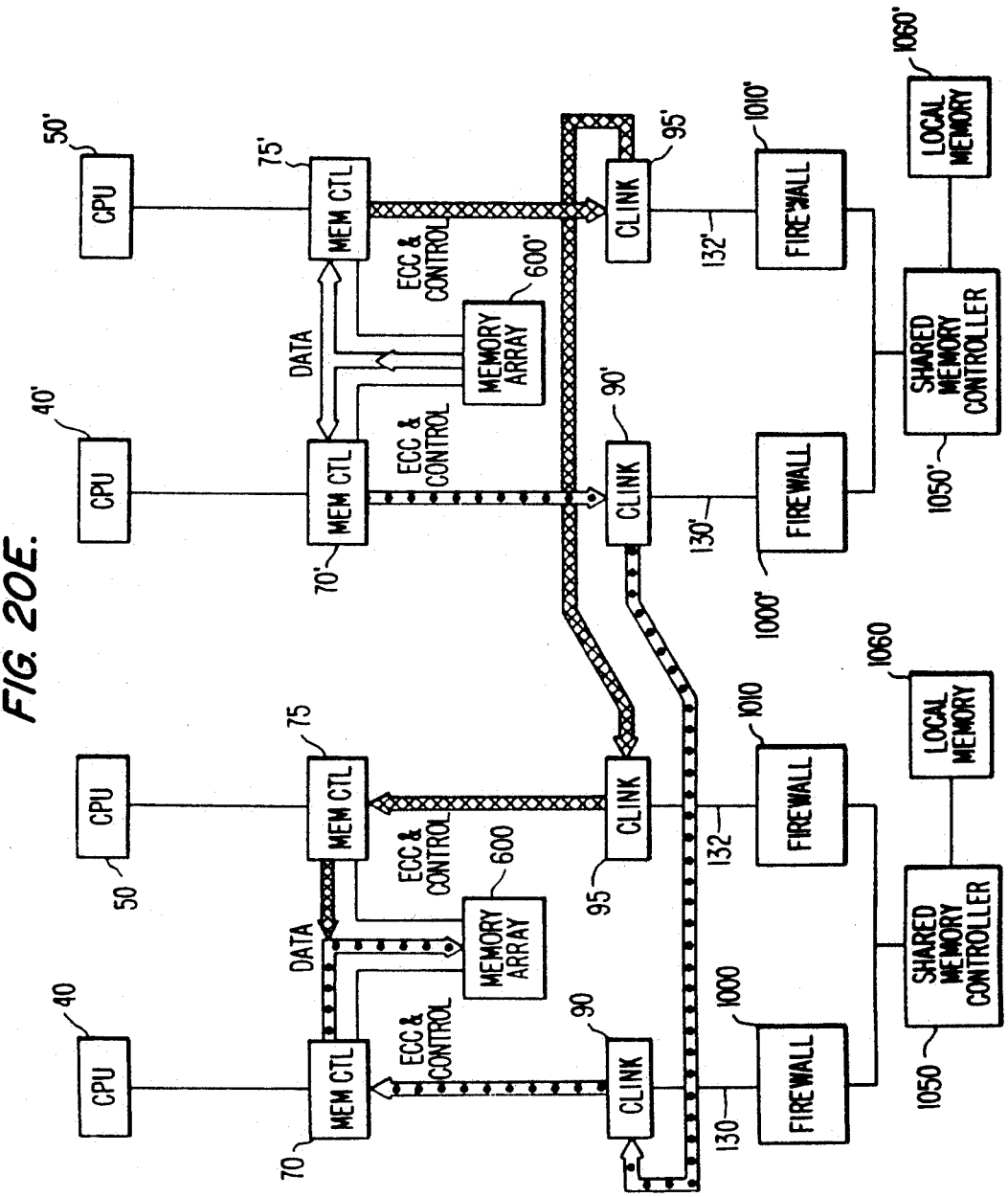

The data path for a memory resynchronization (resync) operation is shown in FIG. 20E. In this operation the contents of both memory arrays 60 and 60' must be set equal to each other. In memory resync, data from memory array 600, pass through memory controllers 70' and 75' under DMA control, then through cross-links 90' and 95', respectively. The data then enters cross-links 90 and 95 and memory controllers 70 and 75, respectively, before being stored in memory array 600.

2. Resets

The preceding discussions of system 10 have made reference to many different needs for resets. In certain instances not discussed, resets are used for standard functions, such as when power is initially applied to system 10. Most systems have a single reset which always sets the processor back to some predetermined or initial state, and thus disrupts the processors' instruction flow. Unlike most other systems, however, resets in system 10 do not affect the flow of instruction execution by CPUs 40, 40', 50 and 50' unless absolutely necessary. In addition, resets in system 10 affect only those portions that need to be reset to restore normal operation.

Another aspect of the resets in system 10 is their containment. One of the prime considerations in a fault tolerant system is that no function should be allowed to stop the system from operating should that function fail. For this reason, no single reset in system 10 controls elements of both zones 11 and 11' without direct cooperation between zones 11 and 11'. Thus, in full duplex mode of operation, all resets in zone 11 will be independent of resets in zone 11'. When system 10 is in master/slave mode, however, the slave zone uses the resets of the master zone. In addition, no reset in system 10 affects the contents of memory chips. Thus neither cache memory 42 and 52, scratch pad memory 45 and 55 nor memory module 60 lose any data due to a reset.

There are preferably three classes of resets in system 10; "clock reset," "hard reset," and "soft reset." A clock reset realigns all the clock phase generators in a zone. A clock reset in zone 11 will also initialize CPUs 40 and 50 and memory module 60. A clock reset does not affect the module interconnects 130 and 132 except to realign the clock phase generators on those modules. Even when system 10 is in master/slave mode, a clock reset in the slave zone will not disturb data transfers from the master zone to the slave zone module interconnect. A clock reset in zone 11', however, will initialize the corresponding elements in zone 11'.

In general, a hard reset returns all state devices and registers to some predetermined or initial state. A soft reset only returns state engines and temporary storage registers to their predetermined or initial state. The state engine in a module is the circuitry that defines the state of that module. Registers containing error information and configuration data will not be affected by a soft reset. Additionally, system 10 will selectively apply both hard resets and soft resets at the same time to reset only those elements that need to be reinitialized in order to continue processing.

The hard resets clear system 10, as in conventional systems, return system 10 to a known configuration. Hard resets are used after power is applied, when zones are to be synchronized, or to initialize or disable an I/O module. In system 10 there are preferably four hard resets: "power up reset," "CPU hard reset," "module reset," and "device reset." Hard resets can be further broken down into local and system hard resets. A local hard reset only affects logic that responds when the CPU is in the slave mode. A system hard reset is limited to the logic that is connected to cross-link cables 25 and module interconnects 130 and 132.

The power up reset is used to initialize zones 11 and 11' immediately after power is supplied. The power up reset forces an automatic reset to all parts of the zone. A power up reset is never connected between the zones of system 11 because each zone has its own power supply and will thus experience different length "power-on" events. The power up reset is implemented by applying all hard resets and a clock reset to zone 11 or 11'.

The CPU hard reset is used for diagnostic purposes in order to return a CPU module to a known state. The CPU hard reset clears all information in the CPUs, memory controllers, and memory module status registers in the affected zone. Although the cache memories and memory modules are disabled, the contents of the scratch pad RAMs 45 and 55 and of the memory module 60 are not changed. In addition, unlike the power up reset, the CPU hard reset does not modify the zone identification of the cross-links nor the clock mastership. The CPU hard reset is the sum of all local hard resets that can be applied to a CPU module and a clock reset.

The module hard reset is used to set the I/O modules to a known state, such as during bootstrapping, and is also used to remove a faulting I/O module from the system. The I/O module hard reset clears everything on the I/O module, leaves the firewalls in a diagnostic mode, and disables the drivers.

A device reset is used to reset I/O devices connected to the I/O modules. The resets are device dependent and are provided by the I/O module to which the device is connected.

The other class of resets is soft resets. As explained above, soft resets clear the state engines and temporary registers in system 10 but they do not change configuration information, such as the mode bits in the cross-links. In addition, soft resets also clear the error handling mechanisms in the modules, but they do not change error registers such as system error register 898 and system fault address register 865.

Soft resets are targeted so that only the necessary portions of the system are reset. For example, if module interconnect 130 needs to be reset, CPU 40 is not reset nor are the devices connected to I/O module 100.

There are three unique aspects of soft resets. One is that each zone is responsible for generating its own reset. Faulty error or reset logic in one zone is thus prevented from causing resets in the non-faulted zone.

The second aspect is that the soft reset does not disrupt the sequence of instruction execution. CPUs 40, 40', 50, 50' are reset on a combined clock and hard reset only. Additionally memory controllers 70, 75, 70' and 75' have those state engines and registers necessary to service CPU instructions attached to hard reset. Thus the soft reset is transparent to software execution.

The third aspect is that the range of a soft reset, that is the number of elements in system 10 that is affected by a soft reset, is dependent upon the mode of system 10 and the original reset request. In full duplex mode, the soft reset request originating in CPU module 30 will issue a soft reset to all elements of CPU module 30 as well as all firewalls 1000 and 1010 attached to module interconnect 130 and 132. Thus all modules serviced by module interconnect 130 and 132 will have their state engines and temporary registers reset. This will clear the system pipeline of any problem caused by a transient error. Since system 10 is in duplex mode, zone 11' will be doing everything that zone 11 is. Thus CPU module 30' will, at the same time as CPU module 30, issue a soft reset request. The soft reset in zone 11' will have the same effect as the soft reset in zone 11.

When system 10 is in a master/slave mode, however, with CPU module 30' in the slave mode, a soft reset request originating in CPU module 30 will, as expected, issue a soft reset to all elements of CPU module 30 as well as all firewalls 1000 and 1010 attached to module interconnects 130 and 132. Additionally, the soft reset request will be forwarded to CPU module 30' via cross-links 90 and 90', cross-link cables 25, and cross-links 90' and 95'. Parts of module interconnects 130' and 132' will receive the soft reset. In this same configuration, a soft reset request originating from CPU module 30' will only reset memory controllers 70' and 75' and portions of cross-links 90' and 95'.

Soft resets include "CPU soft resets" and "system soft resets." A CPU soft reset is a soft reset that affects the state engines on the CPU module that originated the request. A system soft reset is a soft reset over the module interconnect and those elements directly attached to it. A CPU module can always request a CPU soft reset. A system soft reset can only be requested if the cross-link of the requesting CPU is in duplex mode, master/slave mode, or off mode. A cross-link in the slave mode will take a system soft reset from the other zone and generate a system soft reset to its own module interconnects.

CPU soft resets clear the CPU pipeline following an error condition. The CPU pipeline includes memory interconnects 80 and 82, latches (not shown) in memory controllers 70 and 75, DMA engine 800, and cross-links 90 and 95. The CPU soft reset can also occur following a DMA or I/O time-out. A DMA or I/O time-out occurs when the I/O device does not respond within a specified time period to a DMA or an I/O request.

Figure 21:
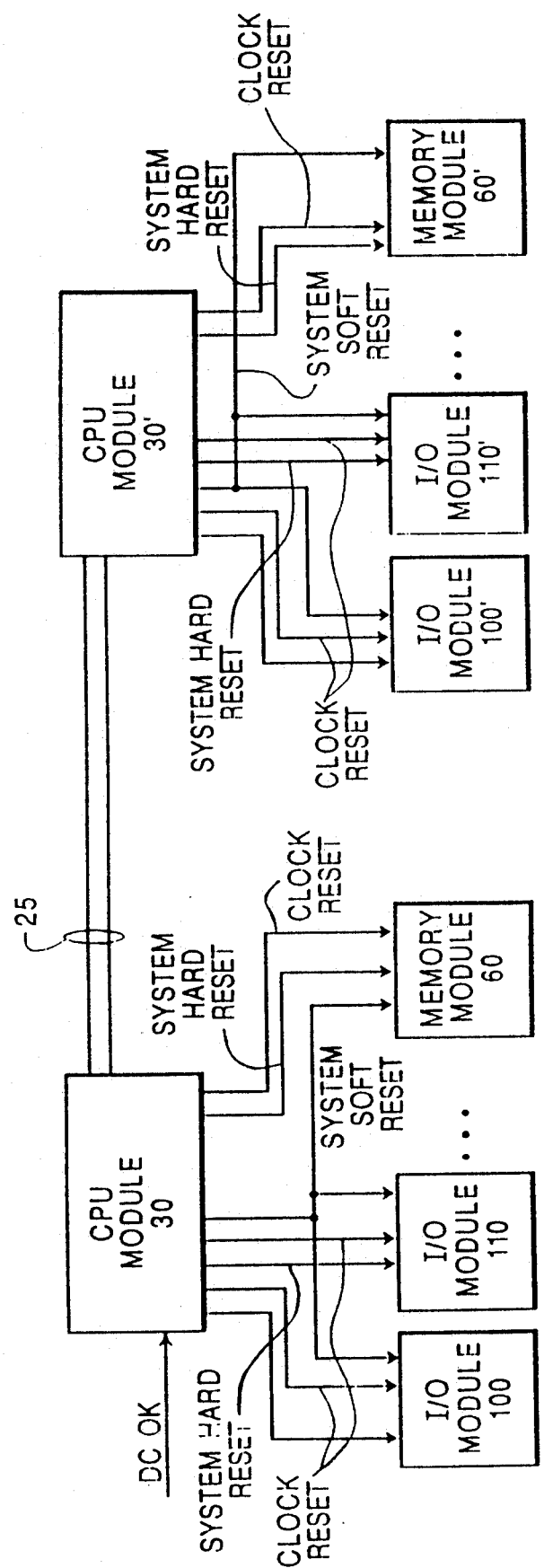
FIG. 21 is a block diagram of zone 20 showing the routing of reset signals.

FIG. 21 shows the reset lines from the CPU modules 30 and 30' to the I/O modules 100, 110, 100', and 110' and to the memory modules 60 and 60'. The CPU module 30 receives a DC OK signal indicating when the power supply has settled. It is this signal which initializes the power-up reset. CPU module 30' receives a similar signal from its power supply.

One system hard reset line is sent to each I/O module, and one system soft reset is sent to every three I/O modules. The reason that single hard reset is needed for each module is because the system hard reset line are used to remove individual I/O modules from system 10. The limitation of three I/O modules for each system soft reset is merely a loading consideration. In addition, one clock reset line is sent for every I/O module and memory module. The reason for using a single line per module is to control the skew by controlling the load.

Figure 22:
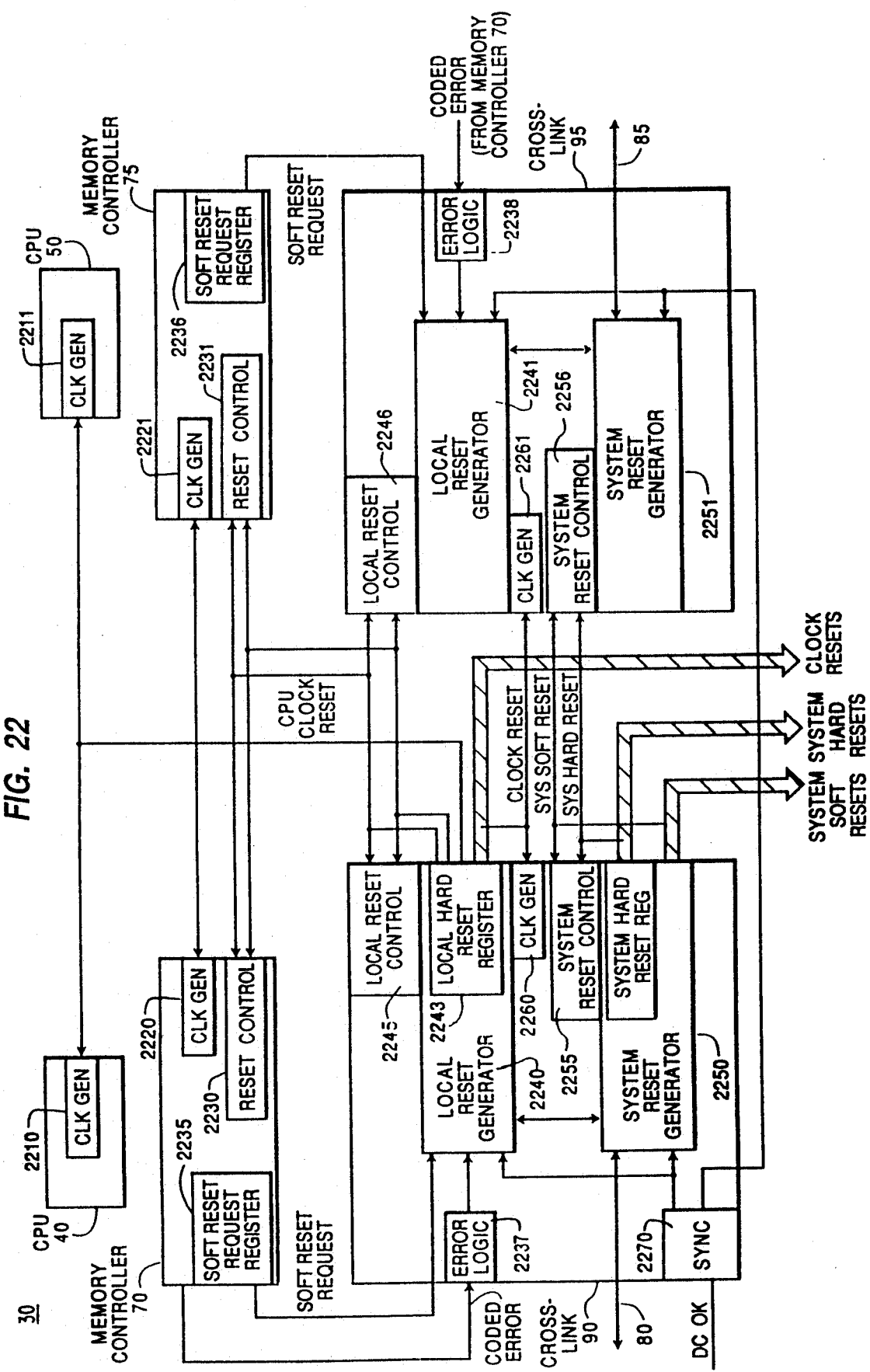
FIG. 22 is a block diagram of the components involved in resets in the CPU module shown in FIG. 3.

FIG. 22 shows the elements of CPU module 30 which relate to resets. CPUs 40 and 50 contain clock generators 2210 and 2211, respectively. Memory controllers 70 and 75 contain clock generators 2220 and 2221, respectively, and cross-links 90 and 95 contain clock generators 2260 and 2261, respectively. The clock generators divide down the system clock signals for use by the individual modules.

Memory controller 70 contains reset control circuitry 2230 and a soft reset request register 2235. Memory controller 75 contains reset control circuitry 2231 and a soft reset request register 2236.

Cross-link 90 contains both a local reset generator 2240 and a system reset generator 2250. Cross-link 95 contains a local reset generator 2241 and a system reset generator 2251. The "local" portion of a cross-link is that portion of the cross-link which remains with the CPU module when that cross-link is in the slave mode and therefore includes the serial registers and some of the parallel registers. The "system" portion of a cross-link is that portion of the cross-link that is needed for access to module interconnects 130 and 132 (or 130' and 132') and cross-link cables 25.

The local reset generators 2240 and 2241 generate resets for CPU module 30 by sending hard and soft reset signals to the local reset control circuits 2245 and 2246 of cross-links 90 and 95, respectively, and to the reset control circuits 2230 and 2231 of memory controller 70 and 75, respectively. Local cross-link reset control circuits 2245 and 2246 respond to the soft reset signals by resetting their state engines, the latches storing data to be transferred, and their error registers. Those circuits respond to the hard reset signals by taking the same actions as are taken for the soft resets, and by also resetting the error registers and the configuration registers. Reset control circuits 2230 and 2231 respond to hard and soft reset signals in a similar manner.

In addition, the local reset generator 2240 sends clock reset signals to the I/O modules 100, 110 and 120 via module interconnects 130 and 132. The I/O modules 100, 110, and 120 use the clock reset signals to reset their clocks in the manner described below. Soft reset request registers 2235 and 2236 send soft request signals to local reset generators 2240 and 2241, respectively.

System reset generators 2250 and 2251 of cross-links 90 and 95, respectively, send system hard reset signals and system soft reset signals to I/O modules 100, 110, and 120 via module interconnects 130 and 132, respectively. I/O modules 100, 110, and 120 respond to the soft reset signals by resetting all registers that are dependent on CPU data or commands. Those modules respond to the hard reset signals by resetting the same register as soft resets do, and by also resetting any configuration registers.

In addition, the system reset generators 2250 and 2251 also send the system soft and system hard reset signals to the system reset control circuit 2255 and 2256 of each cross-link. System reset control circuit 2255 and 2256 respond to the system soft reset signals and to the system hard reset signals in a manner similar to the response of the local reset control circuits to the local soft and local hard reset signals.

Memory controllers 70 and 75 cause cross-links 90 and 95, respectively, to generate the soft resets when CPUs 40 and 50, respectively, write the appropriate codes into soft reset request registers 2235 and 2236, respectively. Soft reset request registers 2235 and 2236 send soft reset request signals to local reset generators 2240 and 2241, respectively. The coded error signal is sent from memory controller 70 to local reset generators 2240 and 2241.

System soft resets are sent between zones along the same data paths data and control signals are sent. Thus, the same philosophy of equalizing delays is used for resets as for data and addresses, and resets reach all of the elements in both zones at approximately the same time.

Hard resets are generated by CPUs 40 and 50 writing the appropriate code into the local hard reset registers 2243 or by the request for a power up reset caused by the DC OK signal.

Synchronization circuit 2270 in cross-link 90 includes appropriate delay elements to ensure that the DC OK signal goes to all of the local and reset generators 2240, 2250, 2241 and 2251 at the same time.

In fact, synchronization of resets is very important in system 10. That is why the reset signals originate in the cross-links. In that way, the resets can be sent to arrive at different modules and elements in the modules approximately synchronously.

With the understanding of the structure in FIGS. 21 and 22, the execution of the different hard resets can be better understood. The power up reset generates both a system hard reset, a local hard reset and a clock reset. Generally, cross-links 90, 95, 90' and 95' are initially in both the cross-link off and resync off modes, and with both zones asserting clock mastership.

The CPU/MEM fault reset is automatically activated whenever memory controllers 70, 75, 70' and 75' detect a CPU/MEM fault. The coded error logic is sent from error logic 2237 and 2238 to both cross-links 90 and 95. The CPU module which generated the fault is then removed from system 10 by setting its cross-link to the slave state and by setting the cross-link in the other CPU module to the master state. The non-faulting CPU module will not experience a reset, however. Instead, it will be notified of the fault in the other module through a code in a serial cross-link error register (not shown). The CPU/MEM fault reset consists of a clock reset to the zone with the failing CPU module and a local soft reset to that module.

A resync reset is essentially a system soft reset with a local hard reset and a clock reset. The resync reset is used to bring two zones into lockstep synchronization. If, after a period in which zones 11 and 11' were not synchronized, the contents of the memory modules 60 and 60', including the stored states of the CPU registers, are set equal to each other, the resync reset is used to bring the zones into a compatible configuration so they can restart in a duplex mode.

The resync reset is essentially a CPU hard reset and a clock reset. The resync reset is activated by software writing the resync reset address into one of the parallel cross-link registers. At that time, one zone should be in the cross-link master/resync master mode and the other in the cross-link slave/resync slave mode. A simultaneous reset will then be performed on both the zones which, among other things, will set all four cross-links into the duplex mode. Since the resync reset is not a system soft reset, the I/O modules do not receive reset.

The preferred embodiment of system 10 also ensures that clock reset signals do not reset conforming clocks, only non-conforming clocks. The reason for this is that whenever a clock is reset, it alters the timing of the clocks which in turn affects the operation of the modules with such clocks. If the module was performing correctly and its clock was in the proper phase, then altering its operation would be both unnecessary and wasteful.

Figure 23:
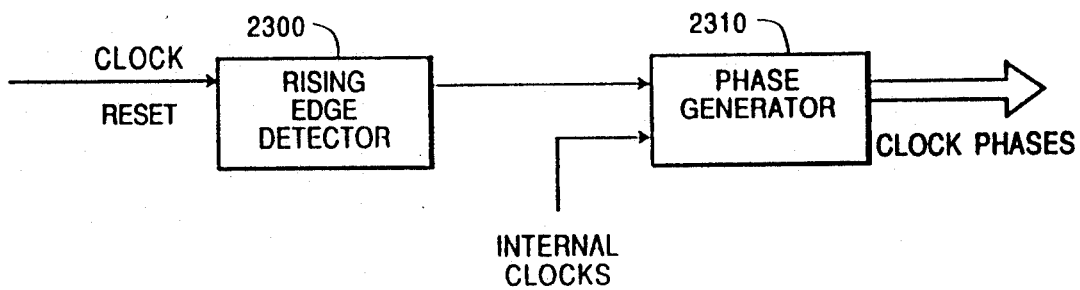
FIG. 23 is a diagram of clock reset circuitry.

FIG. 23 shows a preferred embodiment of circuitry which will ensure that only nonconforming clocks are reset. The circuitry shown in FIG. 23 preferably resides in the clock generators 2210, 2211, 2220, 2221, 2260, and 2261 of the corresponding modules shown in FIG. 22.

In the preferred embodiment, the different clock generators 2210, 2211, 2220, 2221, 2260, and 2261 include a rising edge detector 2300 and a phase generator 2310. The rising edge detector 2300 receives the clock reset signals from the cross-links 90 and 95 and generates a pulse of known duration concurrent with the rising edge of the clock reset signal. That pulse is in an input to the phase generator 2310 as are the internal clock signals for the particular module. The internal clock signals for that module are clock signals which are derived from the system clock signals that have been distributed from oscillator systems 200 and 200'.

Phase generator 2310 is preferably a divide-down circuit which forms different phases for the clock signals. Other designs for phase generator 2310, such as recirculating shift registers, can also be used.

Preferably, the rising edge pulse from rising edge detector 2300 causes phase generator 2310 to output a preselected phase. Thus, for example, if phase generator 2310 were a divide-down circuit with several stages, the clock reset rising edge pulse could be a set input to the stage which generates the preselected phase and a reset input to all other stages. If phase generator 2310 were already generating that phase, then the presence of the synchronized clock reset signal would be essentially transparent.

E. ERROR HANDLING

Error handling involves error detection, error recovery, and error reporting. Error detection has been discussed above with respect to the comparison elements in memory controllers 70, 75, 70' and 75', memory module 60 and 60', cross links 90, 95, 90' and 95', and firewalls 1000, 1010, and 1000' and 1010'.

Error recovery in the present invention is designed to minimize the time spent on such recovery and to minimize the overhead which error recovery imposes on normally executing software. There are two aspects to this error recovery: hardware and software. Hardware error recovery is attempted for most faults before software error recovery within the general software error processing process is attempted. If the faults for which hardware error recovery is attempted are transient, error recovery back to fault tolerant lockstep operation may be performed most of the time entirely by the hardware. If hardware error recovery is not successful or is not used, then software error recovery is attempted. Such software error recovery is designed to allow CPUs 40, 50 and 40', 50' to perform an orderly transition from normal operation to the error handling process.

Error recovery is complete when the data processing system has determined which module is the source of the error and has disabled the faulty device or otherwise reconfigured the system to bypass the faulty device.

1. Hardware Error Handling and Recovery

In the preferred embodiment of the invention, error recovery is implemented as much as possible at the hardware level. This is done to minimize time spent in the error recovery phase of error handling and to minimize the complexity of the software. Software intervention generally takes more time and causes a greater impact on the rest of the system. This is especially true in a multiprocessor system, such as system 10, where different zones 11 and 11' are in lockstep synchronization with each other. The greater the percentage of the error handling that can take place in hardware, the less will be the impact on the whole system.

There are three basic categories of faults or errors in system 10 which can be resolved using a hardware error recovery algorithm. These errors are a CPU I/O error, a CPU/MEM fault, and a DMA error. The error handling routines for each type of error differ slightly.

FIG. 24 illustrates a flow diagram 2400 showing the overall hardware error handling procedure. As with prior explanations, the procedure in process 2400 will be described where possible with reference to zone 11 with the understanding that the process could be executed equivalently with the elements of zone 11'.

Prior to discussing diagram 2400, it is important to understand certain principles of error handling. After a date processing operation is performed, there is a window of time during which information is present which allows an error to be associated with the bus operation which generated the error. The term "bus operation" refers to a complete operation initiated by CPUs 40, 50, 40' or 50' which requires resources, such as memory modules 60 and 60', not directly connected to CPUs 40, 50, 40', or 50'.

As FIG. 24 illustrates, after a bus operation is performed (step 2410), a determination is made whether an error occurred. If no error is detected (step 2420), there is no need for hardware error handling and the procedure is complete (step 2440).

If an error is detected, however, hardware error handling must be initiated in the time window following the bus operation that caused the fault. First, the type of error must be identified (step 2430). The error types include CPU I/O error, DMA error, or CPU/MEM fault.

Depending on the data processing instruction or operation being performed by data processing system 10, different hardware error handling procedures will be followed. When a CPU I/O error is detected, a CPU I/O error handler is entered (step 2450). The CPU I/O error generally indicates some type of error occurred in an area peripheral to CPUs 40 and 50, memory module 60, and the portions of memory controllers 70 and 75 interfacing with memory module 60. A CPU I/O error occurs, for example, when there is a time-out of CPU busses 88 and 89 or an I/O miscompare detected at either firewalls 1000 and 1010, memory controllers 70 and 75 or cross-links 90 and 95. For such a situation, CPUs 40 and 50 can be considered capable of continued reliable operation.

The CPU I/O error handling is described below. In general, however, after the CPU I/O hardware error processing is complete, registers will be set to indicate whether the error was transient, or solid, and will be loaded with other information for error analysis. A transient fault or error means that a retry of a faulty operation was successful during hardware error recovery. Also, an interrupt (Sys Err) of a predetermined level is set so that CPUs 40 and 50 will execute software error recovery or logging.

If an error is detected during a DMA operation, the DMA error handler is entered (step 2452). This error would be detected during a DMA operation, for example, when there is a time-out of CPU busses 88 and 89 or an I/O miscompare detected at either firewalls 1000 and 1010, memory controllers 70 and 75 or cross-links 90 and 95. Because DMA is operating asynchronously with respect to the operation of CPUs 40 and 50, the principal action of the DMA handler (step 2452) will be to shut down DMA engine 800, and to use various other responses discussed below, such as setting a Sys Err interrupt and a DMA interrupt.

If an error is detected such that the operation of the CPUs 40 or 50 or the contents of memory module 60 are in question, then the error is deemed a CPU/MEM fault and the CPU/MEM fault handler is entered (step 2454). Examples of CPU/MEM faults are a double bit ECC error, a miscompare on data from CPUs 40 and 50, or miscompare on addresses sent to memory module 60. Detection of a CPU/MEM fault brings into doubt the state of the CPU module 30 and its associated memory module 60. This type of error is considered critical and requires that the CPU memory pair which experienced the CPU/MEM fault shut itself down automatically and the system reconfigure. The questionable state of the faulting CPU or associated memory makes further error processing in hardware or software by the corresponding CPU memory pair unreliable.

The flow diagram of FIG. 25 illustrates a preferred process 2500 for handling CPU I/O errors which includes the CPU I/O handler (step 2450) of FIG. 24. In the preferred embodiment of the invention, the signals described in this error handling process as well as the other error handling processes are illustrated in FIG. 26.

One important aspect of hardware CPU I/O error handling is that some operations which are external to memory controllers 70 and 75 do not have a delay after the operation unless an error signal is received. Therefore, if an error signal is received for data corresponding to such an operation, then the system will delay so that all error reports will propagate to the memory controllers 70 and 75.

The series of operations performed by memory controllers 70 and 75 after a CPU I/O error signal is received (step 2510) are initiated by memory controllers 70 and 75 if one of three conditions exist: (1) a specific signal is transmitted up from cross-links 90 and 95, (2) an error report is generated by memory module 60, or (3) an internal error signal is generated at memory controllers 70 and 75.

The specific signal transmitted from cross-links 90 and 95 is a code that is simultaneously transmitted along the control status lines of busses 88 and 89. In the preferred embodiment of the invention, such a code is generated either when a miscompare is detected at the firewalls 1000 and 1010 or when cross-links 90 and 95 detect a rail miscompare, such as in EXCLUSIVE OR gates 960 and 960m in FIG. 11. If firewalls 1000 and 1010 detect a miscompare, they transmit a predetermined bit pattern to cross-links 90 and 95 via module interconnects 130 and 132, respectively, and that pattern is then retransmitted to memory controllers 70 and 75, respectively.

Memory controllers 70 and 75 send these error signals to diagnostic error register logic 870, shown in FIG. 9, which generates an error pulse. That error pulse sets bits in diagnostic error register 880 (step 2510). The error pulse from diagnostic error logic 870 is an input to error categorization logic 850.

The output of error categorization logic 850 is transmitted to encoder 855 which generates an error code (step 2510). The error code is transmitted from AND gate 856 when the hardware error handling is enabled, and error disable bit 878 is set accordingly. The error code is then sent to cross-links 90 and 95.

In response to the error code, cross-links 90 and 95 perform a series of hardware operations (step 2520). One of those operations is the assertion of a predetermined error signal on the zone error lines for distribution to system 10 (step 2520). There is one set of four zone error lines per zone as shown in FIGS. 19 and 26. The zone error signal for zone 11 is formed when error lines from cross-links 90 and 95 (cross-links 90' and 95' for the error signal of zone 11') are ORed together (OR gates 1990 and 1992 in FIG. 19). This is done so that a consistent error report is generated by cross-links 90 and 95 (and cross-links 90' and 95') to be sent out to the other zone's cross-links.

After distributing the predetermined error signal to the other cross-links (step 2520), error logic circuits in cross-links 90, 95, 90', and 95' simultaneously post a Sys Err interrupt, freeze the trace RAMS, and send a Retry Request (step. 2520). Cross-links 90 and 95 post a Sys Err Interrupt by setting the Sys Err line (See FIG. 26) which transmits he interrupt to CPUs 40 and 50. Also cross-links 90 and 95 freeze trace RAMs (step 2520), which are connected to various busses to capture bus information, by setting a global error line (See FIG. 26).

The trace RAMs are frozen to capture the most recent data transferred just prior to the detection of the error. The function of trace RAMs will be briefly described in this section, and their use in error analysis will be discussed in the discussion of software error handling.

In system 10, trace RAMs are preferably located on all major rail data paths. FIG. 27 is a block diagram of CPU module 30 and I/O module 100 showing preferred locations of trace RAMs in computer system 10. Of course, other locations may also be selected. The function of the trace RAMs is to permit the identification of the source of errors by tracing the miscomparisons of data between trace RAM contents.

In FIG. 27, trace RAMs 2700 and 2705 are located in firewalls 1000 and 1010, respectively, and are coupled to module interconnects 130 and 132, respectively. Trace RAMs 2710, 2715, and 2718, respectively, are located on the interference with corresponding busses of cross-link 90 and trace RAMs 2720, 2725, and 2728, respectively, are located on the interference with corresponding busses of cross-link 95. A complementary set of trace RAMs are located in processing system 20'.

In zone 11, trace RAMs 2700 and 2718 monitor module interconnect 130, trace RAMs 2705 and 2728 monitor module interconnect 132, trace RAMs 2715 and 2725 monitor cross-link cable 25, trace RAM 2710 monitors bus 88, and trace RAM 2720 monitors bus 89. The corresponding trace RAMs in zone 11' monitor the respective busses.

An example of a trace RAM 2800 is shown in FIG. 28. Trace RAM 2800 is preferably organized as a circular buffer which stores the data transferred on the N most recent cycles of the associated bus pathway.

Trace RAM 2800 comprises a buffer register 2805 having inputs coupled to receive data from an associated data path. A load input into buffer 2805 is the output of AND gate 2815. The inputs to AND gate 2815 are a clock signal from the data path, a global error signal generated when a fault is detected, and a trace RAM enable signal from trace RAM decoder 2820.

The trace RAM enable signal enables storage of data from the corresponding bus when the bus is not in an idle state. During bus idle cycles the bus is not being used to transmit data, therefore, the trace RAM does not continue to store the signals present on the bus.

Preferably, the global error signal causes the trace RAM to freeze its data and stop storing additional signals. The inverse of the global error signal is presented to AND gate 2815 so that when the global error signal is asserted, buffer 2805 will cease storing the signals present on the associated data path.

The address inputs of buffer 2805 are supplied by a recycling counter 2810 which receives a count signal from AND gate 2815.

Each of the trace RAMs keep in its memory a copy of the N most recent non-idle transactions on the data pathway associated with it. For example, in FIG. 27 trace RAM 2700 keeps a copy of the N most recent transactions on module interconnect 130.

The depth N of the trace RAM 2800 is determined by the total number of bus cycles which are required for the most distant message transferred plus the total number of cycles which would be required to send the global error signal to the trace RAM when an error or fault occurs. In the preferred embodiment, sixteen non-idle bus cycles are stored.

The remaining action taken in direct response to the generation of the error code is the transmission of a retry request. Error logic circuits 2237 and 2238 in cross-links 90 and 95 send a Retry Request (see FIG. 26) in response to the error code (step 2520). The Retry Request causes a series of operations to occur at approximately the same time in memory controllers 70 and 75 (step 2530): incrementing the fault level, freezing the system fault error address register and sending a soft reset request.

The current hardware error recovery fault level or status resides in two bits of system fault error register 898. These two bits are the transient bit and the solid bit (see FIG. 9). The combination of these two bits is designated as the bus error code. There are three valid values of the bus error code when interpreting CPU I/O fonts. One valid value corresponds to a system status in which there are no currently pending errors and no error recovery algorithm is currently being executed. A second valid value of the bus error code corresponds to the system status in which there has been an error on the initial execution of an operation or an error has occurred for which no retry was attempted. The third valid value corresponds to the case of an error occurring after an operation has been retired. The Retry Request is an input to encoder 895 which interconnects the fault level.

The fault level may be incremented multiple times by multiple errors if the errors occur so frequently that the original fault level was not cleared by the software error processing. Thus, two faults occurring in rapid succession may be seen by the software error processing as being a solid fault.

The incrementing of the fault level causes the system fault error address register to freeze. The transient bit is set at both the first and second fault levels, but not at the lowest level corresponding to no currently pending errors. The transient bit disables and thereby freezes system fault error address register 898. System fault error address register 865 is contained in memory controllers 7 and 75 and is frozen to allow the current bus operation to be retried and to assist in performing diagnostics.

A Soft Reset Request is sent (step 2530) to cross-links 90 and 95 by memory controllers 70 and 75, respectively, by setting the Soft Reset Request lines shown in FIG. 26. Additionally, when memory controllers 70 and 75 receive the Retry Request, they stop DMA engine 800, write an error code into a status register in 88 and 89 between memory controllers 70 and 75 and cross-links 90 and 95, respectively.

After the different operations are performed in response to the Retry Request, local soft reset generator 2240 in primary cross-link 90 generates a local soft reset (step 2532) in response to the Soft Reset Request. In response to the local soft reset, retry generators 2610 and 2620 in memory controllers 70 and 75, respectively, reinitiate the pending bus transaction (step 2534). If the retried bus operation is successful and no error signal is received (step 2536), then the hardware error processing for a CPU I/O error is finished (step 2525).

If an error signal is received by the memory controllers 70 and 75, similar hardware operations will be implemented as were implemented when the first error signal was received. Diagnostic error register 880 is set and the error code is generated (step 2538); the error signal is distributed, the Sys Err interrupt is posted, the trace RAMs are frozen and the retry request is sent (step 2539); and the fault level is incremented, the system fault error address register is frozen and a soft reset request is sent (step 2540). Since most of these operations have already been carried out, there will be no change in the trace RAMs, the error address and diagnostic error registers. The fault level, however, will have been incremented to its highest level indicating that there is a "solid fault" in the computer system. This is because the error will have been detected after a retry of a bus operation, and a solid fault occurs when an error is detected during a retry. Then, before exiting the hardware error handling routine for a CPU I/O error 2500, a soft reset is performed (step 2542).

In order to complete the operation being performed by CPUs 40 and 50 so that an interrupt may be taken for software error handling discussed below, a test is made to see whether a read operation was being executed when the error was detected (step 2544). If so, a default operation will be performed (step 2546). The default operation consists of supplying CPU module 30 with consistent data, such as all zeroes, so that the currently executing operation can be completed without a risk of a failure because of a rail data divergence.

FIG. 29 illustrates the procedure 2900 for recovering from a DMA error. The sequence of operations which take place at the hardware level (step 2910) is similar to those discussed with respect to CPU I/O error recovery sequence. The hardware response to a DMA error (step 2910) includes posting a Sys Err interrupt, posting a DMA interrupt, freezing the trace RAMs and stopping the DMA.

First, the DMA is stopped to prevent corruption of data in system 10. Posting of the Sys Err interrupt indicates to the system that a interrupt processing routine should be conducted so that complete recovery can be made from the error. Posting of the DMA interrupt invokes a DMA handler into software to initiate a check of its own operations. The trace RAMs are also frozen so that software error handling will be able to localize the source of the fault.

Even though the DMA is stopped, the remainder of the system is allowed to continue normal operation. However, continued operation of the system when the DMA has been stopped may result in additional errors, such as CPU I/O errors due to a bus time out, since the zone with an inoperative DMA engine will not be able to execute I/O operations.

After the hardware response to a DMA error takes place, the DMA error recovery sequence is completed (step 2920). Further processing of the DMA fault and resumption of the operation of the DMA must occur in software. The software error handling scheme executed by CPUs 40, 50 and 40', 50' is discussed below.

The third type of error which is primarily handled by hardware is the CPU/MEM fault. FIG. 30 illustrates CPU/MEM fault error handling procedure 3000.

When the error signals for a CPU/MEM fault are received, they propagate through diagnostic error register logic 879 and through error categorization logic 850 in the memory controller which detected the error. Error categorization logic 850 then posts a CPU/MEM fault signal which is encoded by encoder 855 into a two bit error code indicating a CPU/MEM fault. The two bit error code is transmitted through AND gate 856 to cross-links 90 and 95.

The posting of the CPU/MEM fault (step 3010) causes posting of a Sys Err interrupt, incrementing of the fault level, freezing of the system fault error address register, and freezing trace RAMs (step 3020) which are described above in the discussion of CPU I/O error handling process 2500.

Upon detection of a CPU/MEM fault, no effort is made to retry the operation since the ability of the current zone to operate correctly and therefore implement any type of error recovery scheme is uncertain at best. Once cross-links 90 and 95 receive the error code indicating a CPU/MEM fault, they immediately reconfigure themselves into the slave mode (step 3025). System 10 is now considered to be operating in a degraded duplex or master/slave mode.

A local soft reset (step 3030) and zone clock reset (step 3040) are performed and the hardware error recovery for a CPU/MEM fault is complete (step 3050).

Two error conditions occur which cause two corresponding bits in system error register 898 to be set. The first is a NXM (nonexistent memory) error which corresponds to a lack of response during a memory operation. The second error condition is an NXIO (nonexistent I/O device) error which corresponds to a lack of response during an I/O operation.

NXM errors are recovered from in software as discussed below. NXIO errors fall within the CPU I/O error type and are handled in hardware according to CPU I/O handler process 2500.

A NXIO bit and a NXM bit (see FIG. 9) are detected for corresponding NXM and NXIO errors. When the NXM bit is set DMA 800 is disabled which prevents access to I/O by system 10.

In each of the three types of hardware error recovery procedures to detect the cause and location of the error if possible. Additionally, the software error handling may determine that there is no fault and that the system can be restarted in a normal fully duplex mode. On the other hand, during software error handling it may be determined that a module is bad and the module will be marked accordingly.

The overall hardware error recovery scheme minimizes time spent in error recovery by allowing the system to continue operation after a transient fault in the CPU I/O error handler process 2500. Additionally, system overhead devoted to error processing is minimized by not attempting to provide for recovery from CPU/MEM faults. The ability of system 10 to recover from a CPU/MEM fault would impost a time penalty to allow for error recovery which in the preferred embodiment severely degrades system performance.

2. Software Error Handling and Recovery

In order to initiate software error handling, computer system 10 must take a Sys Err interrupt or a DMA interrupt (not shown), whichever is appropriate. The interrupts are used instead of more drastic means, such as a machine check, to allow system 10 to complete the current bus operation. A machine check causes immediate action to be taken and can stop a system in the middle of a bus operation. As discussed briefly with respect to hardware error handling, default information may need to be generated in order to complete a bus operation.

If system 10 is accepting interrupts, then it will initiate a software error handling procedure such as procedure 3100 in FIG. 31. Computer system 10 operates at a given interrupt priority level (IPL) which can be changed. The IPL designates the priority level which an interrupt must be posted at in order to interrupt current computer system operations. If an interrupt is generated with a IPL the same or lower than the IPL currently at which computer system 10 is running, then an interrupt will not be taken. In the preferred embodiment, Sys Err interrupt is the highest priority interrupt.

As has been done with other examples, the software error handling will generally be described with respect to the operation of components in zone 11 with the understanding that, when system 10 is functioning in lockstep mode, similar operations will be performed by zone 11'.

If system 10 takes the Sys Err interrupt (step 3110), system 10 initiates a soft reset (step 3112). System 10 then attempts to read the various error registers located in memory controllers 70, 75, 70' and 75', and in cross-links 90, 95, 90' and 95' (step 3114). The memory controller and cross-link error registers, some of which are not shown, store information which is used in software error processing. Two such error registers are system fault error register 898 and system fault error address register 865. These are located in zone address space and should contain identical information for each zone. In the case of CPU/MEM fault, however, the system fault error register of the two zones will be different. This difference between the contents of the registers in the two zones can only be tolerated if data processing systems 20 and 20' are no longer in lockstep and system 10 is running in degraded duplex or master/slave mode.

Therefore, if the data from registers used in error analysis is not consistent (step 3116), meaning there is a error detected or a miscomparison, the zone which detects inconsistent error data will set a CPU/MEM fault causing the hardware error recovery procedure 3000 illustrated in FIG. 30 to be entered (step 3118). This condition arises when the occurred in the error logic, and this approach results in the failing element being removed from system 10.

If the error information is consistent (step 3116), software error handling continues, system 10 identifying the nature of the fault (step 3122) to determine which error handler to employ. In order to identify the error type, error registers, such as system fault error register 898 and system fault error address register 865 in memory controllers 70 and 75 and error registers in cross-links 90 and 95 (not shown), are analyzed. In addition, NXM error bit in system fault error register 898 must be checked prior to accessing the error registers in cross-links 90 and 95 because access to the cross-links is inhibited while the NXM bit is set.

If the fault detected was a CPU I/O type error, the CPU I/O error handler is entered (step 3124); if the fault is a CPU/MEM fault, the CPU/MEM fault handler is entered (step 3126); if a clock error is detected the clock error handler is entered (step 3128); and if a nonexistent memory (NXM) is detected, the NXM handler is entered (step 3130). CPU I/O error and CPU/MEM faults have been described above with regard to hardware error handling. For software error handling only, CPU I/O errors include DMA errors. A NXM error is an indication that the memory sought to be accessed is not present. A clock error indicates that the two zones cannot be considered as running in lockstep.

CPU I/O error handler 3200, as illustrated in FIG. 32, begins with a trace RAM read (step 3210). The trace RAM read may not be necessary, but it is started at this point because it is a relatively lengthy process. As explained in the previous section, the trace RAMs were frozen by the global error signal. The data from the trace RAMs is then read onto trace busses 1095 and 1096 by diagnostic microprocessor 1100 and into local RAM 1060 in I/O module 100. Complete sets of trace RAM data from the trace RAMs of both zones is collected by the I/O modules of both zones 11 and 11'.

Analysis of trace RAM data entails looking at a trace RAM signature. As the trace RAM data is read down into I/O modules 100 and 100', a trace RAM signature is formed at a string of M bits for each zone. M equals the number of trace RAMs on each rail. Each bit of the trace RAM signature corresponds to one pair of trace RAMs. A trace RAM pair is two trace RAMs on different rails which are located at the same relative position. In FIG. 27, for example, trace RAM pairs in zone 11 would include trace RAMs 2700/2705, 2718/2728, 2715/2725, and 2710/2720. If a bit in a trace RAM signature is set, there has been a miscomparison between the trace RAMs in a pair.

Next, the NXIO (nonexistent I/O) bit in error status register 898 is examined (step 3212). If that bit is set, a NXIO error, which indicates a time out during a read to I/O or a write from I/O, has occurred. If the NXIO bit is not set (step 3212), the trace RAMs are analyzed to assist in determining the device in which the error occurred (step 3214). For example, if the trace RAM signature bit corresponding to trace RAM pair 2700/2705 is set then system 10 can determine that the I/O module corresponding to firewalls 1000 and 1010 is the source of the error.

After the device which is the source of the error has been determined, the system may now form an indictment of the faulty device (step 3220). This indictment involves using the error information stored in the various error registers, e.g., system fault error address register 865, and the trace RAM analysis to identify the specific faulting device. Once the system has identified the faulting device, a determination is made whether the error is a solid fault or an intermittent fault. To determine whether a fault is solid, the first two bits of system fault error register 898 are analyzed.

If the fault is intermittent, rate based thresholding is conducted to determine whether or not the indicated device should be considered as having failed (step 3224). Rate based thresholding involves comparing the number of intermittent errors that have occurred over a given period of time in a faulting device to a predetermined threshold for that device. If the number of errors per unit time for a device is greater than predetermined threshold (step 3224) then the unit is considered to have failed. If the number of errors per unit time is not greater than the threshold (step 3224), then the principal functions of software error handling are complete and steps are taken to exit software error handling procedure 3200.

If the number of intermittent faults is too great or the fault is a solid fault, a failed device handler (step 3226) is called.

FIG. 33 illustrates failed device handler procedure 3300. First, appropriate fault information is stored in the EEPROM of the faulted module (step 3310). Such information can include bits indicating that the corresponding module is broken or may be broken. The stored information can also include certain status information as well.

In order to minimize the effects of a device failure, virtual address of the failed device is mapped to a physical address called the "black hole" (step 3314). The "black hole" is a physical address space which corresponds in effect to a device to which data may be sent to without experiencing errors in the system and which will return a predetermined set of data, which is preferably all zeros, on a read operation. The mapping is performed in the preferred embodiment using a system address conversion table which contains a listing of the virtual addresses and corresponding system addresses for the devices in system 10.

FIG. 34 illustrates an example of a system address conversion table 3400 which is preferably stored in memory arrays 600 and 600'.

System conversion table 3400 includes a virtual address field 3410 and a physical address field 3420. The software uses system address conversion table 3400 to translate or map a device virtual address to its physical address. In addition, the I/O driver routines use the virtual address to identify a corresponding I/O device. Modifying system address conversion table 3400 for a device, therefore, effectively changes the final destination for data addressed to the virtual address which formally corresponded to the I/O device.

After the mapping is complete, the next step in the failed device handler is to clear a device present flag in a software table contained in memory array 600 (step 3316). The purpose of clearing the flag is to tell the device driver corresponding to a failed device that the device is considered to have failed.

After the device present flag has been cleared the system performs a notification of the required repair (step 3318). This notification, in the preferred embodiment, sends a message to appropriate repair personnel. In one embodiment, this message can be sent via a modem to service personnel at a remote location.

The effect of the failed device handler procedure 3300 can be appreciated by examining the performance of a device driver. FIG. 35 illustrates an example of a device driver 3500 which is an executable block of instructions including a series of I/O instructions to be performed by the corresponding device. Even if the device has failed, the device driver continues to operate normally and execute the I/O instructions. Since the I/O device address space has been mapped to the "black hole" for the failed device, the continued execution of instructions will not generate any additional faults. All device drivers will include a "check device present" instruction 3510. This instruction checks the device present bit for the corresponding I/O device. If the device present bit is cleared then the device is considered to have failed and the driver disables itself in an orderly fashion.

Just prior to the "check device present" instruction 3510 there is a clear pipeline instruction 3520. The clear pipeline instruction ensures that all pending I/O instructions are complete so that an error in an immediately preceding instruction will not be missed due to pipeline delays. An example of a "clear pipeline" instruction is a read from a memory controller register. The ability to execute a series of instructions before checking whether the device is considered to have failed saves on the software overhead because it avoids making checks after every operation.

The CPU/IO error handler illustrated in FIG. 32 institutes a number of housekeeping operations after exiting failed device handler 3000 (step 3226), after determining that the device with the error is not considered to have failed after thresholding (step 3224) or after performing a crash dump (step 3232). These housekeeping operations include resetting the trace RAM and error registers (step 3228) and logging the error (step 3230).

Referring back to the software error handling flow of FIG. 31, if the error type is determined to be a CPU/MEM fault (step 3122), then a CPU/MEM fault handler is entered (step 3126). FIG. 36 illustrates an example of a CPU/MEM fault handler.

CPU/MEM fault handler 3600 is a simple software procedure entered in all cases where a CPU/MEM fault is determined to have occurred and for which reliable operation of the CPUs or memory module is unknown. Accordingly, for a system that has a CPU/MEM fault, there is little reliable error processing can be accomplished. After the CPU/MEM fault is entered, the faulting CPU module attempts to move its internal error registers (not shown) to the appropriate EEPROM (step 3612), such as EEPROM 1055. The error registers moved to EEPROM 1055 may very well contain rail unique data because indications of a CPU/MEM fault error reporting is not always given a chance to propagate to both rails and the system is shut down as quickly as possible during hardware error processing.

After the faulting CPU module attempts to move the error registers into its EEPROMs (step 3612), the faulting CPU module immediately enters the console mode (step 3614), and the CPU/MEM fault handler 3600 is complete (step 3616).

In the software error handling routine, if the error type is determined to be a clock error (Step 3122) then a clock error handler is entered (step 3128). An example of a clock error handler is illustrated in FIG. 37 as procedure 3700.

If a clock error has occurred, it is assumed that no accurate diagnostics or error analysis can be accomplished because the clocks were not synchronized when the error occurred. Therefore, the error registers are cleared (step 3710), and the trace RAMs are unfrozen by deasserting the global error signal (step 3716). Any zone which finds a the clock error, sets itself to clock master (step 3718).

The zone finding a clock error then executes a check to see whether the cable is installed and the power is on in the other zone. If the cross-link cable 25 is installed (step 3720), and the other zone does not have power (step 3725), then a clock error is logged in the normal fashion (step 3730) and the zone continues. If the cross-link cable 25 is not installed (step 3720) or is installed but the other zone has power (step 3725), then the zone asks whether it is the zone preselected to continue operating under these conditions (step 3735). If so, then the clock error is logged (step 3730), and the zone continues. If the zone is not the preselected zone (step 3735), then it enters the console mode (step 3740).

If the error type of the software error handling routine is determined to be a nonexistent memory error (NXM) (step 3122), then the NXM handler is entered (step 3130). The NXM error can be detected if the NXM bit is set in system fault error register 898 illustrated in FIG. 9. The NXM bit in system fault error address register 898 is set on two conditions. One is if there is an illegal instruction which the system attempted to execute. Another is if a NXM error was detected due to a lack of response from memory module 60.

An example of a procedure 3800 for handling NXM errors is illustrated in FIG. 38. After the NXM handler is entered, (step 3130) the first determination is whether an illegal instruction was attempted (step 3810). If the NXM bit was set because there was an illegal instruction, then the console mode is entered (step 3812) and the NXM bit is deasserted (step 3831) and the NXM handler is complete (step 3832).

If there was an actual NXM error, system fault error address register 865 is read (step 3820). System fault error address register 865 contains the address of the memory location in memory array. The next step is to compare the memory address with the valid memory locations listed in memory map (step 3826). The purpose of this comparison is to differentiate hardware error from software errors.

There are three different situations in which a NXM error would be detected. The first situation is where the system is booting up and the memory is being sized in order to form the memory map. During booting, the software is probing valid and invalid memory locations in memory array 600. To avoid having this situation cause an error, reporting is either disabled during probing of the memory at boot time by elevating the system IPL during memory probing. Thus the NXM error handler would not be entered.

The second situation in which a NXM error is detected is when memory module 60 has experienced a hardware fault which disabled a particular portion of memory array 600, even though that portion was valid when the memory map was formed. This can happen, for example, when one of the memory array cards is simply removed from the system during operation. This is a hardware fault and will make reliable operation of the corresponding CPU module impossible.

The third situation when a NXM error occurs is when software creates an invalid memory address. In this situation, the software is in error.

These three cases are distinguishable in the present situation. As described above, the first situation is distinguished by not entering the NXM error handler. The next two situations are distinguished by checking the memory address when the NXM error was detected with the valid memory locations and the memory map (step 3826). As can be seen, if the memory module of a zone had hardware fault and the current memory location was a valid location in the map but for some reason is no longer valid, then a CPU/MEM fault is forced (step 3828). In this way the currently executing task can continue to be executed since the CPU/MEM fault will cause a hardware error processing routine to reconfigure the system for continued operation in the degraded duplex or master/slave mode.

However, if it is determined that the current memory location was an invalid location and was not present in the valid memory map, then the system determines that the software is in error and a crash dump and error log will have to be performed (step 3830). After these two cases are accounted for (steps 3828 and 3830) the NXM bit is deasserted (step 2931) and the NXM error handler is exited (step 3832). After the NXM bit is deasserted access to I/O device will be permitted as discussed above.

In each of the three types of hardware error recovery, a software error handling process is used after the hardware error recovery procedures to detect the cause or location of the error if possible. Additionally, the software error handling may determine that there is no fault and that the system can be restarted in a normal fully duplex mode. On the other hand during software error handling it may be determined that a module is bad and the module will be marked accordingly.

In summary, by allowing the system 10 to perform software error recovery only when an interrupt cycle is reached by system 10 the impact on operations executing when an error is detected is minimized. Hardware error recovery facilitates this transparency of error processing to normal execution data processing instructions. Mapping I/O devices to a "black hole" and thereby allowing the device drivers to complete a number of I/O instructions before checking for an error minimizes overhead needed to insure I/O operations are performed correctly and not inappropriately interrupted if additional errors are detected after a first detected error.

3. Conversion of Rail Unique Data to System Data

Under certain conditions of error processing in fault tolerant computer system 10, data is generated which is unique to a single rail of zones 11 or 11'. In the preferred embodiment of the invention, rail unique data may be stored in diagnostic error register 880 after a CPU/MEM fault. Rail unique data is not limited to diagnostic register 880, however. During diagnostic error analysis, rail unique date will be generated in a variety of locations depending on the registers being tested.

If data processing systems 20 or 20' attempt to move rail unique data from one location to another or to use it an any way, the normal error detection circuitry, such as the data comparison 1000' and 1010', will signal an error because the data on each rail will not be identical. Thus a mechanism is needed to avoid causing an error during such transfer.

Furthermore, once rail unique data has been converted into data common to a zone, it is still not usable by fault tolerant system 10 since there would be disagreement between the data in zones 11 and 11'. In order to analyze this data it must be further converted into system data so that there is one consistent copy of data present in each of data processing systems 20 and 20'. This conversion of data must also occur with the four CPU's 40, 50, 40', 50' running in lockstep synchronization.

The conversion of rail unique data to zone unique data will be described with reference to zone 11 and data processing system 20 for purposes of illustration, with the understanding that analogous procedures may be executed by data processing system 20' in zone 11'.

In the preferred embodiment of the invention in the procedure for converting rail unique data to system data, as illustrated in FIG. 39, the interrupt priority level (IPL) of the computer system 10 is elevated above the level at which miscomparison errors will cause a software error processing routine to be executed (step 3910). At this IPL, computer system 10 will only accept interrupts having a higher polarity level than the Sys Err interrupt level.

The error reporting system is also disabled in memory controllers 70 and 75 (step 3912). Error reporting in memory controllers 70 and 75 is disabled by setting error disable it 878 in memory controller status register 876 which is an input to AND gate 856.

The rail unique data from a particular register, which for this example will be the data from diagnostic error register 880, is moved into scratch pad memories 45 and 55 from the diagnostic error registers in corresponding memory controllers 70 and 75, respectively (step 3914). Scratch pad memories 45 and 55 are located "above" memory controllers 70 and 75 so that data from registers in memory controllers 70 and 75 does not pass through any error checkers.

This data in scratch pad memories 45 and 55 is then moved down into memory module 60. First, a write operation is executed in which the data in scratch pad memories 45 and 55 is written into memory module 60 at a first location (step 3916). The system default configuration causes data to be written into the addressed memory location of memory module 60 from the primary rail. This write operation to a first memory location results in data from scratch pad 45 being read into memory module 60.

The data from mirror scratch pad memory 55 is written into memory module which requires two operations. First, the memory bus diversion in memory controller 75 must be enables and those in memory controller 70 must be disabled (step 3918). This is accomplished by setting mirror bus driver enable bit 879 in memory controller status register 876. Next, memory module 60 is commanded to select the ECC for the data from mirror memory controller 75 (step 3920).

Another write operation is then executed in which the data in scratch pad memories 45 and 55 is written into a second memory location (step 3922) different from the location first written to from scratch pad memories 45 and 55 (step 3916). This write operation to a second memory location causes the data from scratch pad memory 55 to be written into the second memory location in memory module 60 since the mirror rail was chosen as the source of data for the write operation (steps 3918 and Step 3920).

This series of operations has converted rail unique data to zone unique data. The data from registers located on respective rails of zone 11 is now located in memory module 60 so that it may be used by data processing system 20 without causing miscomparisons. The zones can now be set back to their normal condition by clearing the specific locations in scratch pad memories 45 and 55 that where previously used (step 3924), selecting the primary rail on memory module 60 (step 3926), deselecting mirror rail bus drivers in memory controller 75 by resetting mirror bus driver enable bit 879 (step 3928), clearing the appropriate error and diagnostic registers (step 3930), and forcing a soft reset in memory controllers 70 and 75 (step 3932).

After the IPL is returned to a level at which the system may accept interrupts (step 3934), system 10 is ready to convert the zone unique data stores at two addresses in each memory module 60 and 60' into data usable by the entire system.

In order to transform zone unique data into system data communication register 906 is utilized. Communications register 906 is used to hold unique data to be exchanged between zones. As described previously, the address of communication register for writing is in zone address space. Thus, during lockstep operation, both zones can simultaneously write the communications register in their respective zones. The address of communications register for reading, however, is in the system address space. In this manner, two zones in lockstep operation, can simultaneously read zone unique data using the communication registers.

The method of converting zone unique data into system data is illustrated as procedure 4000 in FIG. 40. First, both data processing systems 20 and 20' simultaneously write the desired location from their respective memory modules into their respective communications register (step 4010). Next, both data processing systems 20 write the data from communications register 906' into memory modules 60 and 61' (step 4030). Now the entire zone has the same data.

If, as in the case of rail unique data, there are multiple memory module locations with different data, the procedure 4000 would be repeated for each location.

V. CONCLUSION

The resets thus organized are designed to provide the minimal disruption to the normal execution of system 10, and only cause the drastic action of interrupting the normal sequences of instruction execution when such drastic action is required. This is particularly important in a dual or multiple zone environment because of the problems of resynchronization which conventional resets cause. Thus, it is preferable to minimize the number of hard resets, as is done in system 10.

What is claimed is:

1. In a data processing system having a central processor connected to a plurality of components via a data pathway, the components including resettable elements, and the central processor executing a sequence of instructions which cause a series of transactions to be forwarded along the data pathway, a method of resetting the data processing system without altering the sequence of instruction execution comprising the steps, executed by the data processing system, of:
   sequentially storing, in a trace RAM coupled to the data pathway, the series of transactions being forwarded along the data pathway;
   detecting a condition of the data processing system for which a reset is indicated;
   transmitting, if the condition for which a reset is indicated is detected, reset signals to selected ones of the plurality of components along the data pathway, the reset signals causing the selected ones of the plurality of components to reset portions of their elements; and
   reforwarding, from the trace RAM, a most recently stored one of the series of transactions along the data pathway after transmission of the reset signals.

2. The method of claim 1 wherein the resettable elements of the selected ones of the plurality of components each have a state indicator identifying its state, and
   wherein the step of transmitting reset signals includes the substep of
      resetting state indicators of the selected ones of the plurality of components.

3. The method of claim 1 wherein the resettable elements of the selected ones of the plurality of components each have at least one storage register for storing data transmitted along the data pathway during said series of transactions, and
   wherein the step of transmitting reset signals includes the substep of
      resetting the at least one storage register of the selected components.

4. The method of claim 1 wherein the resettable elements of the selected ones of the plurality of components each have at least one error circuit containing error information, and
- wherein the step of transmitting reset signals includes the substep of
  - resetting the at least one error circuit of each of the selected ones of the plurality of components.

5. The method of claim 1 wherein the step of detecting a condition for which a reset is indicated includes the substep of
- detecting an error condition in the data processing system.

6. The method of claim 1 wherein the step of detecting a condition for which a reset is indicated includes the substep of
- detecting a reset request condition in the data processing system.

7. In a data processing system having a central processor connected to a plurality of components via a data pathway, the components including resettable elements, and the central processor executing a sequence of instructions which cause a series of transactions to be forwarded along the data pathway, a method of automatically resetting the data processing system comprising the steps, executed by the data processing system, of:
- sequentially storing, in a trace RAM coupled to the data pathway, the series of transactions being forwarded along the data pathway;
- detecting a condition of the data processing system for which a reset is indicated;
- determining whether the condition of the data processing system for which a reset is indicated is a critical or noncritical reset condition;
- issuing a hard reset signal to said plurality of components if the indicated condition is the critical reset condition, the issuance of the hard reset signal causing all of the resettable elements to reset and causing the data processing system to enter a predetermined state thereby disrupting the sequence of instruction execution by said data processing system;
- issuing a soft reset signal to selected ones of the plurality of components if the indicated condition is the noncritical reset condition, the receipt of the soft reset signal by the selected ones of the plurality of components avoiding interruption of the sequence of instruction execution of the data processing system; and
- reforwarding, from the trace RAM, a most recently stored one of the series of transactions along the data pathway after issuance of the soft reset signal.

8. The method of claim 7 wherein the step of determining whether the indicated reset is the critical or noncritical reset condition includes the substep of
- determining that the condition for which the reset is indicated is a critical reset condition if a power up signal is received by the data processing system indicating that power has recently been applied to the data processing system.

9. The method of claim 7 wherein the step of determining whether the indicated reset is a critical or noncritical reset condition includes the substep of
- determining that the indicated reset is a critical reset condition if a request is received to remove a component from said data processing system.

10. The method of claim 7 wherein said data processing system includes dual processing systems designed to be run in synchronism with each other, and
- wherein the step of determining whether the indicated reset is a critical or noncritical reset condition includes the substep of
  - determining that the indicated reset is a critical reset condition if a request is received to bring said dual processing systems into synchronism.

11. In a data processing system having two data processing zones, each of said data processing zones including a central processor connected to a plurality of components via a corresponding data pathway, and the plurality of components in each of said data processing zones including resettable elements, wherein the central processors each execute a sequence of instructions which cause a series of transactions to be forwarded along the corresponding data pathway, a method of automatically resetting the data processing system comprising the steps, executed by the data processing system, of:
- sequentially storing, in trace RAMs coupled to the data pathways, the series of transactions being forwarded along the data pathways;
- detecting a condition of the data processing system for which a reset is indicated;
- determining whether the condition for which a reset is indicated is a critical or noncritical reset condition;
- issuing a hard reset signal to the plurality of components in both of said zones if the condition for which the reset is indicated is the critical reset condition, the issuance of the hard reset signal causing all of the resettable elements to reset and causing the data processing system to enter a predetermined state thereby disrupting the sequence of instruction execution by said data processing system, the issuance of said hard reset signal occurring substantially simultaneously to the components in each of said zones;
- issuing a soft reset signal along reset pathways to selected ones of the plurality of components if the indicated condition is the noncritical reset condition, the soft reset signal arriving substantially simultaneously at said selected components in both of said zones, the receipt of the soft reset signal by the selected ones of the components avoiding interrupting the sequence of instruction execution of the data processing system; and
- reforwarding, from the trace RAMs, most recently stored ones of the series of transactions along the data pathways after issuance of the soft reset signal condition.

12. The method of claim 11 wherein the step of determining whether the condition for which the reset is indicated is the critical or noncritical reset condition includes the substep of
- determining that the condition for which the reset is indicated is the critical reset condition if a power up signal is received by the data processing system indicating that power has recently been applied to the data processing system.

13. The method of claim 11 wherein the step of determining whether the condition for which the reset is indicated is the critical or noncritical reset condition includes the substep of
- determining that the condition for which the reset is indicated is the critical reset condition if a request is received to remove a designated one of the plurality of components from said data processing system.

14. The method of claim 11 wherein the step of determining whether the condition for which the reset is indicated is the critical or noncritical reset condition includes the substep of determining that the condition for which the reset is indicated is the critical rest condition if a request is received to being said zones into synchronism.

15. The method of claim 11 wherein the step of issuing the soft reset signal includes the substep of generating a soft reset signal for each zone, and sending the soft reset signal generated for each zone to the selected ones of the plurality of components in the same zone.

16. The method of claim 15 wherein the step of detecting the condition of the data processing system for which the reset is indicated includes the substep of making the detection in one of said zones;

wherein the step of determining whether the condition for which the reset is indicated is a critical or noncritical reset condition includes the substep of making such determination in the same zone in which the condition was detected; and wherein the step of issuing the soft reset signal includes the substep of sending a soft reset initiation signal from the one of the zones which detected the reset condition to the other one of the zones.

17. In a computer system having two data processing systems, each including a plurality of elements executing the same series of operations at substantially the same time, a method of propagating resets throughout the data processing system comprising the steps, executed by the computer system, of:

detecting a condition of the computer system for which a reset is indicated;

generating a reset signal in response to said condition by each of the data processing systems independently of the other one of the data processing systems; and transmitting the reset signal generated by each data processing system only to elements of the data processing system which generated the corresponding reset signal.

18. A data processing system, comprising:

a central processor connected to a plurality of components via a data pathway, the components including resettable elements, and the central processor executing a sequence of instructions which cause a series of transactions to be forwarded along the data pathway; and means for resetting the data processing system without altering the sequence of instruction execution, including a trace RAM coupled to the data pathway, means for sequentially storing, in the trace RAM, the series of transactions being forwarded along the data pathway, means for detecting a condition of the data processing system for which a reset is indicated, means for transmitting, if the condition for which a reset is indicated is detected, reset signals to selected ones of the plurality of components along the data pathway, the reset signals causing the selected ones of the plurality of components to reset portions of their elements, and means for reforwarding, from the trace RAM, a most recently stored one of the series of transactions along the data pathway after transmission of the reset signals.

19. The data processing system of claim 18, wherein the trace RAM comprises a circular buffer.

20. A data processing system, comprising:

a central processor connected to a plurality of components via a data pathway, the components including resettable elements, and the central processor executing a sequence of instructions which cause a series of transactions to be forwarded along the data pathway; and means for automatically resetting the data processing system, including a trace RAM coupled to the data pathway, means for sequentially storing, in the trace RAM, the series of transactions being forwarded along the data pathway;

means for detecting a condition of the data processing system for which a reset is indicated, means for determining whether the condition of the data processing system for which a reset is indicated is a critical or noncritical reset condition, means for issuing a hard reset signal to said plurality of components if the indicated condition is the critical reset condition, the issuance of the hard reset signal causing all of the resettable elements to reset and causing the data processing system to enter a predetermined state thereby disrupting the sequence of instruction execution by said data processing system, means for issuing a soft reset signal to selected ones of the plurality of components if the indicated condition is the noncritical reset condition, the receipt of the soft reset signal by the selected ones of the plurality of components avoiding interruption of the sequence of instruction execution of the data processing system, and means for reforwarding, from the trace RAM, a most recently stored one of the series of transactions along the data pathway after issuance of the soft reset signal.

21. The data processing system of claim 20 wherein the trace RAM comprises a circular buffer.

22. A data processing system, comprising:

two data processing zones, each of said data processing zones including a central processor connected to a plurality of components via a corresponding data pathway, and the plurality of components in each of said data processing zones including resettable elements, wherein the central processors each execute a sequence of instructions which cause a series of transactions to be forwarded along the corresponding data pathway; and means for automatically resetting the data processing system, including trace RAMs coupled to the data pathways, means for sequentially storing, in the trace RAMs, the series of transactions being forwarded along the data pathways, means for detecting a condition of the data processing system for which a reset is indicated, means for determining whether the condition for which a reset is indicated is a critical or noncritical reset condition, means for issuing a hard reset signal to the plurality of components in both of said zones if the condition for which the reset is indicated is the critical reset condition, the issuance of the hard reset signal causing all of the resettable elements to reset and causing the data processing system to enter a predetermined state thereby disrupting the sequence of instruction execution by said data processing system, the issuance of said hard reset signal occurring substantially simultaneously to the components in each of said zones, means for issuing a soft reset signal along reset pathways to selected ones of the plurality of components if the indicated condition is the noncritical reset condition, the soft reset signal arriving substantially simultaneously at said selected components in both of said zones, the receipt of the soft reset signal by the selected ones of the components avoiding interrupting the sequence of instruction execution of the data processing system, and means for reforwarding, from the trace RAMs, most recently stored ones of the series of transactions along the data pathways after issuance of the soft reset signal condition.

23. The data processing system of claim 22 wherein the trace RAMs comprise circular buffers.

24. A computer system, comprising:

two data processing systems, each including a plurality of elements executing the same series of operations at substantially the same time; and means for propagating resets throughout the data processing system, including means for detecting a condition of the computer system for which a reset is indicated, means for generating a reset signal in response to said condition by each of the data processing systems independently of the other one of the data processing systems, and means for transmitting the reset signal generated by each data processing system only to elements of the data processing system which generated the corresponding reset signal.

* * * * *